(12) United States Patent
Wippermann et al.

(10) Patent No.: US 11,474,331 B2
(45) Date of Patent: *Oct. 18, 2022

(54) DEVICE COMPRISING A MULTI-APERTURE IMAGING DEVICE, METHOD FOR PRODUCING SAME AND METHOD FOR CAPTURING A TOTAL FIELD OF VIEW

(71) Applicant: Fraunhofer-Gesellschaft zur Foerderung der angewandten Forschung e.V., Munich (DE)

(72) Inventors: Frank Wippermann, Meiningen (DE); Nicolas Lange, Dresden (DE); Oliver Pabst, Jena (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/314,726

(22) Filed: May 7, 2021

(65) Prior Publication Data

US 2021/0263289 A1     Aug. 26, 2021

Related U.S. Application Data

(63) Continuation of application No. 15/958,694, filed on Apr. 20, 2018, now Pat. No. 11,016,273, which is a
(Continued)

(30) Foreign Application Priority Data

Oct. 21, 2015   (DE) .................... 10 2015 220 566.5

(51) Int. Cl.
*G02B 13/00* (2006.01)
*G03B 5/00* (2021.01)
(Continued)

(52) U.S. Cl.
CPC ........ *G02B 13/0065* (2013.01); *G02B 13/06* (2013.01); *G02B 26/0816* (2013.01);
(Continued)

(58) Field of Classification Search
CPC .......... G03B 5/00; G03B 17/04; G03B 17/17; H04N 5/23238; G02B 27/143; G02B 26/0816; G02B 13/0065
See application file for complete search history.

(56) References Cited

U.S. PATENT DOCUMENTS 6,532,035 B1   3/2003 Saari et al.
6,992,699 B1 * 1/2006 Vance .................... H04N 7/142
                                                    348/207.99
(Continued)

FOREIGN PATENT DOCUMENTS

DE          19736675 A1    2/1999
DE       102014213371 B3   8/2015
(Continued)

*Primary Examiner* — Boubacar Abdou Tchoussou
(74) *Attorney, Agent, or Firm* — Perkins Coie LLP; Michael A. Glenn

(57) ABSTRACT

A device described here includes a housing and a multi-aperture imaging device. The multi-aperture imaging device includes an array of optical channels arranged next to one another and a beam-deflector for deflecting an optical path of the optical channels. In a first operating state of the device, the housing encloses a housing volume. In the first operating state of the device, the beam-deflector includes a first position within the housing volume. In a second operating state of the device, the beam-deflector includes a second position where the beam-deflector is arranged at least partly outside the housing volume.

4 Claims, 31 Drawing Sheets

Related U.S. Application Data continuation of application No. PCT/EP2016/075083, filed on Oct. 19, 2016.

(51) Int. Cl.
  *G03B 17/04* (2021.01)
  *G03B 17/17* (2021.01)
  *H04N 5/225* (2006.01)
  *G02B 27/14* (2006.01)
  *G02B 27/10* (2006.01)
  *G02B 13/06* (2006.01)
  *G02B 26/08* (2006.01)
  *H04N 5/232* (2006.01)

(52) U.S. Cl.
  CPC ....... *G02B 27/1066* (2013.01); *G02B 27/143* (2013.01); *G03B 5/00* (2013.01); *G03B 17/04* (2013.01); *G03B 17/17* (2013.01); *H04N 5/2254* (2013.01); *H04N 5/2258* (2013.01); *H04N 5/23238* (2013.01)

(56) References Cited

U.S. PATENT DOCUMENTS

| | | | | |
|---|---|---|---|---|
| 7,375,759 | B2* | 5/2008 | Lin | H04N 5/2259 348/371 |
| 7,625,139 | B2 | 12/2009 | Seita | |
| 7,974,019 | B2 | 7/2011 | Misawa | |
| 8,194,138 | B2* | 6/2012 | Shen | G06F 1/1616 348/207.1 |
| 9,172,856 | B2* | 10/2015 | Bohn | H04N 5/2254 |
| 9,197,816 | B2 | 11/2015 | Laroia | |
| 9,507,241 | B1* | 11/2016 | Schantz | G03B 11/043 |
| 2004/0135918 | A1 | 7/2004 | Chuang | |
| 2006/0045515 | A1 | 3/2006 | Seita | |
| 2007/0041723 | A1 | 2/2007 | Gutierrez et al. | |
| 2007/0058045 | A1 | 3/2007 | Misawa | |
| 2007/0116454 | A1 | 5/2007 | Tsai | |
| 2007/0247540 | A1 | 10/2007 | Iguchi | |
| 2008/0266443 | A1* | 10/2008 | Lee | H04N 5/2254 348/344 |
| 2009/0161004 | A1 | 6/2009 | Yuan | |
| 2010/0032576 | A1* | 2/2010 | Mooney | H01J 37/244 250/368 |
| 2010/0141827 | A1 | 6/2010 | Uehara et al. | |
| 2013/0088637 | A1 | 4/2013 | Duparre | |
| 2014/0055624 | A1 | 2/2014 | Gaines et al. | |
| 2014/0063322 | A1* | 3/2014 | Chan | H04N 5/2254 348/335 |
| 2014/0111650 | A1 | 4/2014 | Georgiev et al. | |
| 2015/0109468 | A1 | 4/2015 | Laroia | |
| 2017/0118388 | A1 | 4/2017 | Wippermann et al. | |
| 2017/0242225 | A1* | 8/2017 | Fiske | H04N 5/23296 |

FOREIGN PATENT DOCUMENTS

| | | |
|---|---|---|
| JP | 2003163824 A | 6/2003 |
| JP | 2005037548 A | 2/2005 |
| JP | 2005051419 A | 2/2005 |
| JP | 2006115474 A | 4/2006 |
| JP | 2007116361 A | 5/2007 |
| JP | 2008180773 A | 8/2008 |
| JP | 2010268078 A | 11/2010 |
| JP | 2011239207 A | 11/2011 |
| JP | 2012027202 A | 2/2012 |
| JP | 2017526002 A | 9/2017 |
| KR | 2019880004550 Y1 | 12/1988 |
| KR | 20090084483 A | 8/2009 |
| KR | 20150072439 A | 6/2015 |
| TW | I396429 B | 5/2013 |
| WO | 2014170722 A1 | 10/2014 |
| WO | 2015005056 A1 | 1/2015 |

* cited by examiner

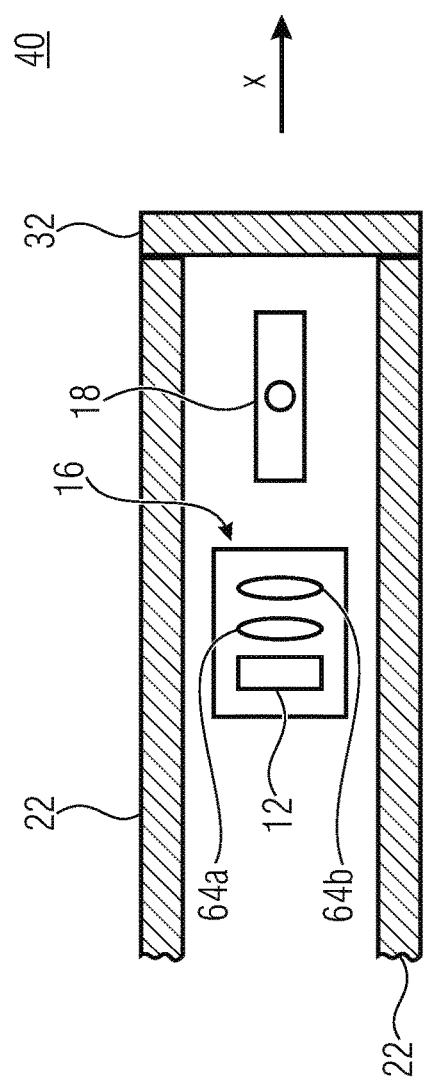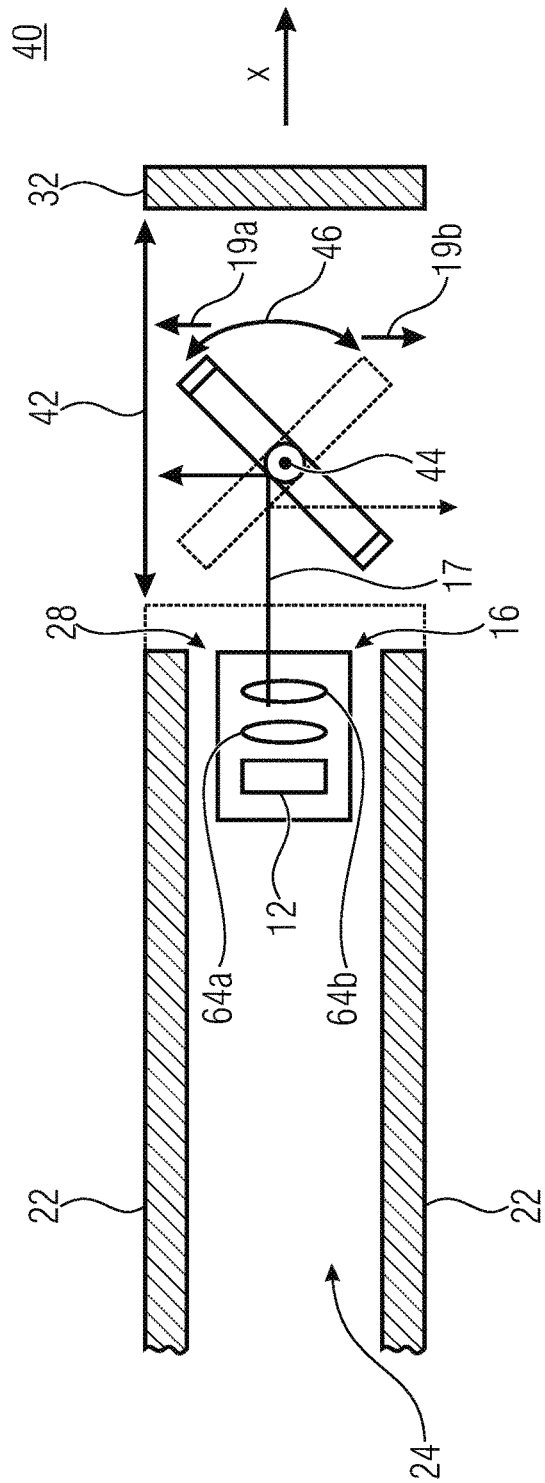

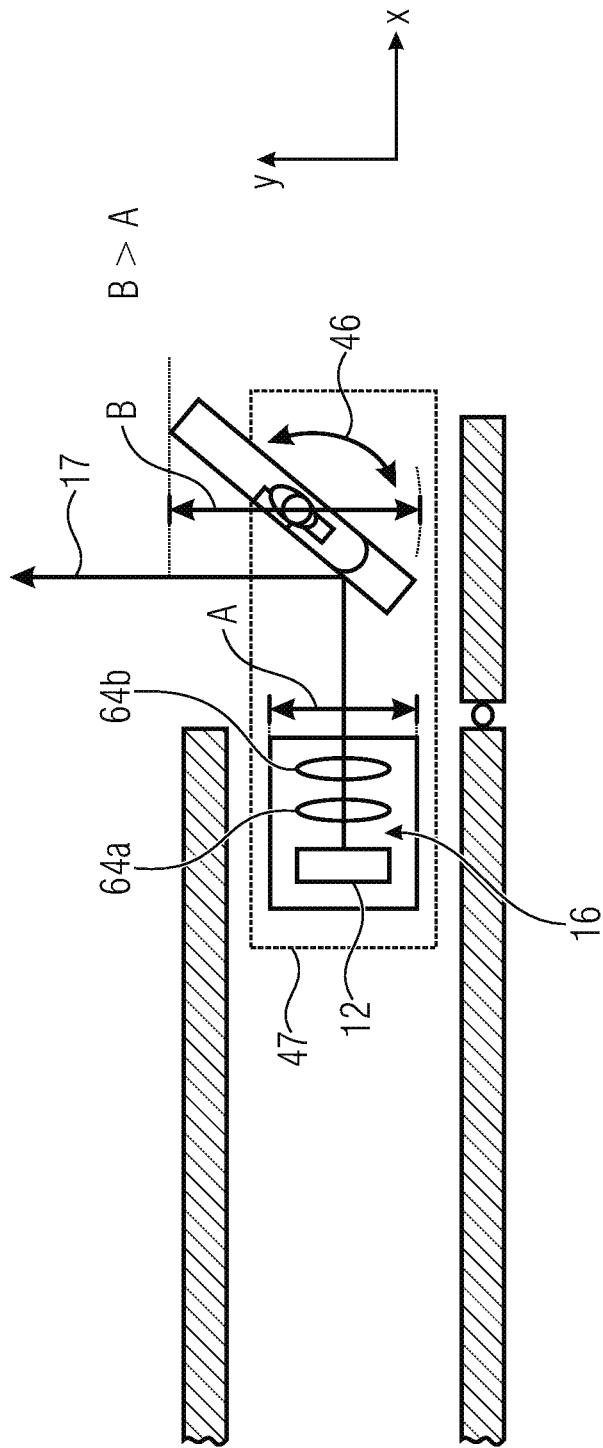

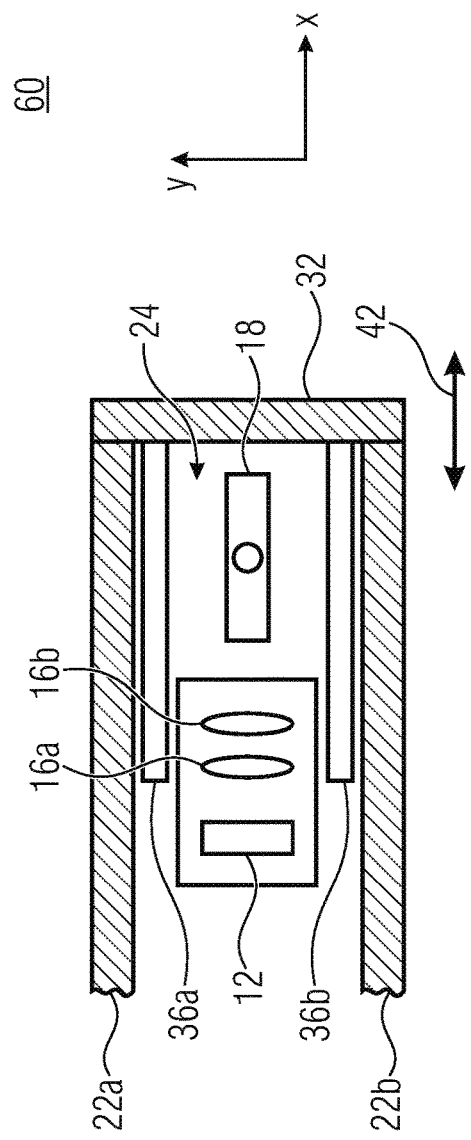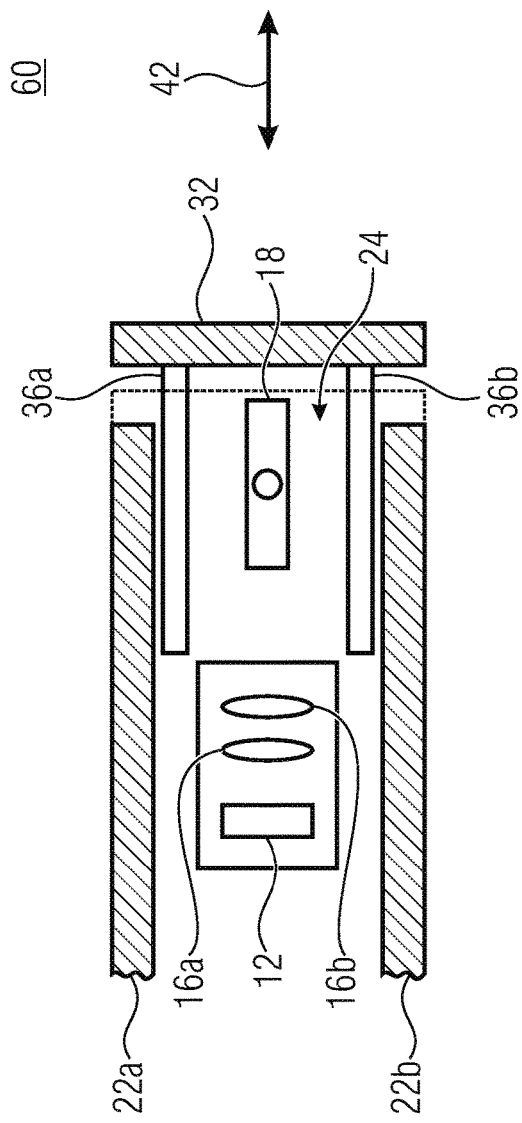

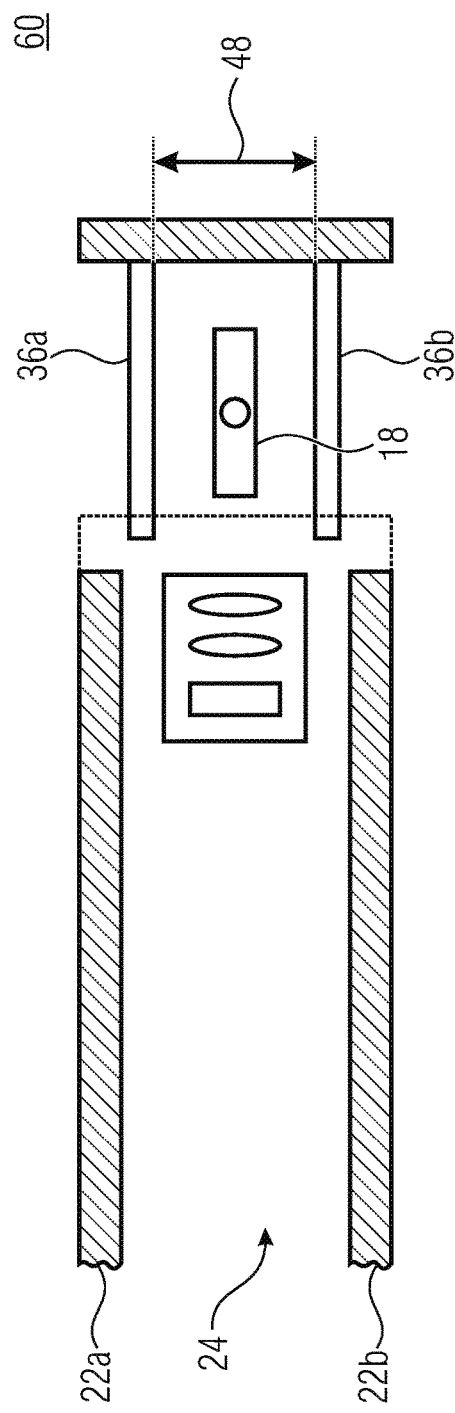
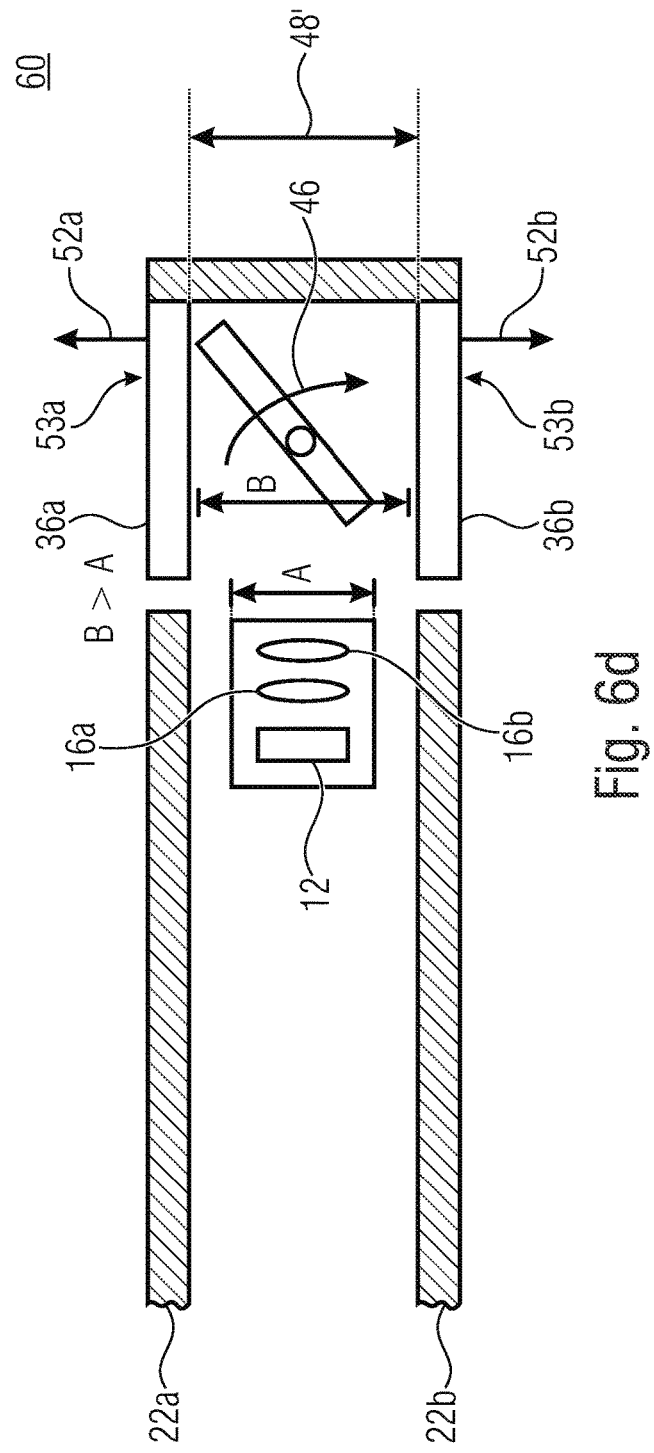

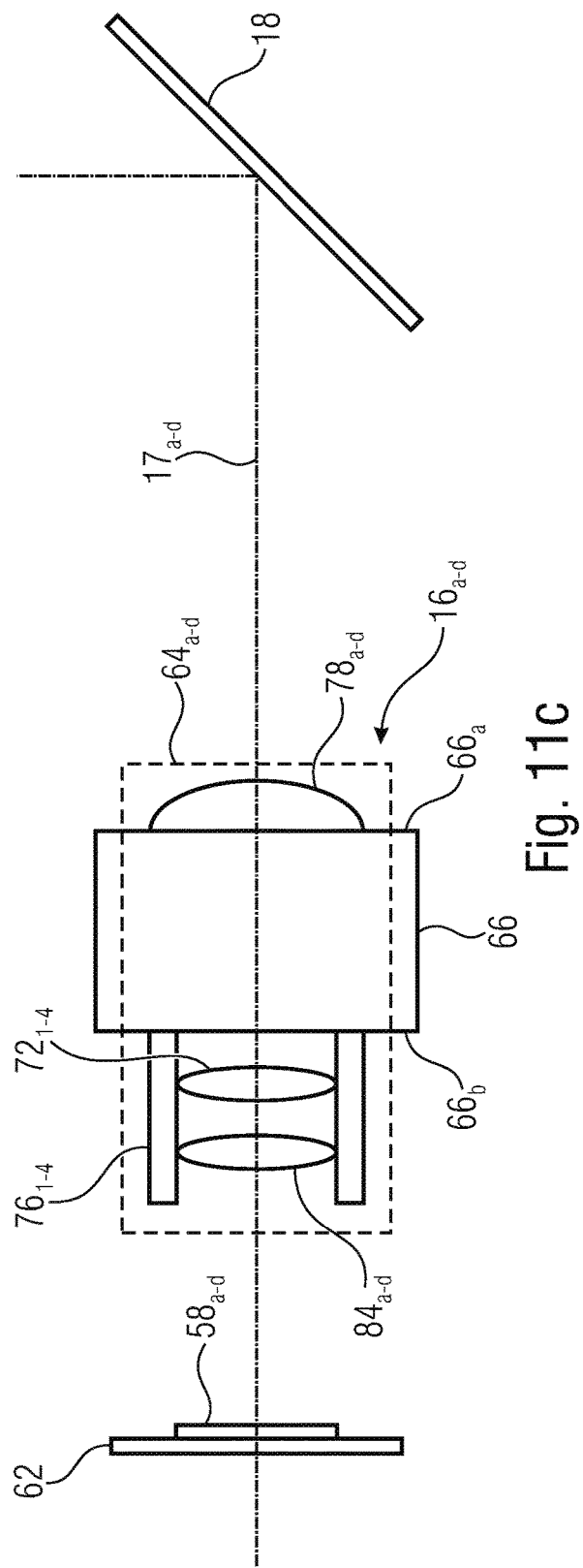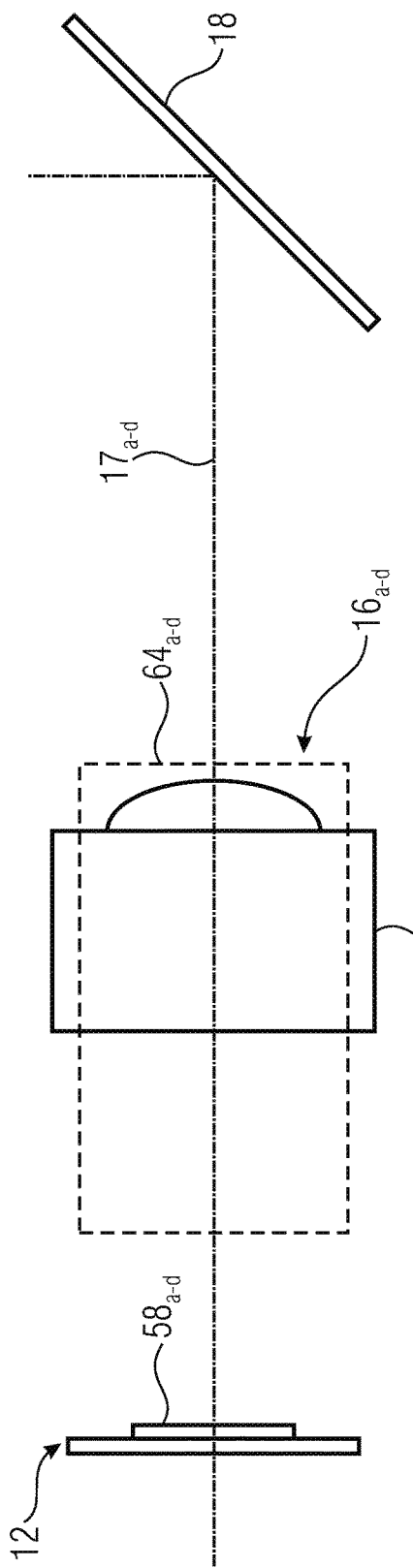

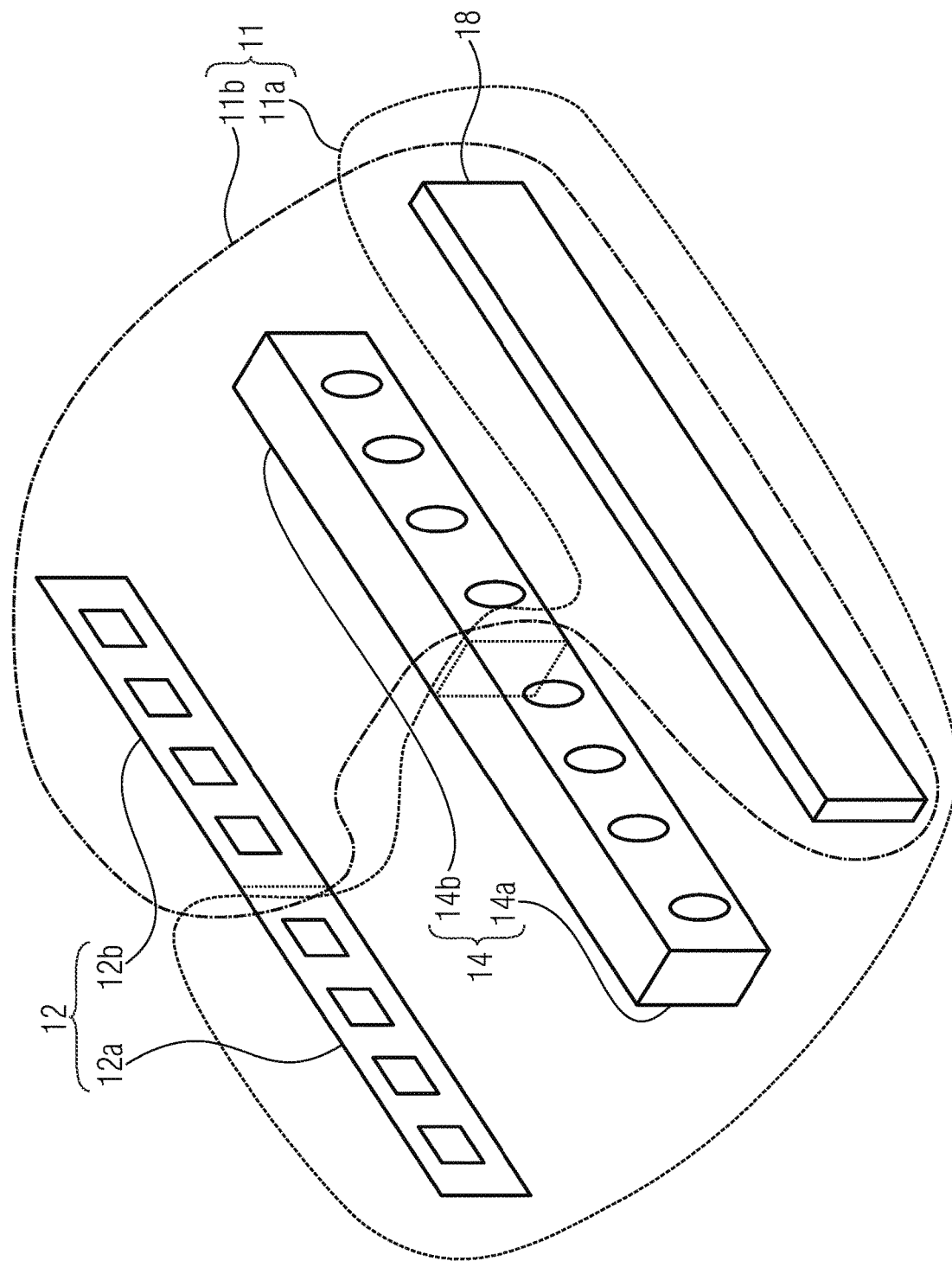

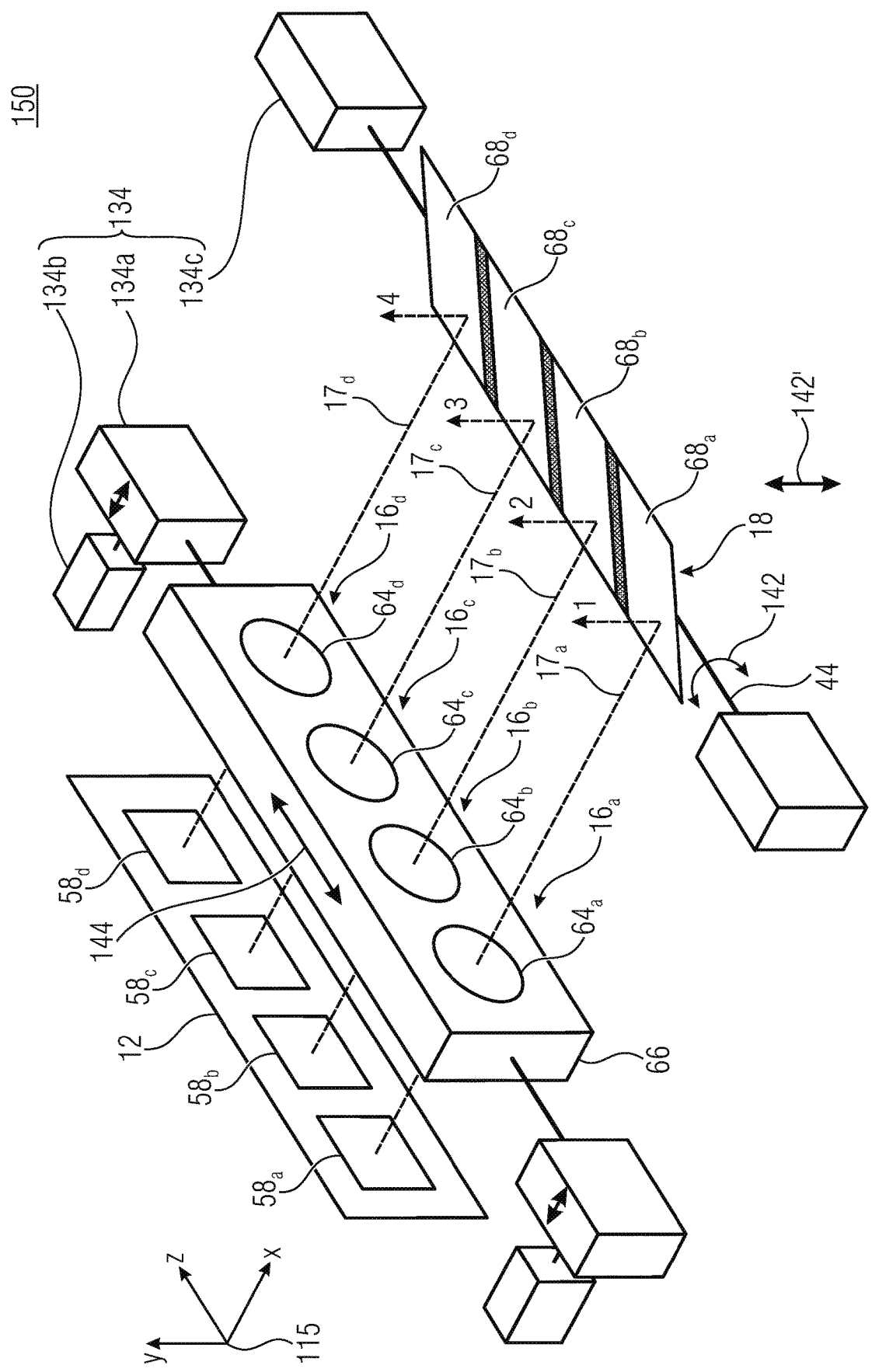

DEVICE COMPRISING A MULTI-APERTURE IMAGING DEVICE, METHOD FOR PRODUCING SAME AND METHOD FOR CAPTURING A TOTAL FIELD OF VIEW

CROSS-REFERENCE TO RELATED APPLICATIONS

This application is a continuation of copending U.S. patent application Ser. No. 15/958,694, filed Apr. 20, 2018, which in turn is a continuation of copending International Application No. PCT/EP2016/075083, filed Oct. 19, 2016, which is incorporated herein by reference in its entirety, and additionally claims priority from German Application No. 10 2015 220 566.5, filed Oct. 21, 2015, which is also incorporated herein by reference in its entirety.

The present invention relates to a device comprising a multi-channel imaging device, to a method for producing same, and to a method for capturing a total field of view. In addition, the present invention relates to multi-aperture imaging systems comprising a linear channel arrangement and an extendible housing.

BACKGROUND OF THE INVENTION

Conventional cameras transmit the total field of view in one channel and are limited as regards miniaturization. In mobile devices, such as smart phones, two cameras are used which are oriented in the sense of the surface normal of the display and opposite thereto. Multi-aperture cameras comprising a linear channel arrangement exhibiting a reduction in construction height have already been suggested. Deflecting mirrors are used here which, however, are limited in their extension and thus result either in an undesired increase in the construction height or, due to vignetting of the optical path, in a reduction in the brightness. Furthermore, when being installed in a housing of a smart phone, other parts (display, battery, electronics) may stand in the way so that the beam-deflecting means cannot deflect the optical path in the different viewing directions freely.

Consequently, a concept allowing miniaturized devices for capturing a total field of view while ensuring a high image quality would be desirable.

SUMMARY

According to an embodiment, a device may have: a housing; and a multi-aperture imaging device having: an array of optical channels arranged next to one another; and a beam-deflector for deflecting an optical path of the optical channels; wherein external surfaces of the housing enclose a housing volume in a first operating state of the device, wherein the beam-deflector, in the first operating state of the device, has a first positon within the housing volume, wherein the beam-deflector, in a second operating state of the device, has a second position where the beam-deflector is arranged at least partly outside the housing volume.

According to another embodiment, a method for providing a device may have the steps of: providing a housing; and arranging a multi-aperture imaging device within the housing, the multi-aperture imaging device having: an array of optical channels arranged next to one another; and a beam-deflector for deflecting an optical path of the optical channels; wherein arranging the multi-aperture imaging device is executed such that external surfaces of the housing enclose a housing volume in a first operating state of the device so that the beam-deflector, in the first operating state of the device, has a first position within the housing volume; and so that the beam-deflector, in a second operating state of the device, has a second position in which the beam-deflector is arranged at least partly outside the housing volume.

According to another embodiment, a method for capturing a total field of view may have the steps of: moving the beam-deflector of a multi-aperture imaging device to a position in which the beam-deflector is arranged at least partly outside a housing volume which, in a first operating state of a device, is enclosed by external surfaces of a housing and where the beam-deflector is arranged in a first position; and capturing the total field of view using an array of optical channels of the multi-aperture imaging device arranged next to one another, the optical paths of which are deflected by the beam-deflector.

A central idea of the present invention is having recognized that viewing directions of a multi-aperture imaging device are influenced in quality to a small extent outside a housing. By deflecting optical paths of optical channels outside the multi-aperture imaging device or by deflecting outside the housing, a high quality of the images can be achieved. In addition, deflecting the optical paths allows orienting the multi-aperture imaging device within the housing to be at least partly independent on a viewing direction of the multi-aperture imaging device. This is influenced or determined by the beam-deflecting means, for example. The independent orientation of the multi-aperture imaging device within the housing allows the enclosing housing to be miniaturizable at least as regards one dimension, such as thickness. The arrangement of the beam-deflecting means within the housing additionally allows the multi-aperture imaging device and components of illumination means maybe present to remain hidden in this operating state, resulting in a high degree of aesthetics for the total apparatus since, in this state, no diaphragms, lenses, LEDs or other components are recognizable.

In accordance with an embodiment, a device comprises a housing and a multi-aperture imaging device. The multi-aperture imaging device comprises an array of optical channels arranged next to one another and beam-deflecting means for deflecting an optical path of the optical channels. In a first operating state of the device, external surfaces of the housing enclose a housing volume. The beam-deflecting means, in the first operating state of the device, comprises a first position within the housing volume. In a second operating state of the device, the beam-deflecting means comprises a second position in which at least the beam-deflecting means is arranged at least partly outside the housing volume.

In accordance with another embodiment, a method for providing a device comprises providing a housing and arranging a multi-aperture imaging device within the housing. The multi-aperture imaging device comprises an array of optical channels arranged next to one another and beam-deflecting means for deflecting an optical path of the optical channels. Arranging the multi-aperture imaging device is executed such that external surfaces of the housing, in a first operating state of the device, enclose a housing volume and such that the beam-deflecting means, in the first operating state of the device, comprises a first position within the housing volume. The multi-aperture imaging device is arranged such that, in a second operating state of the device, the beam-deflecting means comprises a second position in which at least the beam-deflecting means is arranged at least partly outside the housing volume.

In accordance with another embodiment, a method for capturing a total field of view comprises moving beam-deflecting means of a multi-aperture imaging device to a position in which at least the beam-deflecting means is arranged at least partly outside a housing volume which is enclosed by external surfaces of a housing in a first operating state of the device, and where the beam-deflecting means is arranged in a first position. The method comprises capturing a total field of view using an array of optical channels of the multi-aperture imaging device arranged next to one another the optical paths of which are deflected by the beam-deflecting means.

In accordance with another embodiment, at least one actuator of an image stabilizer and/or focusing means is arranged such that it is arranged at least partly between two planes spanned or defined by sides of a cuboid. The sides of the cuboid are aligned in parallel to one another and to a line extension direction of the array and part of the optical path of the optical channels between the image sensor and the beam-deflecting means. A direction of the surface normal of the planes may be understood to be the thickness direction of the device. The volume of the cuboid is minimum and nevertheless comprises the image sensor, the array and the beam-deflecting means. This allows the housing to be implemented to be flat. In contrast to existing approaches, this allows the camera not to protrude in the thickness direction from the cuboid volume of the housing in any of the states.

BRIEF DESCRIPTION OF THE DRAWINGS

Embodiments of the present invention will be detailed subsequently referring to the appended drawings, in which:

FIG. 4A is a schematic sectional side view of a device in accordance with an embodiment in the first operating state, comprising a translatory shiftable cover;

FIG. 4B is a schematic sectional side view of the device of FIG. 4A in the second operating state;

FIG. 5C is a schematic sectional side view of the device of FIG. 5A in the second operating state;

FIG. 6A is a schematic sectional side view of a device in accordance with an embodiment in the first operating state, comprising at least partly transparent covers compared to the device of FIG. 5;

FIG. 6B is a schematic sectional side view of the device of FIG. 6A in which the beam-deflecting means comprises an intermediate position between a first position and second position;

FIG. 6C is a schematic sectional side view of the device of FIG. 6A in which the beam-deflecting means is extended completely from a housing volume;

FIG. 6D is a schematic sectional side view of the device of FIG. 6A in which a distance between the at least partly transparent covers is increased compared to FIGS. 6A to 6C;

FIGS. 11a-c are detailed illustrations of a multi-aperture imaging device in accordance with an embodiment;

FIGS. 11d-f show implementations of the multi-aperture imaging device in accordance with FIGS. 11a-c in case of optics of optical channels supported by a common support in accordance with an embodiment

FIG. 13b shows a schematic set-up of a multi-aperture imaging device for stereoscopically capturing a total field of view;

FIG. 17 is a schematic view of the device of FIG. 15a supplemented by additional actuators in accordance with an embodiment;

DETAILED DESCRIPTION OF THE INVENTION

Figure 1A:
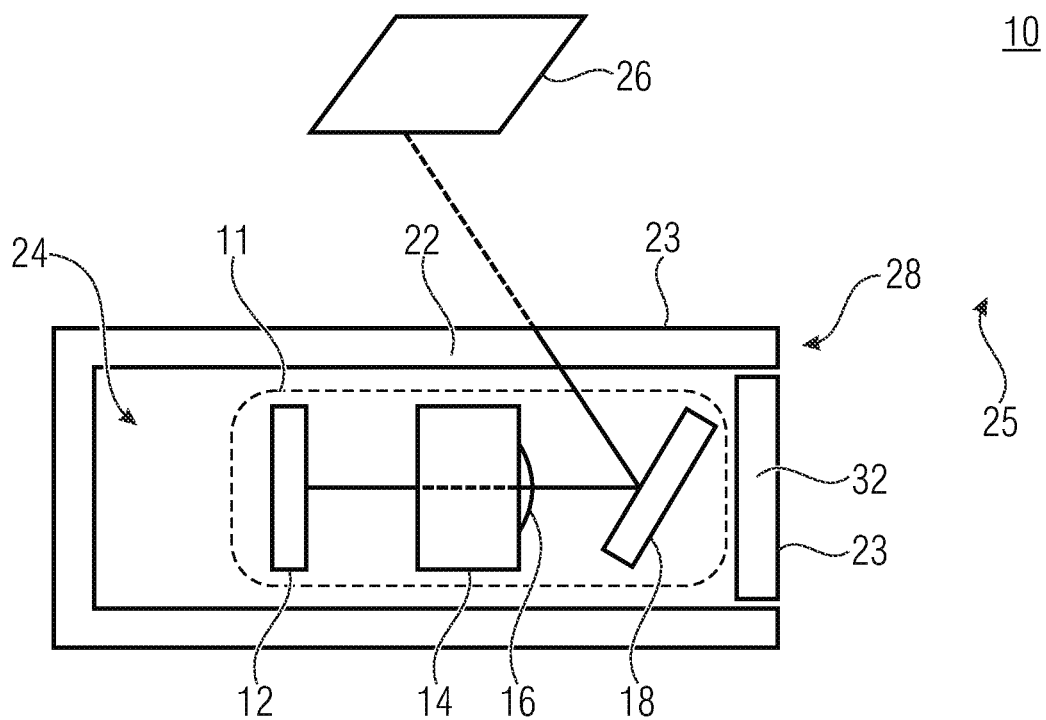
FIG. 1A is a schematic sectional side view of a device in accordance with an embodiment in a first operating state.

Before discussing below in greater detail embodiments of the present invention referring to the drawings, it is pointed out that identical elements, objects and/or structures or those of equal function or equal effect, in the different figures, are provided with equal reference numerals so that the description of these elements illustrated in different embodiments is mutually exchangeable or mutually applicable.

FIG. 1*a* shows a schematic sectional side view of a device 10 in accordance with an embodiment in a first operating state. The device 10 may be a mobile or immobile device, like a mobile phone, smartphone, mobile computer, like a tablet computer, and/or mobile music playback means.

The device 10 comprises a multi-aperture imaging device 11 comprising an image sensor 12, an array 14 of optical channels 16 arranged next to one another and beam-deflecting means 18. The beam-deflecting means 18 is configured to deflect an optical path 17 of the optical channels 16 and will be discussed in greater detail below. The device 10 comprises a housing 22 comprising external surfaces 23 which enclose a housing volume 24. This means that the housing volume 24 may comprise an internal volume of the housing 22 and the volume of the housing 22. The housing volume thus also includes a volume taken by the housing walls and is thus enclosed by the external surfaces 23 of the housing. The housing 22 may be formed to be transparent or opaque and exemplarily comprise plastic materials and/or metal materials. The beam-deflecting means 18 comprises a first position within the housing volume 24. Holes or openings in the housing sides, like for acoustic channels of microphones or for electrical contacts of the device 10, may be neglected when determining the housing volume 24. The housing 22 and/or components arranged within the housing 22 may block the optical path 17 of the optical channels 16 after being deflected by the beam-deflecting means 18 so that a field of view 26 arranged outside the housing 22 to be captured by the multi-aperture imaging device 11 may not be captured or only to a limited extent. The components may be an accumulator, boards, non-transparent regions of the housing 22 or the like. Expressed differently, another, maybe non-optical element may be arranged at a housing instead of a previous camera objective.

The housing 22 may comprise an aperture 28 through which the housing volume 24 is connected to an external volume 25 of the housing 22. The aperture 28 may temporarily be closed completely or partly by a cover 32. The first operating state of the device 10 may be an inactive operating state of the multi-aperture imaging device 11 in which the optical channels 16 are deflected, for example, to the inner side of the housing 22 or are not deflected.

In other words, the construction height of the setup of the multi-aperture imaging device is determined at least partly by the diameter of optics of the optical channels 16 (lenses). In one (maybe optimum) case, the extension of the mirrors (beam-deflecting means) in the thickness direction equals the extension of the lenses in this direction. However, the optical path of the optical channel 16 is restricted by the mirror 18. This results in a reduction in image brightness, said reduction being dependent on the field angle. The present embodiments solve this problem by moving parts of or the entire multi-channel camera setup so that, in the operating state of the camera, parts of the setup protrude beyond the housing of, for example, a smartphone, compared to a state of not using the camera. Moving the parts, for example the beam-deflecting means, may be done in a rotary manner (folding out), translatory manner (extending) or in a mixed manner. Similarly to known zoom objectives in compact cameras, the additional movements of parts or of the total system allow a minimum structural form in the non-usage mode of the camera and a larger structural form, optimized for realizing the technical function, in the usage mode of the camera.

Figure 1B:
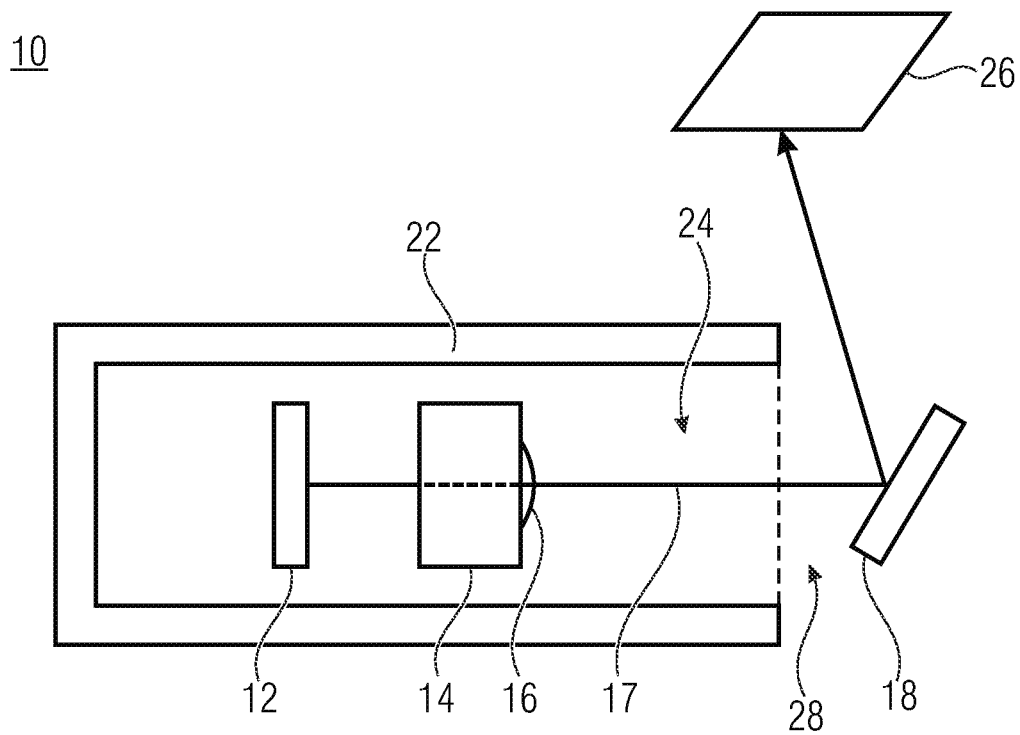
FIG. 1B is a schematic sectional side view of the device of FIG. 1A in a second operating state.

FIG. 1*b* shows a schematic sectional side view of the device 10 in a second operating state. In the second operating state, the beam-deflecting means 18 comprises a second position outside the housing volume 24. This allows the beam-deflecting means 18 to deflect the optical paths 17 of the optical channels 16 outside the housing volume 24 and the field of view 26 outside the housing 22 to be captureable by the multi-aperture imaging device 11. The cover 32 may be moved from the position shown in FIG. 1*a* so that the beam-deflecting means 18 may be moved from the housing volume 24 through the aperture 28 of the housing 22. The beam-deflecting means 18 may be moved between the first position and the second position in a translatory and/or rotary manner. It is of advantage here that the components within the housing 22 and/or the housing 22 do not block the deflected optical path 17 of the optical channels 16.

The multi-aperture imaging device 11 may be arranged within a camera housing which in turn is arranged at least partly within the housing 22. The camera housing may, for example, be formed at least partly by a displacement carriage, as is described in connection with FIG. 5. This differs from a concept in which a single-channel camera is oriented in different directions by means of a flipping mechanism in that, in the present case, rotation or tilting of an image sensor and/or the imaging optics may be avoided.

A total field of view may be captured by means of the device 10 such that the beam-deflecting means is moved, starting from the first position, to the second position where the beam-deflecting means is placed at least partly outside a housing volume. If the beam-deflecting means is in the second position, the total field of view may be captured using the array of optical channels of the multi-aperture imaging device arranged next to one another, the optical paths of which are deflected by the beam-deflecting means.

Figure 2A:
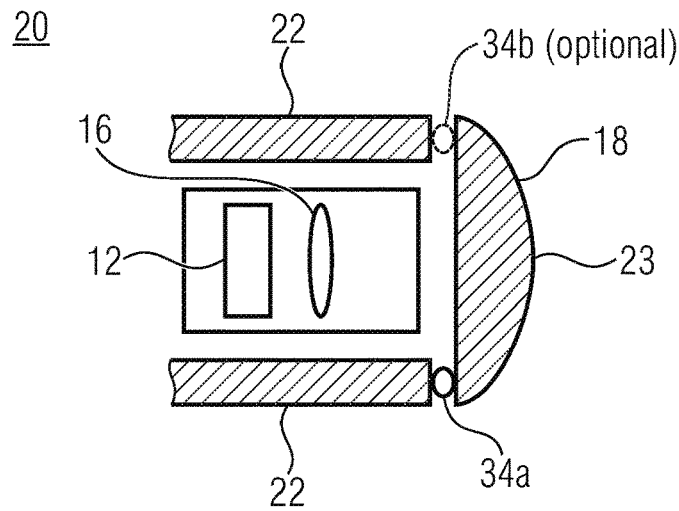
FIG. 2A is a schematic sectional side view of a device in accordance with another embodiment comprising a cover.

FIG. 2*a* shows a schematic sectional side view of a device 20 in accordance with another embodiment in a first operating state. The device 20 comprises the cover 23 which is supported to be rotatable at the housing 22, for example via a connective element 34*a* and/or via an optional connective element 34*b*. The connective element 34*a* and/or 34*b* may be configured to allow tilting and, thus, a rotary movement between the cover 23 of the beam-deflecting means 18 relative to the housing 22 and, for example, be formed as a hinge or roll bearing.

The beam-deflecting means 18 may form a cover of the housing or be part thereof. One of the beam-deflecting surfaces of the beam-deflecting means 18 may be an outer edge of the housing. The beam-deflecting means 18 comprises a first position and closes the housing 22 either partly or completely. The beam-deflecting means 18 may, for example, comprise a reflective region for deflecting the optical path 17 and may comprise contact regions configured to form a mechanical contact with the housing 22 in the first position. Expressed in a simplified manner, the camera is not or hardly visible when not being used.

Figure 2B:
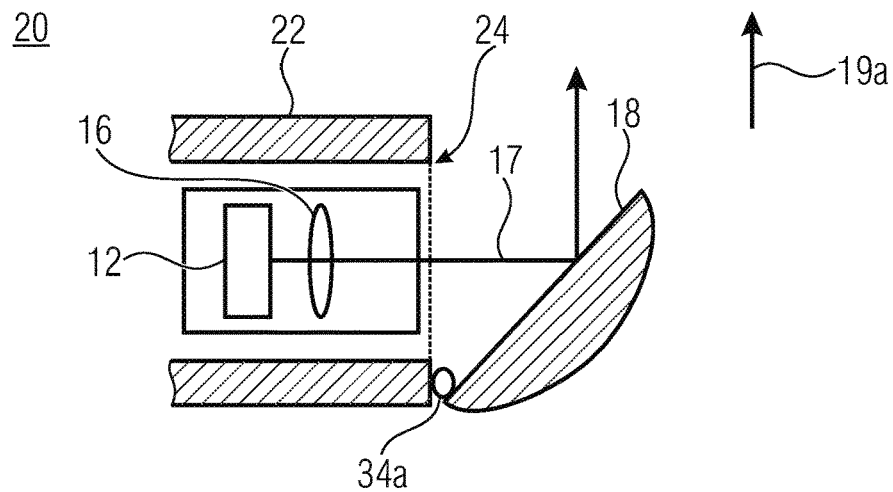
FIG. 2B is a schematic sectional side view of the device of FIG. 2A in a second operating state.

FIG. 2b shows a schematic sectional side view of the device 20 in a second operating state. In the second operating state, the beam-deflecting means 18 may be moved relative to the housing 22 in a rotary manner that is folded out, so that the housing volume 24 is opened. The rotary tilting allows an inclined or tilted orientation of the beam-deflecting means 18 relative to a course of the optical path 17 of the optical channels 16 between the image sensor 12 and the beam-deflecting means 18 so that the optical path 17 is deflected to a first direction 19a at the beam-deflecting means 18.

Figure 2C:
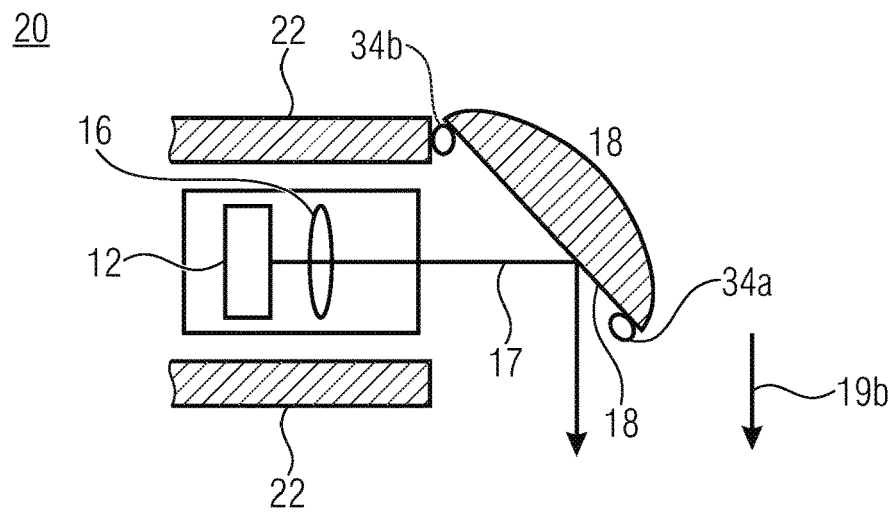
FIG. 2C is a schematic sectional side view of the device of FIG. 2A in a third position.

FIG. 2c shows a schematic sectional side view of the device 20 in a third position. The device 20 may exhibit the second operating state. Compared to the second position as is illustrated in FIG. 2b, the beam-deflecting means 18 may deflect the optical path 17 of the optical channels 16 to another direction 19b so that another field of view or a field of view positioned at a different location may be captured. This may, for example, be a first side and an opposite side, like the front side and back side, left and right or top and bottom of the device 20 and/or a user which the optical path 17 is deflected to. The connective elements 34a and 34b may, for example, be connected to a frame structure and the beam-deflecting means 18 so that the beam-deflecting means 18 may alternatingly comprise the second or third position. By means of a switchable viewing direction of the multi-aperture imaging device, previous solutions, in particular in smartphones, using two cameras with a viewing direction to the front and back, may be replaced by a single structure.

Figure 3A:
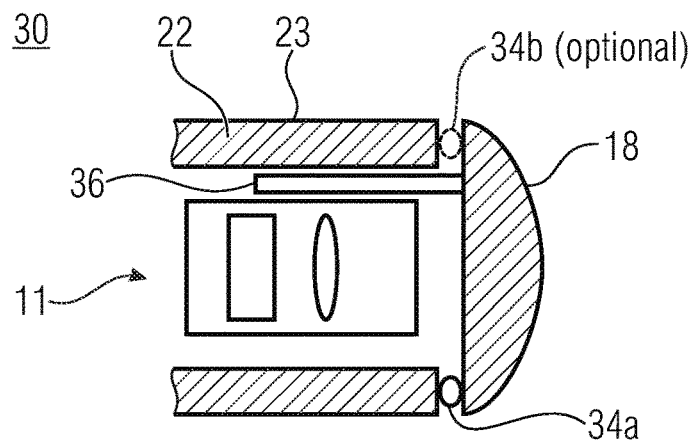
FIG. 3A is a schematic sectional side view of a device in accordance with another embodiment in the first operating state, comprising an at least partly transparent cover.

FIG. 3a shows a schematic sectional side view of a device 30 in accordance with another embodiment in the first operating state. Compared to the device 20, as is described in FIGS. 2a-c, the device 30 comprises an at least partly transparent cover 36 arranged between an outer edge 23 of the housing 22 and the multi-aperture imaging device 11. The at least partly transparent cover is connected to the beam-deflecting means 18 and configured to move based on a movement of the beam-deflecting means 18. The at least partly transparent cover 36 may, for example, comprise polymer and/or glass materials.

In other words, among other things, devices may be provided which allow encapsulation of the optics for protection from contamination, while changing the encapsulated volume is still possible (movable cover glasses).

Figure 3B:
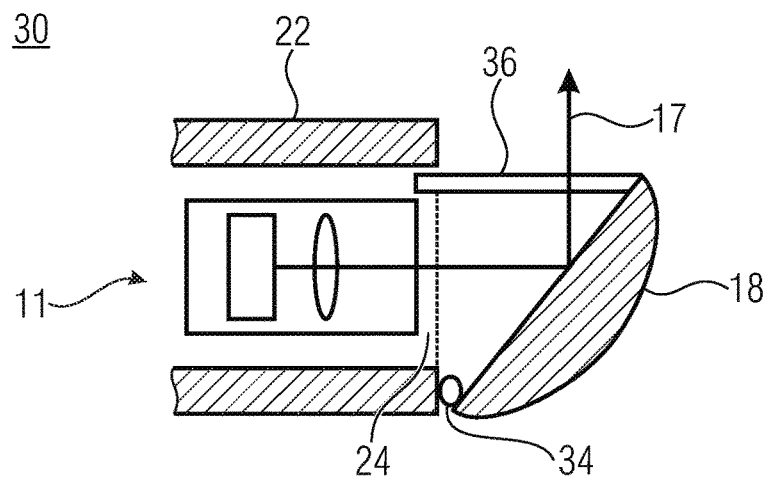
FIG. 3B is a schematic sectional side view of the device of FIG. 3A in the second operating state.

FIG. 3b shows a schematic sectional side view of the device 30 in the second operating state. Compared to the device 20 in FIG. 2b, the at least partly transparent cover is moved from the housing volume 24 at least partly. This may be done by a rotary movement of the beam-deflecting means around the connective element 34. The beam-deflecting means 18 is configured to deflect the optical path 17 of the optical channels 16 such that the optical channels pass through the at least partly transparent cover. The cover 36 is configured to reduce or prevent particles, dirt and/or humidity from entering the housing volume 24. Thus, the cover 36 may be formed to be transparent for the optical path 17 and/or implemented to be partly opaque. Exemplarily, the cover 36 may be untransparent for certain wavelength ranges of electromagnetic radiation. It is of advantage with the cover 36 that, due to the reduced amount of particles, dirt and/or humidity, a long operating time of the device and/or a permanently high image quality can be obtained since pollution of the optics of the optical channels is low.

Figure 3C:
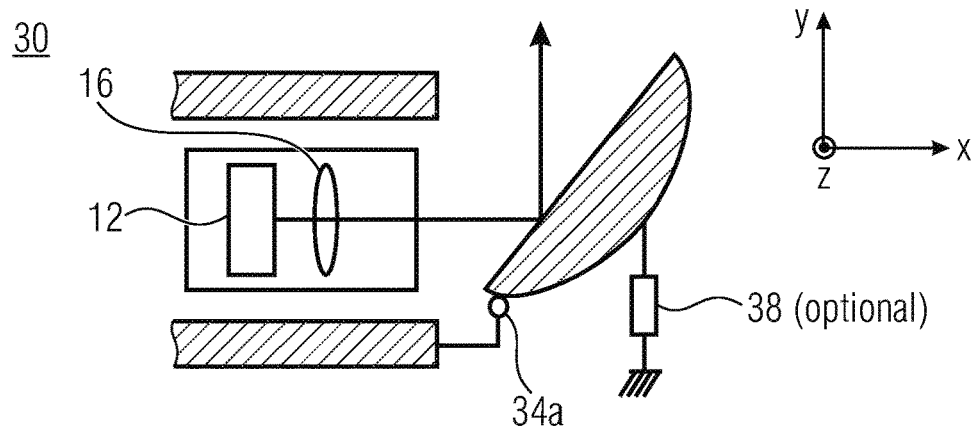
FIG. 3C is a schematic sectional side view of the device of FIG. 3A wherein beam-deflecting means is additionally movable in a translatory manner.

FIG. 3c shows a schematic sectional side view of the device 30 in which the beam-deflecting means 18 is movable by an optional actuator 38 in a translatory manner along a direction y perpendicular to a direction x of the optical path 17 between the image sensor 12 and the optical channels 16 and perpendicular to a direction z perpendicular to a line extension direction of the array of optical channels 16. The beam-deflecting means 18 may also be moved in a translatory manner based on the rotary movement around the connective element 34, for example using a guidance, a lever or the like. Folding out (rotary movement) may take place manually or using an actuator. The optional actuator 38 may be arranged at the beam-deflecting means 18. Alternatively, the actuator 38 may be arranged between the housing 22 and the beam-deflecting means 18. The actuator 38 may, for example, be arranged between the housing 22 and the connective element 34a and/or between the connective element 34a and the beam-deflecting means 18. It is of advantage here that shadowing of the field of view to be captured, by the housing 22, may be reduced by the translatory movement of the beam-deflecting means along the x direction of the housing.

FIG. 4a shows a schematic sectional side view of a device 40 in accordance with an embodiment in the first operating state. In the first position, the beam-deflecting means 18 is arranged within the housing volume on the housing 22 and configured to be moved from the first position to the second position based on a translatory movement 42, as is illustrated schematically in FIG. 4b. As is illustrated in FIG. 4a, the housing may comprise a cover 32 which closes the housing 22 or an aperture therein in the first operating state. In the first operating state, the beam-deflecting means 18 may be oriented such that it comprises a minimum extension perpendicular to a direction x defined by the optical path within the housing 22.

FIG. 4b shows a schematic sectional side view of the device 40 in the second operating state. The beam-deflecting means is moved from the housing volume 24 based on the translatory movement 42, for example along the x direction. The beam-deflecting means 18 here may be moved through the aperture 28. The beam-deflecting means 18 may be moved to be rotatable around a rotational axis 44. During the translatory movement between the first operating state and the second operating state, the beam-deflecting means 18 may execute a rotary movement around the rotational axis 44. An angular orientation of the beam-deflecting means may, compared to the first operating state of FIG. 4a, be changed such that the area of the beam-deflecting means used by the optical path of the multi-aperture imaging device increases compared to the first operating state. A rotary movement 46 around the rotational axis 44 allows a changeable inclination of the beam-deflecting means 18 relative to the optical path 17 between the optical channel 16 and the beam-deflecting means 18 and, thus, a changeable direction which the optical path 17 of the optical channels 16 is deflected to. The optical channels 16 may comprise optics 64a-b.

In the second operating state, in addition to the beam-deflecting means 18, optics 64a-b of the optical channels 16 and/or the image sensor 12 may be arranged outside the housing volume 24. Exemplarily, the optics 64a-b of the optical channels 16 and/or the image sensor 12 may be moved together with the beam-deflecting means 18, for example in a translatory manner. This allows a small to minimum distance between the optics 64a-b of the optical channels and the beam-deflecting means 18, in particular in the second operating state. The small distance allows a small area extension of the beam-deflecting means 18. An increasing distance would involve larger an area of the beam-deflecting means 18 and, for achieving equal imaging parameters, a larger distance of the optical channels in order to completely deflect the optical path of the optical channels 16. Due to the small or minimum distance, the beam-deflecting means 18 may also comprise a small area, which is of advantage since particularly a minimum extension in the y direction perpendicular to the x direction in the plane of view is achieved, and since a smaller component has to be moved and by a rotational movement, a thickness of the device only has to be increased slightly or not at all compared to a state where there is no beam-deflecting means 18. The small size also has an advantageous effect on the space involved, for example in the first or second operating state.

In other words, multi-aperture cameras having a linear channel arrangement comprise several optical channels arranged next to one another and transmitting respective parts of the total field of view each. Advantageously, a mirror is arranged in front of the imaging lenses, which may be used for beam deflection and contributes to reducing the construction height. In combination with a mirror adapted per channel, for example a facet mirror, wherein the facets may be curved in a planar or any way, or are provided with a free-form surface, it is also possible in an advantageous manner for the imaging optics of the optical channels to be of basically identical setup, whereas the viewing direction of the channels is predetermined by the individual facets of the mirror array. A surface of the beam-deflecting means is mirrored at least at the reflective facets associated to the optical channels. It is also possible for the imaging optics of the channels to be of different configurations so that different viewing directions result from the angle of the mirror facet and the design of the respective optical channel. It is also possible for several channels to use the same region of the beam-deflecting means and, thus, for the number of facets to be smaller than that of the channels. The deflecting mirror here may be supported in a rotatable manner, wherein the rotational axis is, for example, in parallel to the direction of the extension of the channels. The deflecting mirror may be reflective on both sides, wherein metallic or dielectric layers (sequences) may be employed. Turning the mirror may take place in an analog or bi-stable or multiply stable manner. Based on the rotary movement, the beam-deflecting means may be moved between at least a first positioning and a second positioning, wherein the optical paths are deflected in mutually different directions in every positioning. Similarly, as is described for the positionings of the beam-deflecting means 18 in FIGS. 2a-c, the beam-deflecting means may also be moved around a rotational axis. In addition to the translatory movement of the housing cover 32 and the beam-deflecting means 18, parts of or all the additional components of the multi-aperture imaging device may also be moved in the same direction in a translatory manner, wherein equal or different displacements paths are possible.

Figure 5A:
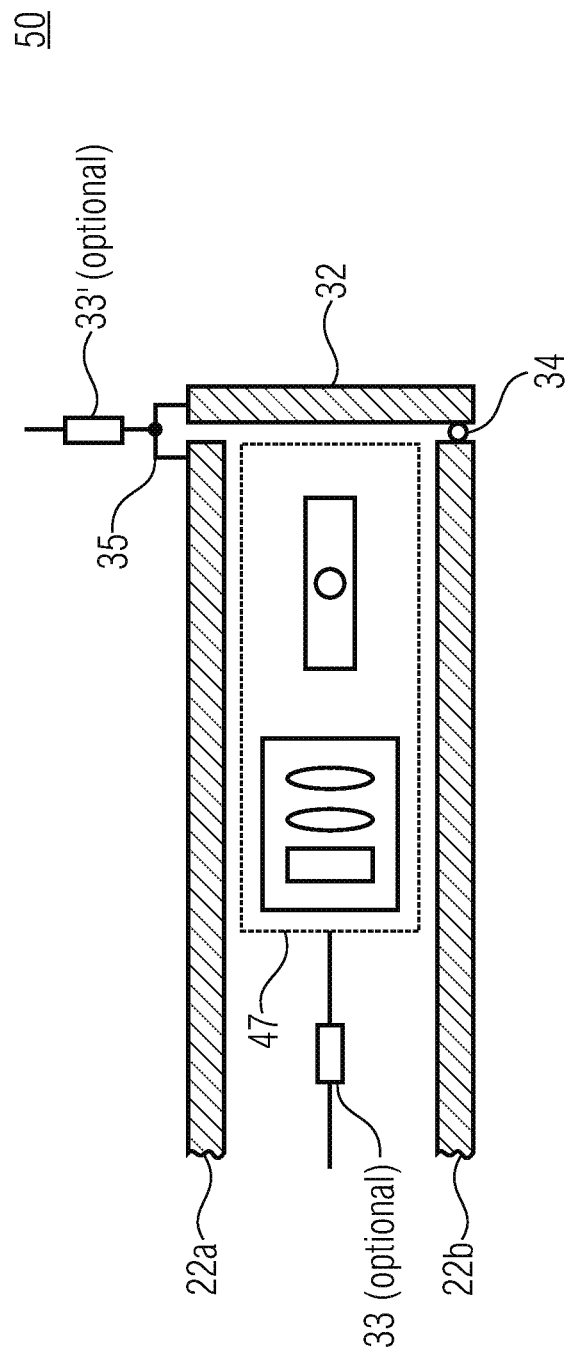
FIG. 5A is a schematic sectional side view of a device in accordance with an embodiment in which the cover is arranged to be movable in a rotary manner.

FIG. 5a shows a schematic sectional side view of a device 50 in which the cover 32 is arranged at a housing side 22b of the housing 22 to be movable in a rotary manner via the moving element 34. The beam-deflecting means 18 may be connected to a displacement carriage 47 in a mechanical manner. The displacement carriage 47 may be understood to be mechanical transport means for moving at least the beam-deflecting means 18. The device 50 may comprise an actuator configured to move the displacement carriage 47 in a translatory manner. The actuator may comprise any drive, like a stepper motor, a piezoelectric drive or a voice-coil drive. Alternatively or in addition to the actuator 33, the device 50 may comprise an actuator 33' configured to release a mechanical lock 35 locking the cover 32 and the housing to at least one housing side 22a. The beam-deflecting means or the displacement carriage 47 may, for example, be shiftable from the housing by means of a spring force when releasing the lock 33'. This means that the lock 35 may be configured to hold the beam-deflecting means 18 in the first position. The displacement carriage 47 may also be arranged in the device 40. This means that the displacement carriage 47 may also be employed with a translatory movement of the cover 32.

Figure 5B:
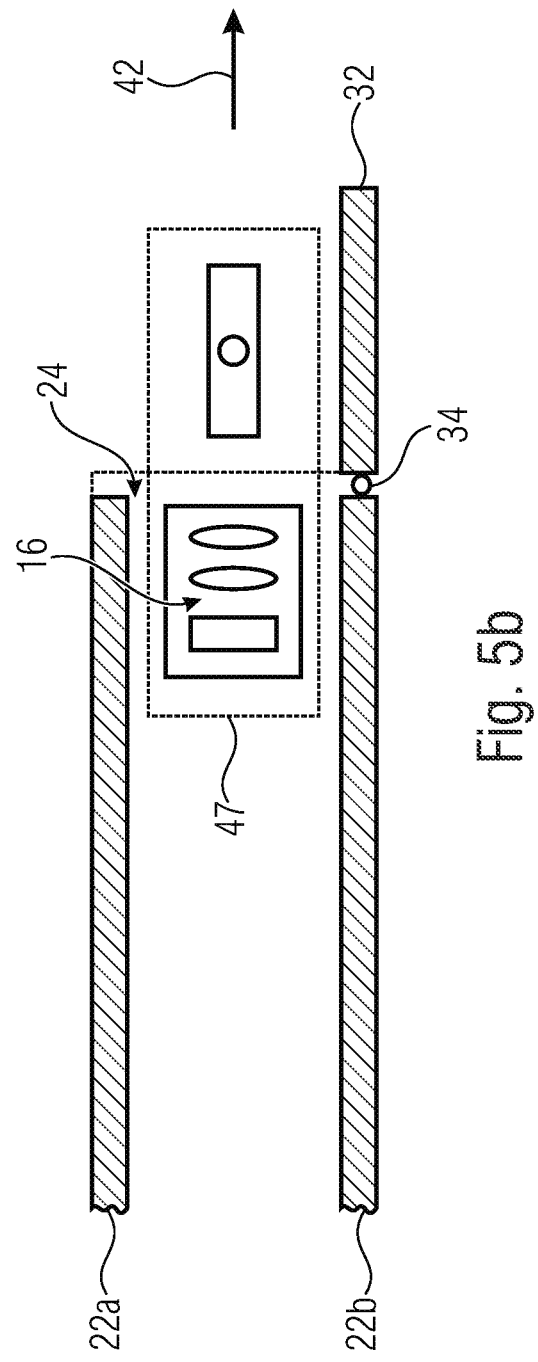
FIG. 5B is a schematic sectional side view of the device of FIG. 5A in which a displacement carriage is movable in a translatory manner.

FIG. 5b shows a schematic sectional side view of the device 50 in which the displacement carriage 47 is moved along the translatory direction of movement 42 so that the beam-deflecting means 18 is moved from the housing volume 24. The image sensor 12 and/or optics of the optical channels 16 may also be connected mechanically to the displacement carriage 47 and may be moved to the same extent with the beam-deflecting means 18.

Alternatively, the image sensor 12 and/or the optics of the optical channels 16 may be movable to a lesser extent than the beam-deflecting means 18 so that a distance between the image sensor 12, the optics and/or the beam-deflecting means 18 is increased while moving out. Alternatively or additionally, the image sensor 12 and/or the optics of the optical channels may be arranged at a fixed location relative to the housing so that only the beam-deflecting means 18 is moved by means of the displacement carriage 47. An increasing distance between the image sensor 12, the optics and/or beam-deflecting means 18 while moving out allows a small distance of the components in the first operating state so that the multi-aperture imaging device may be accommodated in the housing 22 entailing small space requirements.

FIG. 5c shows a schematic sectional side view of the device 50 in the second operating state. The beam-deflecting means may be supported rotatably so as to execute the rotary movement 46, as is described for the device 40, for example. As is described in connection with FIG. 4b, the angular orientation of the beam-deflecting means 18 may be altered compared to the first operating state of FIG. 5a or the state in FIG. 5b so that the area of the beam-deflecting unit used by the optical path of the multi-aperture imaging device increases compared to the first operating state. A side of the beam-deflecting means 18 facing the optical channels 16 or image sensor 12 may exhibit a dimension B perpendicular to the translatory direction of movement 42, for example along the y direction, which is greater than a dimension A of the image sensor 12 or the optical channels 16 along this direction. The dimension B is, for example, perpendicular to a line extension direction of the array and parallel to a surface of an image sensor which the optical channels impinge on. The result of this may be that a high degree of light is deflectable by the beam-deflecting means 18 and brightness of an image to be captured is high. In the positioning shown in FIG. 5a, the extension or dimension B is smaller than in the positioning shown in FIG. 5c, or a positioning where the beam-deflecting means 18 directs the optical path to a different viewing direction.

FIG. 6a shows a schematic sectional side view of a device 60 in accordance with an embodiment in the first operating state. The beam-deflecting means 18 comprises the first position. Compared to the device 40 and the device as is described in FIGS. 4a and 4b, the device 50 comprises at least partly transparent covers 36a and 36b which are connected to the cover 32 and are movable in connection with same along the translatory direction of movement 42. The at least partly transparent covers 36a and 36b may each be arranged at mutually different sides of the beam-deflecting means 18 between same and the housing 22. In the first operating state, the covers 36a and 36b may be arranged to be partly or completely within the housing volume 24. The covers 36a and 36b may, for example, be arranged at the displacement carriage 47 illustrated in FIGS. 5a-c or be transparent regions of the displacement carriage 47.

FIG. 6b shows a schematic sectional side view of the device 60 in which the beam-deflecting means 18 comprises an intermediate position between the first position and the second position. The intermediate position of the beam-deflecting means may, for example, be obtained while retracting or extending the beam-deflecting means 18 into the housing volume 24 or from the housing volume 24, respectively. The beam-deflecting means 18 is partly moved from the housing volume 24.

FIG. 6c shows a schematic sectional side view of the device 60 in which the beam-deflecting means 18 comprises the second position, that is the beam-deflecting means 18 is, for example, completely moved from the housing volume 24. The at least partly transparent covers 36a and 36b comprise a mutual distance 48 which is smaller than a comparable distance between side areas of the housing 22a and 22b.

FIG. 6d shows a schematic sectional side view of the device 60 in which a distance of the at least partly transparent covers 36a and 36b is increased compared to FIGS. 6a-c. The at least partly transparent covers 36a and/or 36b may be movable along a translatory direction of movement 52a and 52b facing away from the respective other at least partly transparent covers 36a and 36b, for example along a positive or negative y direction. The state of the at least partly transparent covers 36a and 36b illustrated in FIGS. 6a-c may be understood to be a retracted or collapsed state. The state illustrated in FIG. 6d may be understood to be an extended or folded-out state where a distance 48' between the at least partly transparent covers 36a and 36b is altered compared to the distance 48, for example increased. The distance 48' may, for example, be greater than or equal to the distance between the comparable sides of the housing 22. The beam-deflecting means 18 is configured to deflect the optical paths of the optical channels such that they pass through the at least partly transparent covers 36a and/or 36b. As is described in connection with FIG. 4b, FIG. 5a and FIG. 5b, the angular orientation of the beam-deflecting means 18 may be altered compared to the first operating state of FIG. 6a or the state in FIG. 6b or 6c so that the area of the beam-deflecting unit used by the optical path of the multi-aperture imaging device increases compared to the first operating state. The increased distance 48' may, alternatively or additionally, allow an increased extent of the rotary movement 46. Using the rotary movement 46, the beam-deflecting means 18 may be switchable between at least a first and another positioning, wherein each positioning may be associated to a viewing direction of the multi-aperture imaging device. Turning the mirror may take place in an analog or bistable or multiply stable manner. The rotary movement 46 for altering a viewing direction of the multi-aperture imaging device may be combined with a rotary movement of the beam-deflecting means 18 for optical image stabilization, which is described in connection with FIG. 12. The covers 36a and/or 36b may encapsulate the other components of the multi-aperture imaging device.

The covers 36a and/or 36b arranged to be opposite, or transparent regions thereof, may comprise a switchable diaphragm so that the switchable diaphragm may, for example, be introduced above and/or below or along any other direction of the beam-deflecting means. The diaphragm may be switched according to the operating state and viewing direction of the camera. Exemplarily, an unused viewing direction of the multi-aperture imaging device may be closed by the diaphragm at least partly so as to reduce the amount of stray light entering. The diaphragms may be moved mechanically or be electro-chrome, for example. The regions influenced by the diaphragm may additionally be equipped with a switchable diaphragm which covers the optical structure in the case of not being used. The diaphragm may be controllable electrically and comprise an electro-chrome layer (sequence). The diaphragm may comprise a mechanically moved part. Moving may take place using pneumatic, hydraulic, piezoelectric actuators, DC motors, stepper motors, thermal actuators, electrostatic actuators, electrostrictive and/or magnetostrictive actuators or drives. In one state of the multi-aperture imaging device where the viewing direction penetrates a diaphragm, the diaphragm may be switched so as to transmit the optical paths of the optical channels. This means that the multi-aperture imaging device may comprise a first operating state and a second operating state. The beam-deflecting means may deflect the optical path of the optical channels in the first operating state such that same passes through a first transparent region of the cover 36a. In the second operating state, the optical path of the optical channels may be deflected such that same passes through a second transparent region of the cover 36b. A first diaphragm 53a may be configured to optically close the first transparent region in the second operating state at least partly. A second diaphragm 53b may be configured to optically close the second transparent region in the first operating state at least partly at times. Thus, stray light may be reduced from entering from a direction which is not the current viewing direction of the multi-aperture imaging device, which has an advantageous effect on the image quality. The first and/or second diaphragms 53a-b may be effective for at least one, for at least two or for all the optical channels. Exemplarily, at least one, at least two or all the optical channels of the multi-aperture imaging device may pass through the first diaphragm when the optical path of the optical channels is directed through the first transparent region, and pass through the second diaphragm when the optical path of the optical channels is directed through the second transparent region.

It is pointed out that it is possible to combine a mechanism for folding out the beam-deflecting means in accordance with FIGS. 2 and 3 with a mechanism for a translatory movement, that is there may be mixtures thereof. Folding out the housing and/or extending the beam-deflecting means may take place such that the imaging module, that is the optical channels, optics thereof and/or the image sensor, may be moved from the housing volume. An angular change of the beam-deflecting means may allow an extension of the multi-aperture imaging device to be great in the thickness direction and/or the beam-deflecting means to deflect the optical path to the "front" and "back" in an unhindered manner. Cover glasses, like the covers 36, may also be fixed relative to the elements folded out or extended. The cover glasses may comprise any planar or non-planar areas.

Figure 7:
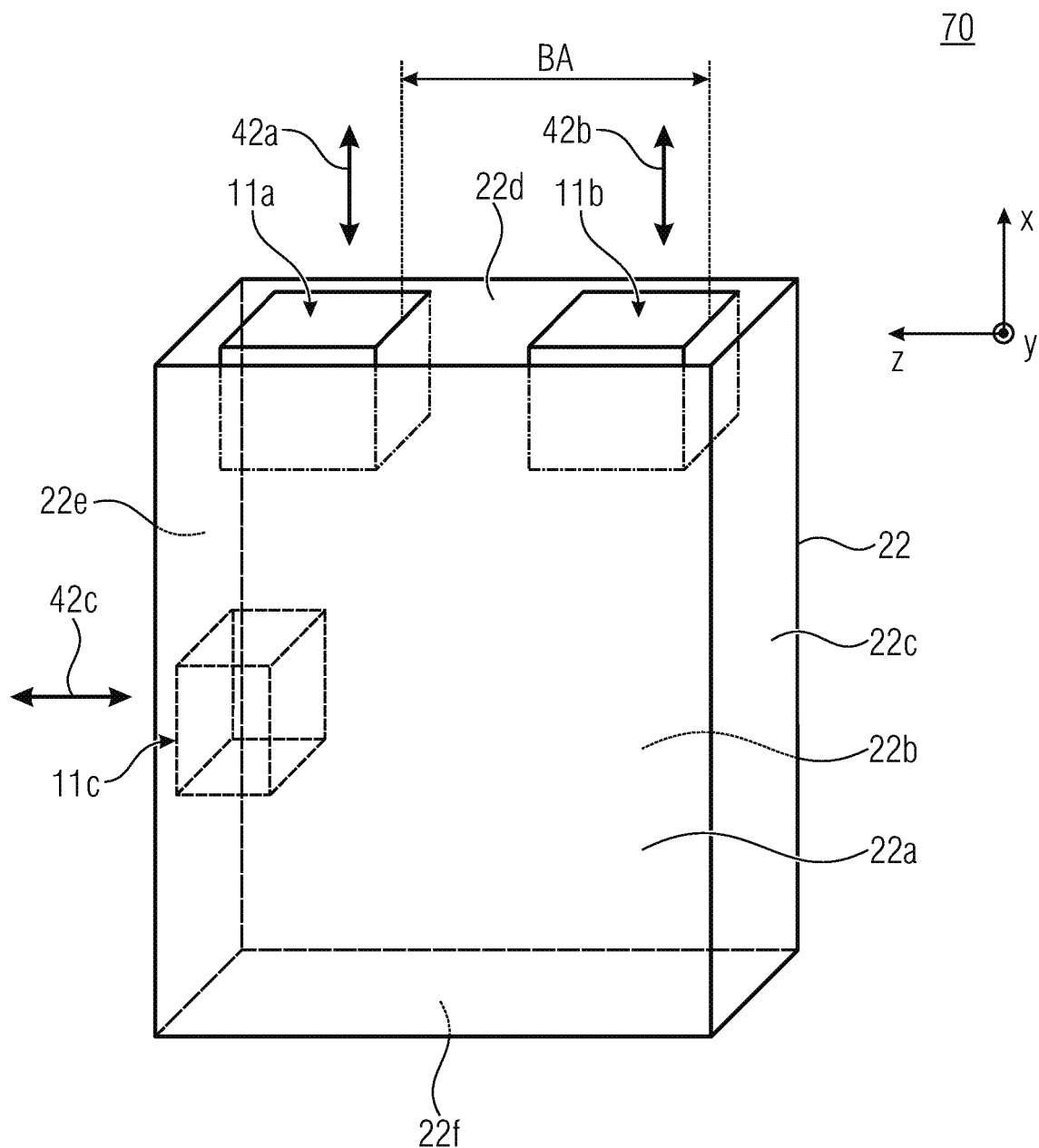
FIG. 7 is a schematic perspective view of a device in accordance with an embodiment, comprising three multi-aperture imaging devices.

FIG. 7 shows a schematic perspective view of a device 70 in accordance with an embodiment, comprising three multi-aperture imaging devices 11a-c. The multi-aperture imaging devices 11a-c may be movable along a respective translatory direction of movement 42a-c in a translatory manner. The multi-aperture imaging devices 11a-c may be arranged in secondary sides 22c-f of the housing 22. The housing may be formed to be flat, which means that a first extension of the housing 22 along a first housing direction, or an x direction, and a second extension of the housing 22 along a second housing direction, for example a z direction, may comprise at least three times a dimension, at least five times or at least seven times a dimension compared to a third extension of the housing 22 along a third housing direction, like the y direction. A main side 22a and/or 22b of the housing 22 may comprise the first and second dimensions and may exemplarily be arranged in parallel to an x/z plane in space. The secondary sides 22c-f may connect the main sides 22a and 22b or be arranged therebetween.

The multi-aperture imaging devices 11a and 11b may be arranged in or at the same side 22d in the housing 22 and may, for example, comprise a mutual basic distance BA, for example for the purpose of stereoscopy. More than two modules would also be conceivable. Thus, the total field of view may, for example, be captured stereoscopically or higher by using the multi-aperture imaging device 11c and at least one further multi-aperture imaging device 11a and/or 11b. The multi-aperture imaging devices 11a, 11b and/or 11c may be movable individually. Alternatively, two or more modules may also be movable together as a total system.

As will be described below in further detail, the device 70 may be configured to capture a total field of view at least stereoscopically. The total field of view is, for example, arranged at one of the main sides 22a or 22b, but may also be arranged at a secondary side 22c-f. The multi-aperture imaging devices 11a-c may, for example, each capture the total field of view. Although the multi-aperture imaging devices 11a-c are illustrated to be arranged to be spaced apart from one another in space, the multi-aperture imaging devices 11a, 11b and/or 11c may also be arranged to be spatially neighboring or in a combined manner. The arrays of imaging devices 11a and 11b which may, for example, be formed in single lines, may be arranged to be next to one another or in parallel to one another, as is, for example, described in connection with FIG. 13b. The arrays may form lines among one another, each multi-aperture imaging device 11a and 11b comprising a single-line array. The imaging devices 11a and 11b may comprise common beam-deflecting means and/or a common support of optics of the optical channels and/or a common image sensor.

Figure 8:
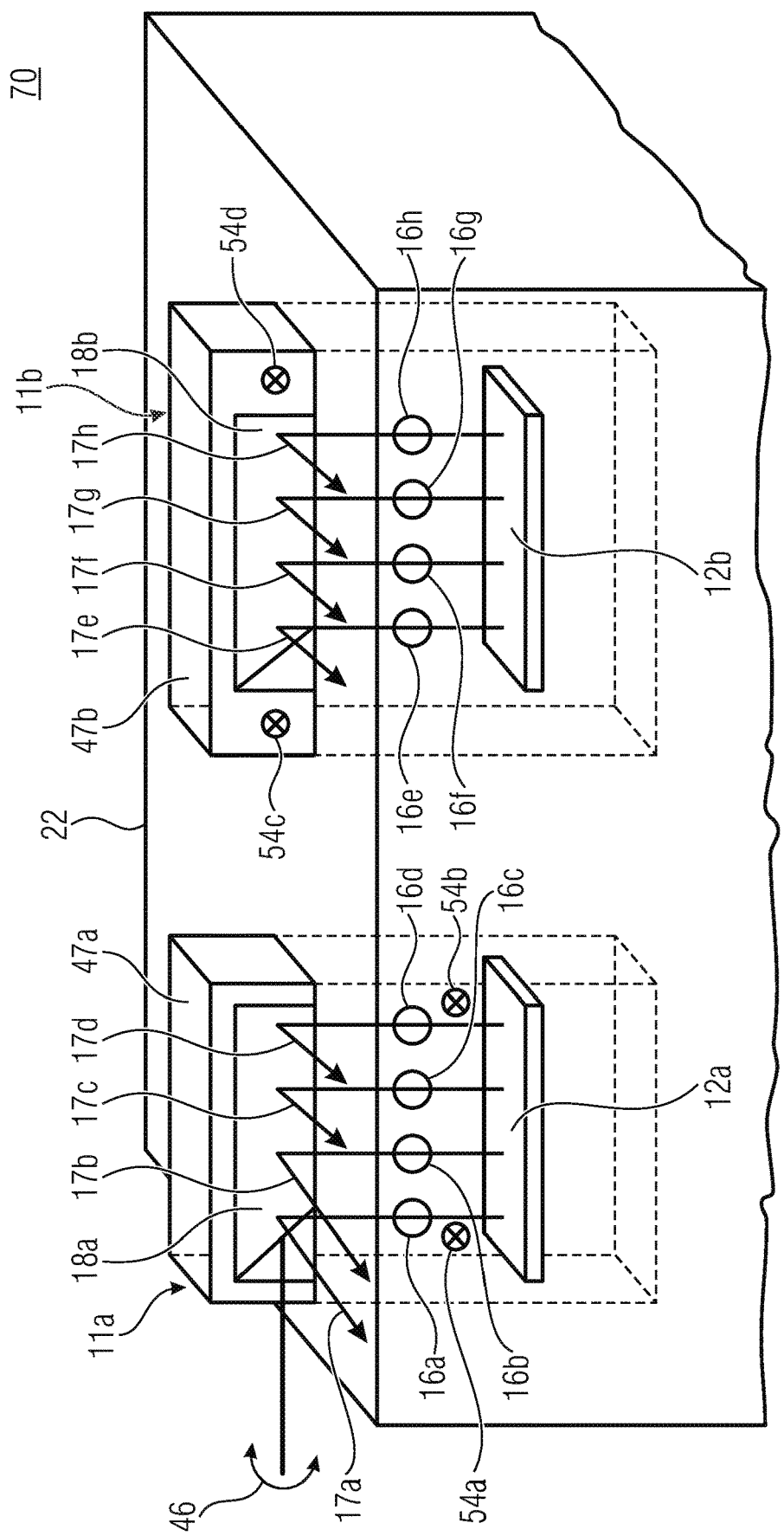
FIG. 8 is an enlarged perspective view of a section of the device of FIG. 7.

FIG. 8 shows an enlarged perspective view of a section of the device 70 and the multi-aperture imaging devices 11a and 11b. The device 70 has the second operating state. Exemplarily, the multi-aperture imaging device 11a and/or 11b protrude/s beyond the original housing side. The beam-deflecting means 18a and 18b are moved to be at least partly outside the housing volume, based on the translatory directions of movement 42a and 42b. Alternatively, in the second operating state, only part of the beam-deflecting means of the multi-aperture imaging devices 11a-c may be moved from the housing volume of the housing 22.

The multi-aperture imaging devices 11a-b exemplarily comprise four optical channels 16a-d and 16e-h each. The beam-deflecting means 18a and 18b are each configured to deflect the optical paths 17a-d and 17e-h of the optical channels 16a-d and 17e-h, respectively. As will be described below in greater detail, other multi-aperture imaging devices may comprise mutually different numbers of optical channels. The multi-aperture imaging devices 11a-b may comprise an equal or mutually different number/s of optical channels.

The multi-aperture imaging devices 11a and 11b each comprise illumination means 54a and 54b and 54c and 54d, respectively. The illumination means 54a-d are configured to illuminate the total field of view to be captured at least partly and may, for example, each be configured to illuminate a center of the total field of view (object region) to be captured. In accordance with an embodiment, at least one of the illumination means 54a or 54b and 54c or 54d may be arranged such that it illuminates the total field of view along a mean viewing direction of the optical channels 16a-d and 16e-h. The total field of view may comprise mutually different partial fields of view which are each captured by at least one optical channel 16a-d and 16e-h. A mean viewing direction of optical channels 16a-d or 16e-h may, for example, be a geometrical mean of the viewing directions or a median value of the viewing directions.

The illumination means 54a-b and 54c-d may be operated as a flashlight of the respective multi-aperture imaging device 11a or 11b and comprise any light source. Advantageously, the light source may, for example, be implemented to be a light-emitting diode (LED), since these exhibit small space requirements and low an energy consumption. In accordance with further embodiments, a multi-aperture imaging device may comprise no, one or more than two illumination means 54a-d, wherein the number of illumination means 54a-d of the multi-aperture imaging device may differ from other multi-aperture imaging devices of a device, or be equal. At least one of the illumination means 54a-d may be configured to illuminate several object regions. Exemplarily, light may optionally be emitted from the illumination means in one or in several directions. The illumination means can emit light along at least two viewing directions of the multi-aperture imaging device. Here, the illumination means may comprise at least two light sources. The light sources can emit light in opposite sides of the device. One light source each may, for example, be applied to a top and a bottom side, front and back side and/or left and right side of the displacement carriage 47, wherein only the respective light source/s of that side will be used which is opposite the object region to be captured in correspondence with the selected orientation and, thus, the operating state of the beam-deflecting means 18 and in the direction of which light is emitted. The front, back, top and bottom side mentioned above and the terms left or right only serve illustration purposes and are not to be construed to be restrictive, since they are mutually exchangeable in connection with the respective orientation in space. This means that light sources 54i may, for example, be arranged on the front and back side of the displacement carriage 47b and corresponding light sources be used depending on the positioning of the beam-deflecting means 18b. The other, opposite light sources may remain unused.

The illumination means 54a and 54b are, for example, arranged between the beam-deflecting means 18a and the image sensor 12a of the multi-aperture imaging device 11a. The beam-deflecting means 18 may be configured to deflect illumination radiation emitted by the illumination means 54a and/or 54b, for example flashlight. The illumination means 54a-b may be arranged within the housing volume in the first operating state and in the second operating state of the device 70. The illumination radiation may, at least partly, be part of the optical paths 17a-d. As is illustrated for the multi-aperture imaging device 11b, for example, illumination means 54c and/or 54d may be arranged to be laterally next to the beam-deflecting means at the displacement carriage 47b. The illumination means 54c and 54d may be moved into the housing 22 or from the housing 22 using the translatory movement 42b. Although the illumination means have been described in connection with the device 70, other devices or multi-aperture imaging devices described here may also comprise illumination means.

The illumination means 54c and 54d may be mechanically connected to the displacement carriage 47a and be arranged within the volume 24 in the first operating state and, thus, be arranged not to be visible for a user. The illumination means 54a and 54b may alternatively and/or additionally be arranged in the housing 22 to be stationary. Moving the displacement carriage 47b may cause a movement of the illumination means 54c and 54d.

Optics 16a-d or 16e-f and, maybe, the image sensor 12a or 12b may, together with the beam-deflecting means 18a and 18b, respectively, be moved from the housing volume by moving the displacement carriage 47a and 47b.

In other words, LEDs may be applied to the movable parts for realizing additional illumination (flashlight). The LEDs may be arranged such that these radiate in the mean direction of the channels or the beam-deflecting means may hold further regions used for deflecting the radiation.

Figure 9:
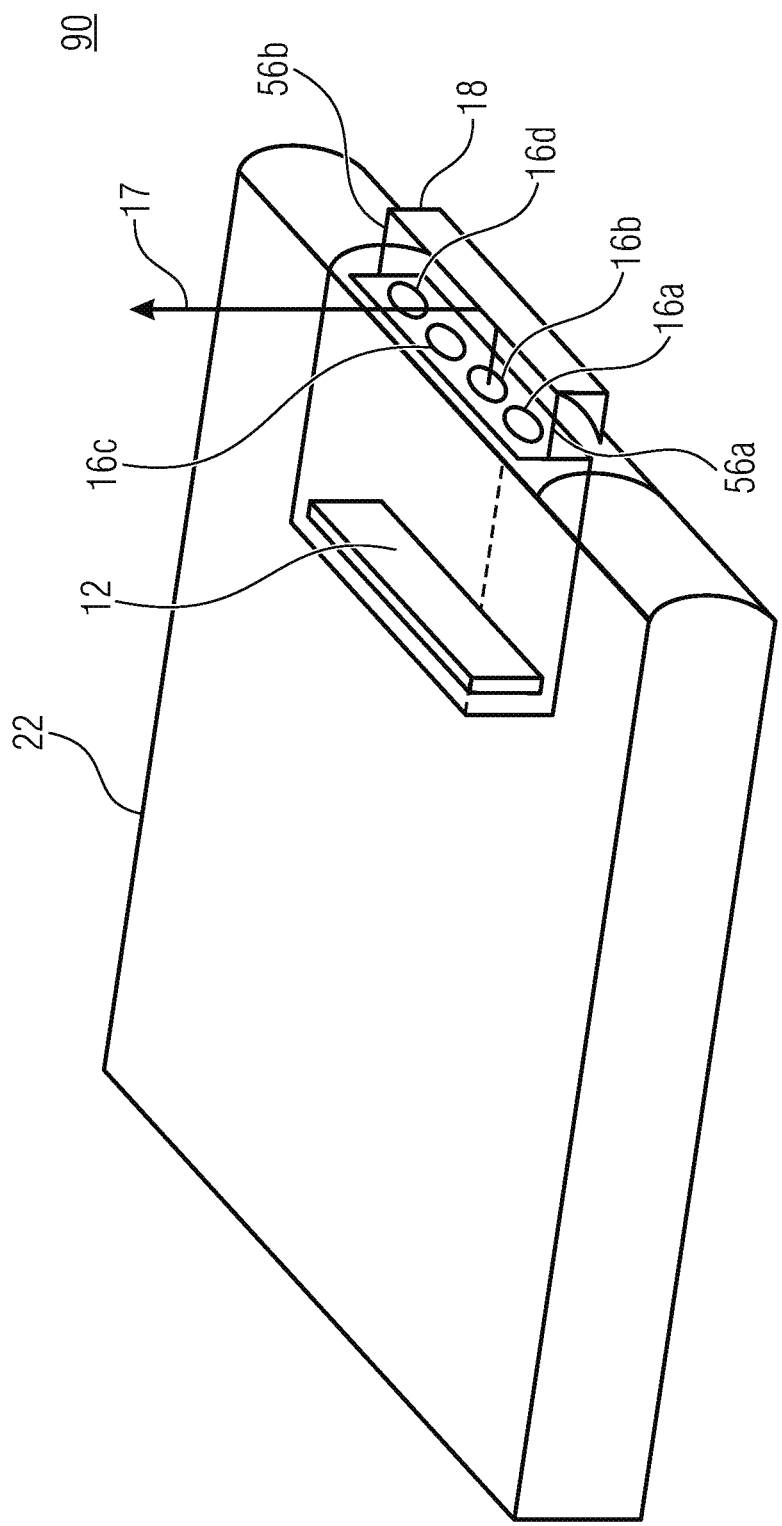
FIG. 9 is a schematic perspective view of a device in accordance with an embodiment, in which the beam-deflecting means is connected to the multi-aperture imaging device by means of mounting elements.

FIG. 9 shows a schematic perspective view of a device 90 in accordance with an embodiment, comprising the second operating state. The beam-deflecting means 18 may be connected to the multi-aperture imaging device by means of mounting elements 56a and 56b. The mounting elements 56a and 56b may be part of a displacement carriage.

Figure 10A:
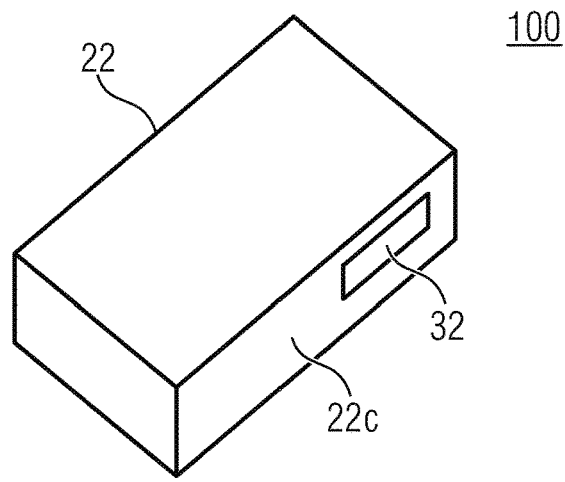
FIG. 10a is a schematic perspective view of a device in accordance with an embodiment in the first operating state, comprising an exemplary shape of a cover.

FIG. 10a shows a schematic perspective view of a device 100 in accordance with an embodiment in the first operating state. The cover 32 may form one plane with a housing main side and/or a housing secondary side, for example the housing secondary side 22c. There may be no gap between the cover 32 and the housing side 22c, or only a small gap, like smaller than or equaling 1 mm, smaller than or equaling 0.5 mm or smaller than or equaling 0.1 mm, so that a transition between the cover 32 and the housing side 22c cannot be perceived or hardly be perceived. Expressed in a simplified manner, the cover 32 may not be visible.

Figure 10B:
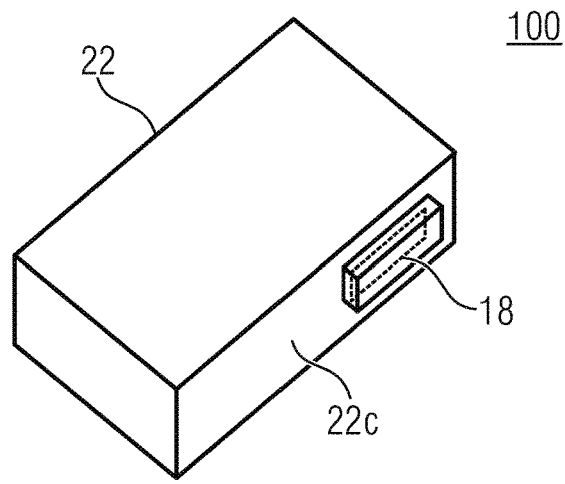
FIG. 10b is a schematic view of the device of FIG. 10A in the second operating state in accordance with an embodiment.

FIG. 10b shows a schematic view of the device 100 in the second operating state. The beam-deflecting means 18 comprises the second position outside the housing volume. Viewed from outside, the extended multi-aperture imaging device may be enclosed by the stationary housing frame on all sides and/or have the appearance of a button. The device 100 may, for example, be configured to release a mechanical lock with a mechanical pressure on the cover 32 in accordance with FIG. 10a so that the beam-deflecting means may be moved from the housing 22, for example based on a spring force. The mechanical pressure may, for example, be generated by an actuator and/or by a user, for example pressure by a finger. From the second position, the beam-deflecting means may be moved again to the first position by means of an actuator or by means of the mechanical pressure, and actuate a lock there. The actuator may, for example, be the actuator 33 or 33'. In other words, movement may also take place manually so that the user by his or her own force extends or retracts or folds in and out parts of or the entire system. The movement may, in particular, be a combination of manual actuation and a spring force effect. Thus, the user manually folds or pushes parts or the entire system into the housing of the apparatus, for example of a smartphone, for switching off the camera, thus biasing a spring, and a locking mechanism holds this positioning. When switching on the camera, for example by means of suitable software on the smartphone, the switchable locking mechanism is released by a suitable controllable mechanism, like an electro relay, and the spring force of the spring causes parts of the camera or the entire system to extend or fold out. Furthermore, the cover which forms part of the housing, the extendable and/or tiltable part and/or another mechanism positioned here may be implemented such that a (finger) pressure on this cover releases the locking, parts or the entire system extend/s or is/are folded out and, maybe, image taking software on the apparatus starts. The cover, which is also moved, which may form part of the housing at the secondary surfaces, may be enclosed by the stationary housing on all sides while still be visible from outside, or interrupt the secondary surfaces over the entire height (=thickness direction of the housing).

Figure 10C:
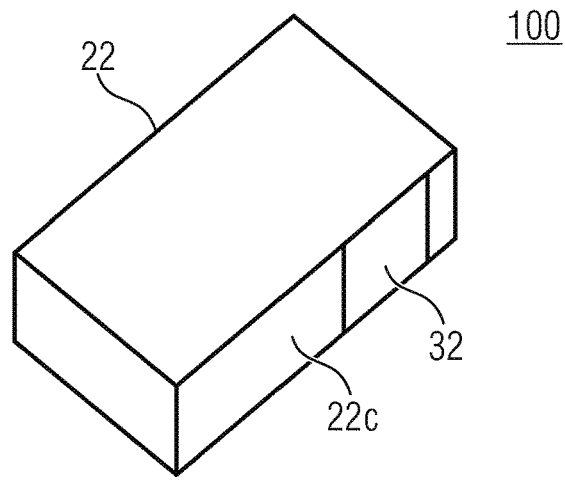
FIG. 10c is a schematic illustration of an alternative to FIG. 10a in accordance with an embodiment.

FIG. 10c shows a schematic illustration of an alternative to FIG. 10a in which the cover 32 is formed such that a continuous gap is formed in the secondary side 22c between the main sides of the housing 22. This allows only two instead of four columns illustrated in FIG. 10a to be perceivable in the housing 22. The extendable cover 32 and/or further covers may be formed to be part/s of the housing 22 at one or several secondary sides of the flat housing.

Subsequently, reference will be made to some possible embodiments of the multi-aperture imaging device as may be used in accordance with embodiments.

Figure 11A:
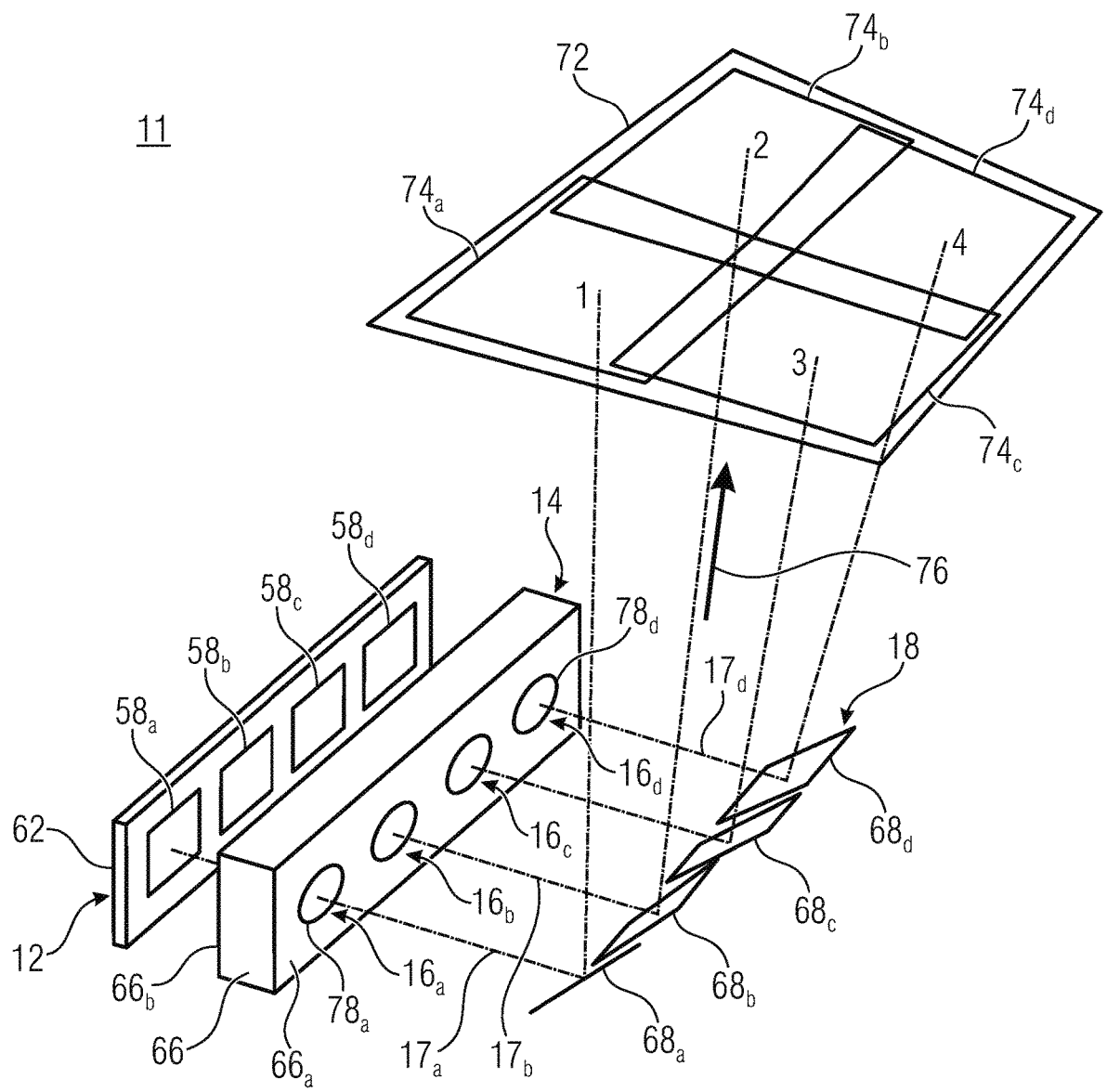
Figure 11B:
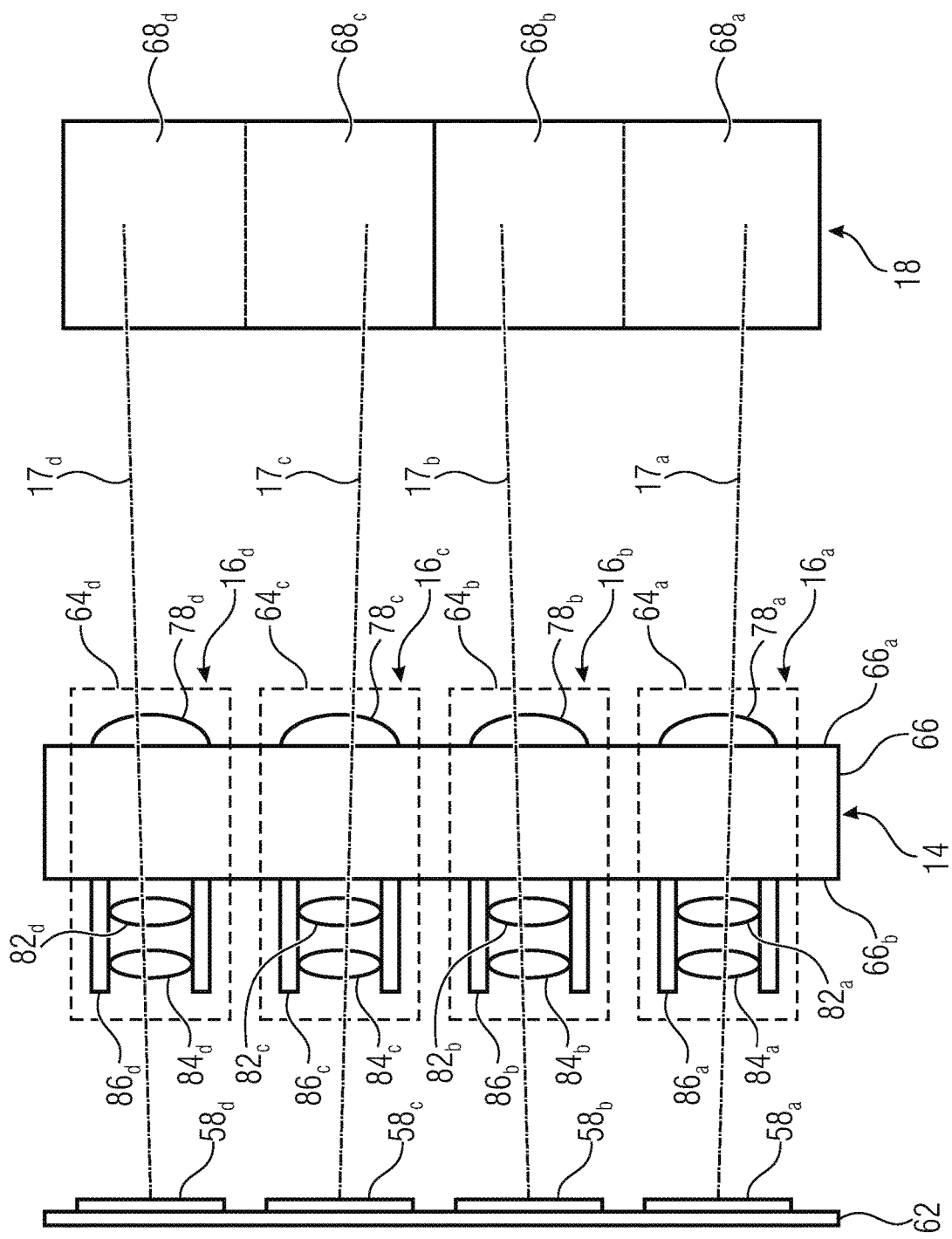

FIGS. 11a-c show a multi-aperture imaging device 11 in accordance with an embodiment of the present invention. The multi-aperture imaging device 11 of FIGS. 11a-c comprises a single-line array 14 of optical channels 16a-d arranged next to one another. Each optical channel 16a-d comprises optics 64a-d for imaging a respective partial field of view 74a-d of a total field of view 72 of the device 11 onto a respective associated image sensor region 58a-d of an image sensor 12. The image sensor regions 58a-d may, for example, each be formed from a chip which comprises a corresponding pixel array, wherein the chips, as is indicated in FIGS. 11a-c, may be mounted on a common substrate or a common board 62. Alternatively, it would, of course, also be possible for the image sensor regions 58a-d each to be formed from a part of a common pixel array which extends continuously over the image sensor regions 58a-d, wherein the common pixel array is, for example, formed on a single chip. In this case, only the pixel values of the common pixel array in the image sensor regions 58a-d are read out. Different mixtures of these alternatives are also possible of course, for example one chip for two or several channels and another chip for again different channels or the like. In the case of several chips of the image sensor 12, these may, for example, be mounted on one or several boards, for example all together or in groups or the like.

In the embodiment of FIG. 11a-c, four optical channels 16a-d are arranged next to one another in a single line in the line extension direction of the array 14, but the number four here is only exemplary and may also be any other number greater than one. In addition, the array 14 may also comprise further lines extending along the line extension direction.

Optical axes or the optical paths 17a-d of the optical channels 16a-d are parallel to one another between the image sensor regions 58a-d and the optics 64a-d. In addition, the image sensor regions 58a-d are, for example, arranged in a common plane, as are the optical centers of the optics 64a-d. Both planes are parallel to each other, that is parallel to the common plane of the image sensor regions 58a-d. Additionally, in the case of being projected perpendicularly onto the plane of the image sensor regions 58a-d, optical centers of the optics 64a-d coincide with centers of the image sensor regions 58a-d. In other words, in these parallel planes, the optics 64a-d on the one hand and the image sensor regions 58a-d are arranged in the line extension direction in equal repeat distances.

An image-side distance between the image sensor regions 58a-d and the respective optics 64a-d is adjusted such that imaging onto the image sensor regions 58a-d is adjusted to a desired object distance. The distance is, for example, in a region equaling or greater than the focal length of the optics 64*a-d* or, for example, in a range between one time and two times the focal length of the optics 64*a-d*, including both. The image-side distance along the optical axis 17*a-d* between the image sensor region 58*a-d* and optics 64*a-d* may also be adjustable, for example manually by a user or automatically via autofocus control.

Without additional measures, the partial fields of view 74*a-d* of the optical channels 16*a-d* overlap basically completely, due to the parallelity of the optical paths or optical axes 17*a-d*. The beam-deflecting means 18 is provided in order to cover greater a total field of view 72 and in order for the partial fields of view 74*a-d* to overlap in space only partly. The beam-deflecting means 18 deflects the optical paths 17*a-d* or optical axes to a total field of view direction 76 with a channel-individual deviation. The total field of view direction 76 is, for example, in parallel to a plane which is perpendicular to the line extension direction of the array 14 and in parallel to the course of the optical axes 17*a-d* before or without beam-deflection. The total field of view direction 76 exemplarily is derived from the optical axes 17*a-d* by turning around the line extension direction by an angle which is >0° and <180°, for example between 80 and 100° and, for example, 90°. The total field of view of the device 11 which corresponds to the total coverage of the partial fields of view 74*a-d* thus is not in the direction of an extension of connecting the image sensor 12 and the array 14 in series in the direction of the optical axes 17*a-d*, but, due to beam deflection, the total field of view is lateral to the image sensor 12 and the array 14 in a direction in which the construction height of the device 11 is measured, that is the lateral direction perpendicular to the line extension direction. Additionally, the beam-deflecting means 18 deflects each optical path or the optical path of each optical channel 16*a-d* from the deflection resulting in the direction 76 just mentioned, with a channel-individual deviation. Thus, the beam-deflecting means 18 comprises a reflective facet 68*a-d* for each channel 16*a-d*. These are slightly inclined to one another. The mutual tilting of the facets 68*a-d* is selected such that, when deflecting the beam by the beam-deflecting means 18, the partial fields of view 74*a-d* are provided with a slight divergence such that the partial fields of view 74*a-d* overlap only partly. Thus, as is indicated exemplarily in FIG. 11*a*, the individual deflection may also be such that the partial fields of view 74*a-d* cover the total field of view 72 in two dimensions, that is are arranged to be distributed in two dimensions in the total field of view 72.

It is to be pointed out that many of the details described so far for the device 11 have been selected only exemplarily. This is, for example, true for the number of optical channels mentioned before. The beam-deflecting means 18 may also be formed to be different from what has been described so far. The beam-deflecting means 18 need, for example, not necessarily be reflective. It may also be implemented to be different from a facet mirror, for example in the form of transparent prism wedges. In this case, the mean beam deflection may, for example, be 0°, that is the direction 76 may, for example, be parallel to the optical paths 17*a-d* before or without any beam deflection or, in other words, the device 11 may still "look straight ahead", despite the beam-deflecting means 18. The channel-individual deflection by the beam-deflecting means 18 would again result in the partial fields of view 74*a-d* to mutually overlap only slightly, for example in pairs with an overlap of <10% relative to the solid-angel regions of the partial fields of view 74*a-d*.

In addition, the optical paths or optical axes may deviate from the parallelity described and, nevertheless, the parallelity of the optical paths of the optical channels may still be distinct so that the partial fields of view covered by the individual channels 16*a*-N or imaged onto the respective image sensor regions 58*a-d* would overlap largely with no further measures, like beam deflection, so that, in order to cover greater a total field of view by the multi-aperture imaging device 11, the beam-deflecting means 18 provides the optical paths with additional divergence so that the partial fields of view of N optical channels 16*a*-N overlap one another to a lesser extent. The beam-deflecting means 18 exemplarily provides for the total field of view to exhibit an aperture angle greater than 1.5 times the aperture angle of the individual partial fields of view of the optical channels 16*a*-N. Using a kind of pre-divergence of the optical paths 17*a-d*, it would also be possible for not all the facet inclinations to differ for example, but for some groups of channels to comprise facets of equal inclination. The latter may be formed to be integral or change into one another continuously, that is as one facet associated to this group of channels neighboring in the line extension direction. The divergence of the optical axes of these channels may then originate from the divergence of these optical axes, as is obtained by the lateral offset between optical centers of the optics and image sensor regions of the channels or prism structures or decentralized lens portions. The pre-divergence may, for example, be limited to one plane. The optical axes may, for example, be in a common plane before and/or without beam deflection, but in a divergent manner, and the facets only cause additional divergence in the other transverse plane, that is they are all in parallel to the line extension direction and only inclined among one another in a different manner to the common plane of the optical axes mentioned before, wherein again several facets may exhibit the same inclination or be associated together to a group of channels the optical axes of which, for example, differ already in pairs before or without beam deflection in the common plane of the optical axes mentioned before.

When omitting the beam-deflecting means or implementing the beam-deflecting means to be a planar mirror or the like, the overall divergence may be obtained by the lateral offset between optical centers of the optics on the one hand and centers of the image sensor regions on the other hand or by prism structures or decentered lens sections.

The pre-divergence maybe present and mentioned before may, for example, be achieved by the optical centers of the optics to be located on a straight line along the line extension direction, whereas the centers of the image sensor regions are arranged to be deviating from the projection of the optical centers along the normal of the plane of the image sensor regions onto points on a straight line in the image sensor plane, for example at points deviating from the points on the straight line in the image sensor plane mentioned before in a channel-individual manner along the line extension direction and/or along the direction perpendicular to both the line extension direction and the image sensor normal. Alternatively, pre-divergence may be obtained by the centers of the image sensors to be located on a straight line along the line extension direction, whereas the centers of the optics are arranged to deviate from the projection of the optical centers of the image sensors along the normal of the plane of the optical centers of the optics onto points on a straight line in the optics central plane, for example at points deviating from the points on the straight line in the optics central plane mentioned before in a channel-individual manner along the line extension direction and/or along the direction perpendicular to both the line extension direction and the normal of the optics central plane. It is advantageous for the channel-individual deviation mentioned before from the respective projection to be present only in the line extension direction, that is for the optical axes to be located only in a common plane, provided with pre-divergence. Both the optical centers and the image sensor region centers are then each located on a straight line in parallel to the line extension direction, but with different distances therebetween. A lateral offset between the lenses and image sensors in a perpendicular lateral direction to the line extension direction, in contrast, results in an increase in the construction height. A purely in-plane offset in the line extension direction does not alter the construction height, but the result may be fewer facets and/or the facets comprise only a tilt in an angular orientation, thereby making setup easier.

Figure 11E:
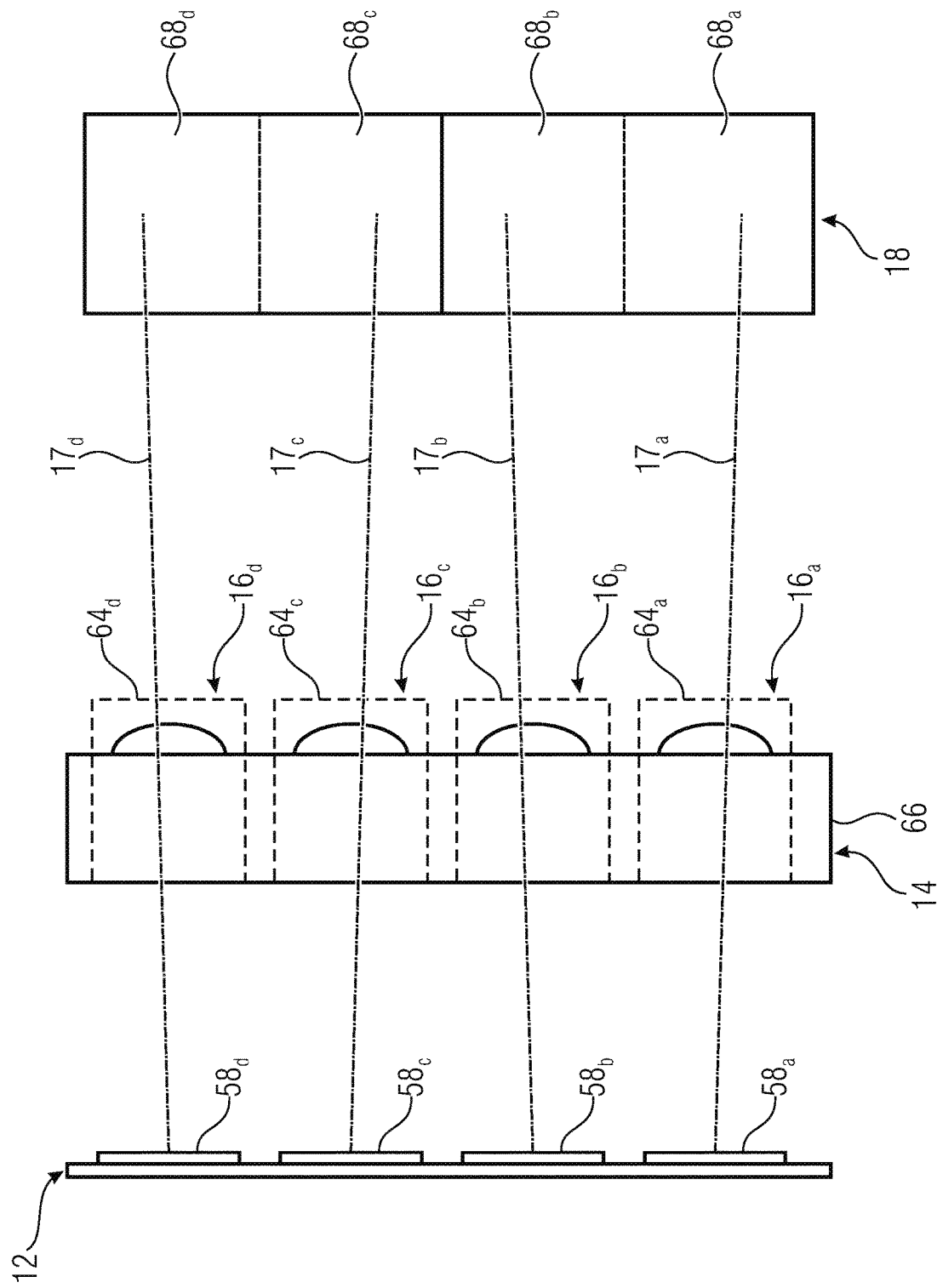

This is illustrated exemplarily in FIGS. 11d and 11e for the case of optics held on a common support, wherein the neighboring channels 16a and 16b on the one hand and the neighboring channels 16c and 16d on the other hand comprise optical axes 17a and 17b and 17c and 17d located in the same plane, squinting relative to each other, that is provided with pre-divergence. The facets 68a and 68b may be formed by a facet and the facets 68c and 68b may be formed by another facet, as is indicated by broken lines between the respective pairs of facets, and the only two facets are inclined only in one direction, both in parallel to the line extension direction. It is also possible for individual facets to comprise only a tilt in a spatial direction.

Additionally, it may be provided for some optical channels to be associated to the same partial field of view, for example for the purpose of super resolution or for increasing the resolution using which the corresponding partial field of view is scanned by these channels. The optical channels within such a group were, for example, parallel before the beam deflection and would be deflected to a partial field of view by a facet. Pixel images of the image sensor of a channel of a group were located at intermediate positions between images of the pixels of the image sensor of another channel of this group.

Not for super resolution purposes, but only for stereoscopy purposes, an implementation would, for example, also be conceivable in which a group of directly neighboring channels in the line extension direction covers the total field of view completely with their partial fields of view, and another group of directly neighboring channels in turn covers the total field of view completely and the optical paths of both channel groups pass the substrate or a support 66. This means that the multi-aperture imaging device may comprise a first plurality of optical channels configured to capture a total field of view, maybe completely. A second plurality of optical channels of the multi-aperture imaging device may be configured to capture the total field of view also and, maybe, completely. The total field of view may thus be captured at least stereoscopically by the first plurality of optical channels and by the second plurality of optical channels. The first plurality of optical channels and the second plurality of optical channels may impinge on a common image sensor, use a common array (array optics) and/or be deflected by common beam-deflecting means. In contrast to an array made of individual cameras, a continuous array camera is formed, which as a whole is controllable as a device, for example relative to focus and/or image stabilization, which is of advantage since all the channels are influenced simultaneously and using the same actuators. In addition, advantages results from the monolithic setup as regards the mechanical stability of the total arrangement, in particular with temperature changes. This is of advantage for merging the total image from subimages of the individual channels, and when obtaining three-dimensional object data when used in stereo, triple, quadruple, etc. systems when scanning the total field of view several times by different pluralities of channels 16.

The following discussion deals with the optics 64a-d the lens plane of which is also in parallel to the common plane of the image sensor regions 58a-d. As will be described below, lenses of the optics 64a-d of the optical channels 16a-d are mounted to a main side 66a of the substrate 66 using one or several lens holders and are mechanically connected to one another using the substrate 66. In particular, the optical paths 17a-d of the plurality of optical channels 16a-d pass through the substrate 66. Thus, the substrate 66 is, at least in portions, formed from a transparent material and has the shape of a plate or, for example, has the shape of a parallelepiped or another convex body having a planar main side 66a and an opposite main side 66b also planar thereto. The main sides are positioned to be perpendicular to the optical paths 17a-d. As will be described below, in accordance with embodiments, there may be deviations from a true parallelepiped shape which may originate from lenses of the optics implemented to be integral with the substrate.

In the embodiment of FIGS. 11a-c, the flat support substrate 66 is, for example, a substrate made of glass or polymer. Exemplarily, the support substrate 66 may comprise a glass plate. The material of the substrate 66 may be selected in terms of high optic transparency and low temperature coefficient or further mechanical characteristics, like hardness, modulus of elasticity or torsion.

The substrate 66 may be implemented to be a simple planar part of the optical path, without any additional lenses being accommodated directly thereon. Additionally, diaphragms, like aperture or stray light diaphragms, and/or filter layers, like IR block filters, may be applied on the substrate surfaces or may include several layers of different substrates on the surfaces of which diaphragms and filter layers may be applied which in turn may differ per channel, for example in the spectral absorption.

The substrate 66 may include a material which comprises different characteristics, in particular non-constant absorption, in different regions of the electromagnetic spectrum which may be detected by the image sensor.

In the embodiment of FIGS. 11a-c, each optics 64a-d comprises three lenses. However, the number of lenses may be selected as desired. The number may be one, two or any other number. The lenses may be convex, comprise only an optically imaging functional area, like a spherical, aspherical, free-form area, or two, like two mutually opposite ones, in order to result in a convex or concave lens shape, for example. Several optically effective lens areas are also possible, for example by forming a lens from several materials.

In the embodiment of FIGS. 11a-c, a first lens 78a-d of each optical channel 16a-d or optics is formed on the main side 66a. The lenses 78a-d have, for example, been manufactured by molding on the main side 66a of the substrate 66 and are made from a polymer, for example, like a UV-curable polymer. Molding is done by, for example, a molding tool and curing may, for example, be done using temperature and/or UV irradiation.

In the embodiment of FIGS. 11a-c, each optics 64a-d comprises another second and third lens 82a-d and 84a-d, respectively. These lenses are exemplarily fixed relative to one another within the respective lens holder by means of axial pipe-shaped lens holders 86*a-d* and fixed to the latter at the main side 66*b*, for example by means of gluing or another joining technology. Apertures 88*a-d* of lens holders 86*a-d* are, for example provided with a circular cross-section in the cylindrical inner side of which the lenses 82*a-d* and 84*a-d* are mounted. Thus, for each optics 64*a-d*, the lenses are located coaxially on the respective optical axis of the optical paths 17*a-d*. The lens holders 86*a-d* may also comprise a cross-section changing over their length or along the respective optical axes. Here, the cross-section may exhibit, with a decreasing distance to the image sensor 12, an increasing rectangular or squared characteristic. The external shape of the lens holder may thus differ also from the shape of the apertures. The material of the lens holders may be light-absorbing. In correspondence with the squinting optics described before in connection with FIGS. 11*d* and 11*e*, the lens holders may also be implemented not to be rotation-symmetrical and/or non-coaxial.

Mounting using the lens holders mentioned before exemplarily takes place such that lens vertices of the lenses held by these are spaced apart from the substrate 66.

As has already been mentioned before, it is possible for the substrate 66 to be planar on both sides and, thus, not to exhibit a refractive power effect. However, it would also be possible for the substrate 66 to comprise mechanical structures, for example recesses or protrusions, allowing an easy positive and/or non-positive orientation of the following components, for example connecting individual lenses or housing portions. In the embodiments of FIGS. 11*a-c*, on the main side 66*b*, the substrate 66 may, for example, comprise structures which make mounting or orientation easier, at positions where the respective end of the pipe of the lens holder 86*a-d* of the respective optics 64*a-d* is mounted. These structures may, for example, be a circular recess or a recess of a different shape, which corresponds to the shape of a side of the respective lens holder facing the substrate, into which the side of the respective lens holder 84*a-d* may engage. It is to be pointed out again that different aperture cross-sections and, thus, correspondingly maybe different lens apertures than circular ones are possible.

The embodiment of FIGS. 11*a-c* thus leaves a classical structure of camera modules which comprise individual lenses and, for holding the individual lenses, comprise a non-transparent housing support completely enclosing same. Rather, the above embodiment uses a transparent body 66 as a substrate support. It extends over several neighboring optical channels 16*a-d* in order not to be penetrated by the imaging optical path thereof. It does not interfere in imaging, nor does it increase the construction height.

Figure 11F:
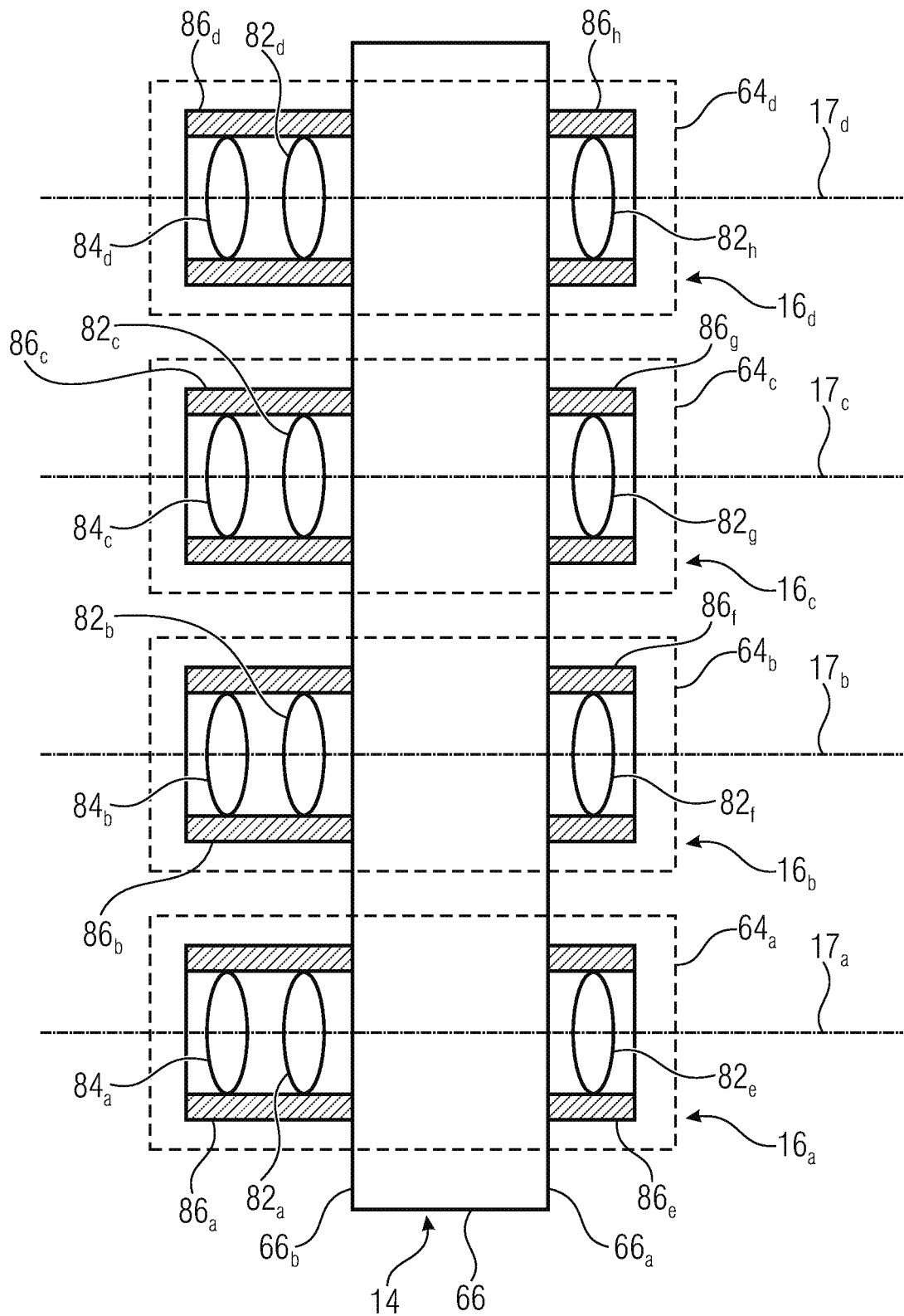

However, various possibilities of how the embodiment of FIGS. 11*a-c* may be varied are pointed out. Exemplarily, the substrate 66 does not necessarily extend over all the channels 66*a-d* of the multi-aperture imaging device 11. In contrast to what has been described before, it would be possible for each optics 64*a-d* to comprise lenses held via a lens support on both sides 66*a* and 66*b*, as is illustrated in FIG. 11*f*.

Figure 12:
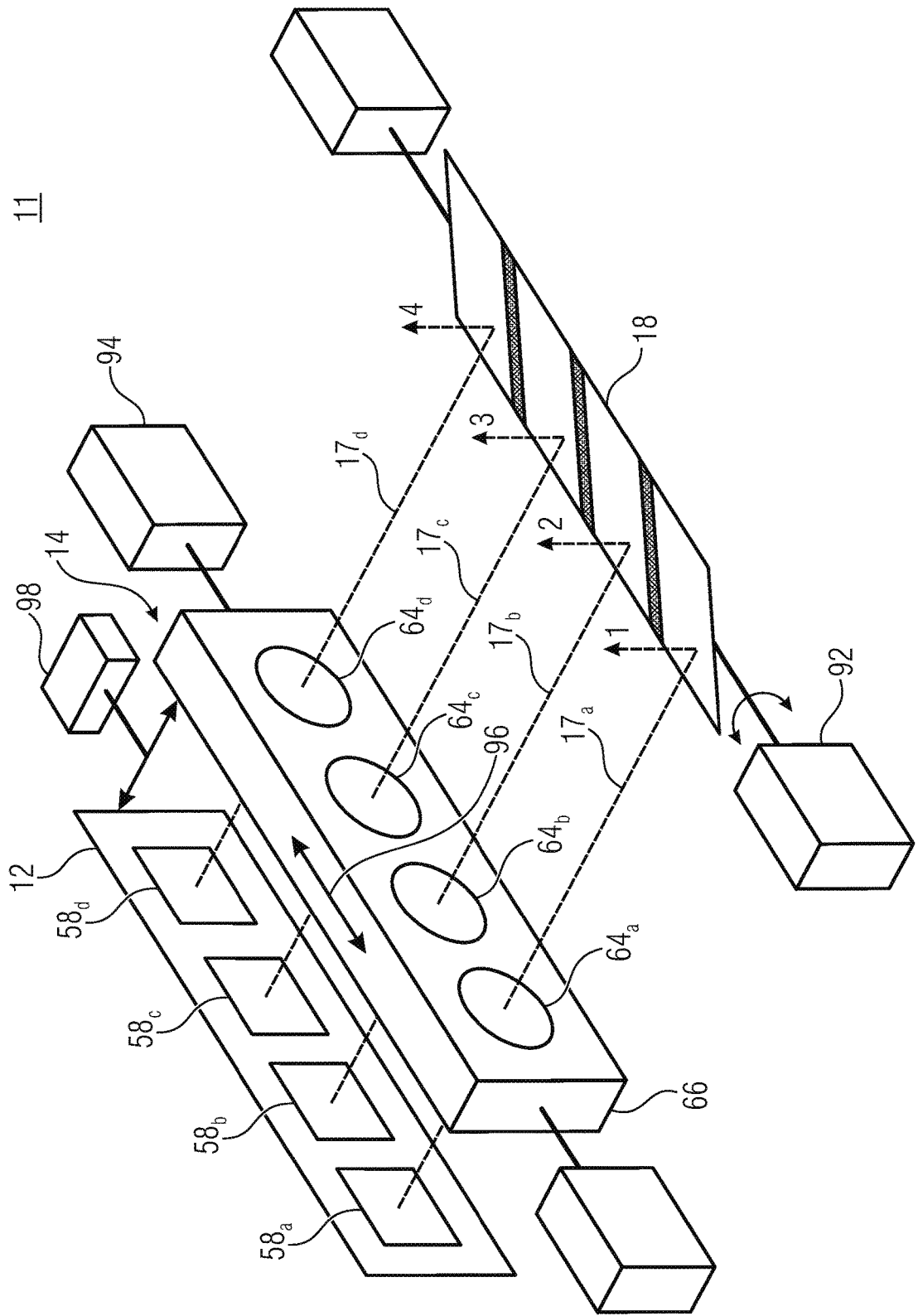
FIG. 12 shows the multi-aperture imaging device in accordance with FIGS. 11a-c which, in accordance with an embodiment, is supplemented by additional means for realizing relative movements for optical image stabilization and for adapting focusing.

An existence of only the lenses 82*e-h* on the main side 66*a*, that is without the lenses 82*a-d* and/or 84*a-d* on the other side 66*b*, would also be conceivable, as is providing the lenses 82*a-d* and/or 84*a-d* on the other side 66*a*, that is that side of the substrate 66 facing away from the image sensor 12, and not the side facing same, that is 66*a*. Also, the number of lenses in a lens support 86*a-h* may be selected as desired. Thus, there may be only one lens or more than two may be provided in such a support 86*a-h*. As is shown in FIG. 11*f*, lenses may be mounted on both sides 66*a* and 66*b* via respective lens supports 86*a-d* and 86*e-h* on the respective side 66*a* and 66*b*, respectively. FIG. 12 exemplarily shows that the multi-aperture imaging device 11 of FIGS. 11*a-c* may be supplemented by one or several of the additional means described below.

FIG. 12 exemplarily shows that there may be means 91 for turning the beam-deflecting means 18 around the rotational axis 44 which is in parallel to the line extension direction of the array 14. The rotational axis 44 is, for example, located in the plane of the optical paths 17*a-d* or spaced apart therefrom by less than a fourth of a diameter of the optics 64*a-d*. Alternatively, it would of course also be possible for the rotational axis to be further away, such as, for example, by less than an optics diameter or less than four optics diameters. The means 92 may, for example, be provided in order to turn the beam-deflecting means 18 at short a response time in only a small angular range, for example within a span of less than 1° or less than 10° or less than 20°, in order to compensate shaking of the multi-aperture imaging device 11 by, for example, a user while taking a picture. In this case, the means 92 would, for example, be driven by an image-stabilizing controller.

Alternatively or additionally, the means 92 may be configured to change in its direction the total field of view defined by the total coverage of the partial fields of view 74*a-d* (FIG. 11*a*), with greater angular shifts. Thus, it would also be possible for deflections to be achieved by rotating the beam-deflecting means 18, wherein the total field of view is arranged in the opposite direction relative to the device 11, for example by implementing the beam-deflecting means 18 to be a mirror array reflective on both sides.

Alternatively or additionally, the device 11 may comprise means 94 for moving the optics 64*a-d* by means of the substrate 66 or the substrate 66 itself and, thus, the optics 64*a-d* in a translatory manner along the line extension direction. The means 94 may, for example, also be driven by the image-stabilizing controller mentioned before in order to achieve image stabilization transverse to the image stabilization realized by rotating the mirror-deflecting device 18, by movement 96 along the line extension direction.

Additionally or alternatively, the device 11 may comprise means 98 for changing the image-side distance between the image sensor 12 and the optics 64*a-d* or between the image sensor 12 and the support 66 in order to achieve a depth-of-field adjustment. The means 98 may be driven by a manual user control or by autofocus control or focusing means of the device 11.

The means 94 thus serves for suspending the substrate 66 and is, as indicated in FIG. 12, arranged laterally next to the substrate 66 along the line extension direction in order not to increase the construction height. It is also true for the means 92 and 98 that these are arranged in the plane of the optical paths in order not to increase the construction height. The means 98 may also be connected to the beam-deflecting means 18 and move same simultaneously or nearly simultaneously so that a distance between the optics 64*a-d* and the beam-deflecting means 18 remains essentially constant or constant when changing the image-side distance between the image sensor 12 and the optics 64*a-d*. The means 94, 92 and/or 98 may be implemented on the basis of pneumatic, hydraulic, piezoelectric actuators, DC motors, stepper motors, thermal actuators, electrostatic actuators, electrostrictive and/or magnetostrictive actuators or drives.

It is pointed out that the optics 64*a-d* may not only be held in a constant relative positon among one another, for example using the transparent substrate mentioned before, but also relative to the beam-deflecting means, for example using a suitable frame which does not increase the construction height and thus is located in the plane of components 12, 14 and 18 or in the plane of the optical paths. The stability of the relative position may be limited to the distance between optics and beam-deflecting means along the optical axes so that the means 98 may, for example, move the optics 64a-d in connection with the beam-deflecting means in a translatory manner along the optical axes. The optics-to-beam-deflecting means distance may also be set to a minimum distance such that the optical path of the channels is not limited laterally by the segments of the beam-deflecting means 18, thereby reducing the construction height, since otherwise the segments 68a-d would have to be dimensioned as regards the lateral extension for the greatest optics-to-beam-deflecting means distance in order not to intersect the optical path. Additionally, the stability of the relative position of the frame mentioned before may hold the optics and the beam-deflecting means in a rigid manner to one another along the x axis so that the means 94 would move the optics 64a-d in connection with the beam-deflecting means in a translatory manner along the line extension direction.

The beam-deflecting means 18 described above for deflecting the optical path of the optical channels, in combination with the actuator 92 for generating the rotational movement of the beam-deflecting means 18 of an optical image-stabilizing controller of the multi-aperture imaging device 11, allows stabilization of the image or total field of view in two dimensions, that is image stabilization along a first image axis which is essentially parallel to the line extension direction by the translatory movement of the substrate 66 and image stabilization along a second image axis which is basically parallel to the optical axes before or without beam-deflection or—when considering the deflected optical axes—perpendicular to the optical axes and the line extension direction by generating the rotational movement of the beam-deflecting means 18. In addition, the arrangement described may cause a translatory movement of the beam-deflecting means fixed in the frame mentioned and of the array 14 perpendicular to the line extension direction, like by the actuator 98 described which may be used for realizing focus adjustment and, thus, an autofocus function.

Alternatively or in addition to the rotational movement for achieving image stabilization along the second image axis, a translatory relative movement between the image sensor 12 and the array 14 may also be implemented. This relative movement may, for example, be provided by the means 94 and/or means 98.

For reasons of completeness, it is still to be pointed out as regards the above discussion that, when taking a picture, the device, across the image sensor regions, captures one image of a scene per channel, having been imaged onto the image sensor region through the channels, and that the device may optionally comprise a processor which merges or fuses the images to form a total image which corresponds to the scene in the total field of view, and/or provides additional data, like 3D image data and depth information of the object scene for generating depth charts and for a software realization like, for example, refocusing (determining regions of sharpness after actually capturing an image), all-in-focus images, Virtual Green Screen (separation of foreground and background) among others. The latter tasks may also be performed by any processor, or externally. However, the processor may also be a component external of the multi-aperture imaging device.

Figure 13A:
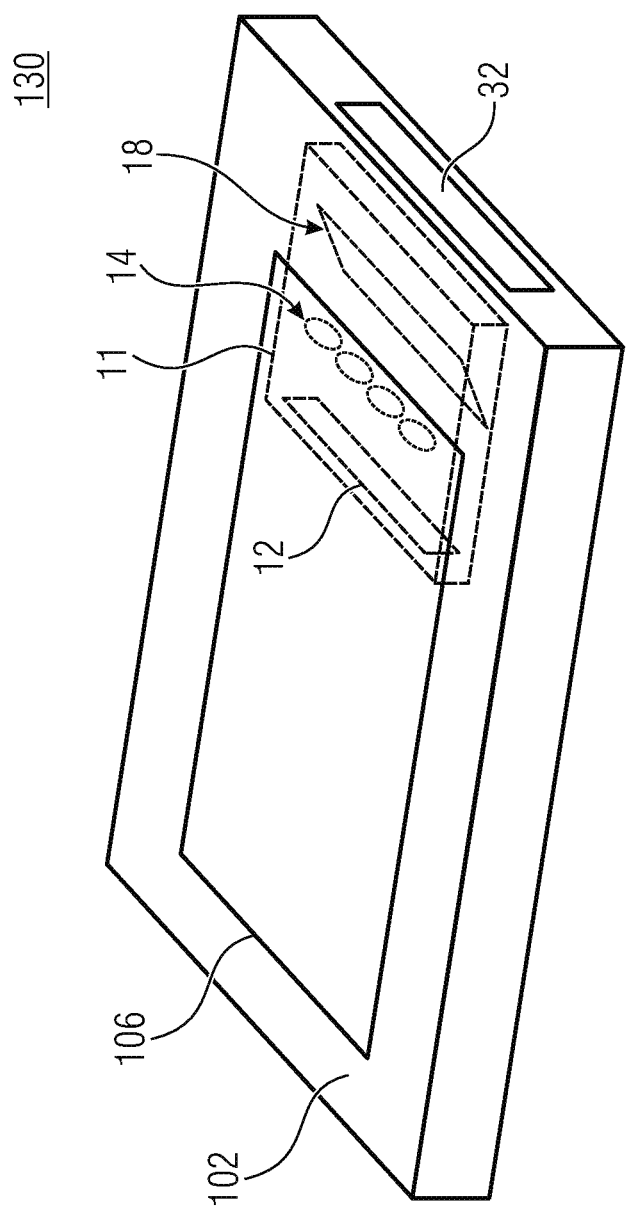
FIG. 13a is a schematic view of a multi-aperture imaging device arranged in a flat housing, in accordance with an embodiment.

FIG. 13a illustrates that devices 11 of the alternatives described before may, for example, be installed in a flat housing of a portable apparatus 130, like of a mobile phone, smartphone or media player or the like, wherein in this case the planes of the image sensor 12 or of the image sensor regions and the lens planes of the optics of the optical channels 16 are oriented to be perpendicular to the flat extension direction of the flat housing or in parallel to the thickness direction. In this way, the beam-deflecting means 18 would, for example, provide for the total field of view of the multi-aperture imaging device 11 to be located in front of a front side 102 of the flat housing which, for example, also comprises a screen. Alternatively, such a deflection would also be possible that the field of view is located in front of a back side of the flat housing which is opposite to the front side 102. The housing 22 of the apparatus 130 or the apparatus itself may be flat, since the construction height of the device 11, which is in parallel to the thickness of the housing, may be kept small by the position illustrated of the device 11 in the housing. Switchability may also be provided for by providing a window on the side opposite the side 102 and, for example, moving the beam-deflecting means between two positionings, for example when the latter is implemented as a mirror mirroring on both the front and back side and is turned from one to the other positioning, or as a facet mirror having a set of facets for one positioning and another set of facets for the other positioning, wherein the facet sets are located next to one another in the line extension direction and switching between the positionings takes place by moving the beam-deflecting means back and forth in a translatory manner along the line extension direction. Installing the device 11 into another apparatus which may not be portable, for example a car, would, of course, also be possible.

Several modules 11 the partial fields of view of which, of their channels, cover the same field of view completely and, optionally, even in a congruent manner, may be installed in the apparatus 130 at a basic distance BA (compare FIG. 7) relative to one another along a line extension direction which is equal for both modules, for example for the purpose of stereoscopy. More than two modules would also be conceivable. The line extension directions of the modules 11 may be non-collinear, but only parallel to one another. However, it is to be mentioned again that, as has been mentioned before, a device 11 or a module may also be equipped with channels such that same may each cover the same total field of view completely in groups. The modules may be arranged in one/several line(s)/row(s) or at any position in the device. In an arrangement with several modules, these may be formed to be equal or different. Exemplarily, a first module may be configured to perform stereoscopic capturing of the total field of view. A second module may be configured to perform simple capturing, stereoscopic capturing or higher-order capturing.

It is still to be mentioned that, in alternative embodiments compared to the embodiments described above, the beam-deflecting means may also be missing. When an only partly mutual overlap of the partial fields of view is desired, this may, for example, be achieved by mutual lateral offsets between the center of the image sensor region and the optical center of the optics of the corresponding channel. The actuators in accordance with FIG. 12 may, however, be applied nevertheless, wherein, as a substitution for means 92, the actuator 94 may, for example, additionally be able to perform a translatory movement of the optics or the support 66.

In other words, above embodiments show a multi-aperture imaging device having a single-line array of optical channels arranged next to one another in which a substrate, extending over the channels, made of glass or polymer, for example, for improving the stability is located at any position desired in the optical path of the multi-aperture imaging device. The substrate may additionally comprise lenses on the front and/or back side. The lenses may be made of the material of the substrate (for example, formed by heat imprinting) or be molded thereon. There may be further lenses, in front of and behind the substrate, which are not located on the substrate and are mounted individually. There may be several substrates in a setup, both along and perpendicular to the line extension direction. Thus, it would also be possible to connect in series several substrates with lenses along the optical paths, that is to otherwise hold them in a predetermined positional relation one behind the other, for example using a frame, without joining same being needed. In this way, two times as many main sides as support substrates are used would be available for providing or mounting lenses, for example a substrate 66 which may be equipped with lenses in accordance with the above examples, here exemplarily in accordance with FIG. 11b, and a substrate which may also be equipped with lenses in accordance with the above examples, that is, among others, with lenses which are mounted to the main sides 66a and/or 66b via lens holders, which, however, is exemplarily illustrated here to be manufactured integrally, for example by injection molding or the like, so that lenses are formed on both sides 66a and 66b, wherein, of course, molded lenses of other materials than the material of the parallelepiped substrate 66 would be possible, as are lenses on only one of the sides 66a and 66b. Both substrates are transparent and are penetrated by the optical paths, through the main sides 66a and 66b. The above embodiments may thus be implemented in the form of a multi-aperture imaging device, with a single-line channel arrangement, wherein each channel transfers a partial field of view of a total field of view and the partial fields of view overlap partly. A setup of several such multi-aperture imaging devices for stereo, trio, quattro, etc. setups for 3D image capturing is possible. Thus, the plurality of modules may be implemented as a continuous line. The continuous line may use identical actuators and a common beam-deflecting element. One or several mechanically reinforcing substrates maybe present in the optical path may extend over the entire line, which may form a stereo, trio, quattro setup. Methods of super resolution may be employed, wherein several channels image the same partial fields of view. The optical axes may be divergent already with no beam-deflecting means so that fewer facets are needed on the beam-deflecting unit. In this case, the facets advantageously comprise only a single angular component. The image sensor may include one piece only, comprise only a continuous pixel matrix or several interrupted ones. The image sensor may be set up from many partial sensors which are, for example, arranged next to one another on a printed circuit board. An autofocus drive of focusing means may be implemented such that the beam-deflecting element is moved synchronously with the optics, or is stationary. When there is no pre-divergence, the embodiments provide for the optical paths between the image sensor 12 and the beam-deflecting means 18 to be essentially or completely parallel.

FIG. 13b shows a schematic setup comprising a first multi-aperture imaging device 11a and a second multi-aperture imaging device 11b as may, for example, be arranged in the apparatus 130. The two multi-aperture imaging devices 11a and 11b may form a common multi-aperture imaging device 11 and comprise a common image sensor 12 and/or a common array 14. The single-line arrays 14a and 14b exemplarily form a common line in the common array 14. The image sensors 12a and 12b may form the common image sensor 12 and may, for example, be mounted on a common substrate or on a common circuit support, like a common board or a common flex board. Alternatively, the image sensors 12a and 12b may also comprise mutually different substrates. Different mixtures of these alternatives are also possible of course, like multi-aperture imaging devices comprising a common image sensor, a common array and/or a common beam-deflecting means 18, and further multi-aperture imaging devices comprising separate components. Of advantage with a common image sensor, a common single-line array and/or a common beam-deflecting means is the fact that moving a respective component with high precision may be achieved by driving a small number of actuators and that synchronization between actuators may be reduced or avoided. In addition, high thermal stability may be achieved. Alternatively or additionally, further multi-aperture imaging devices may comprise a common array, a common image sensor and/or common beam-deflecting means. The setup of the multi-aperture imaging device 11 may, for example, be usable for stereoscopically capturing a total or partial field of view when optical channels of different partial multi-aperture imaging devices 11a and 11b are directed onto a same partial field of view. In analogy, further partial multi-aperture imaging devices may be integrated into the common multi-aperture imaging devices so that higher-order capturing compared to stereo is possible.

Figure 14:
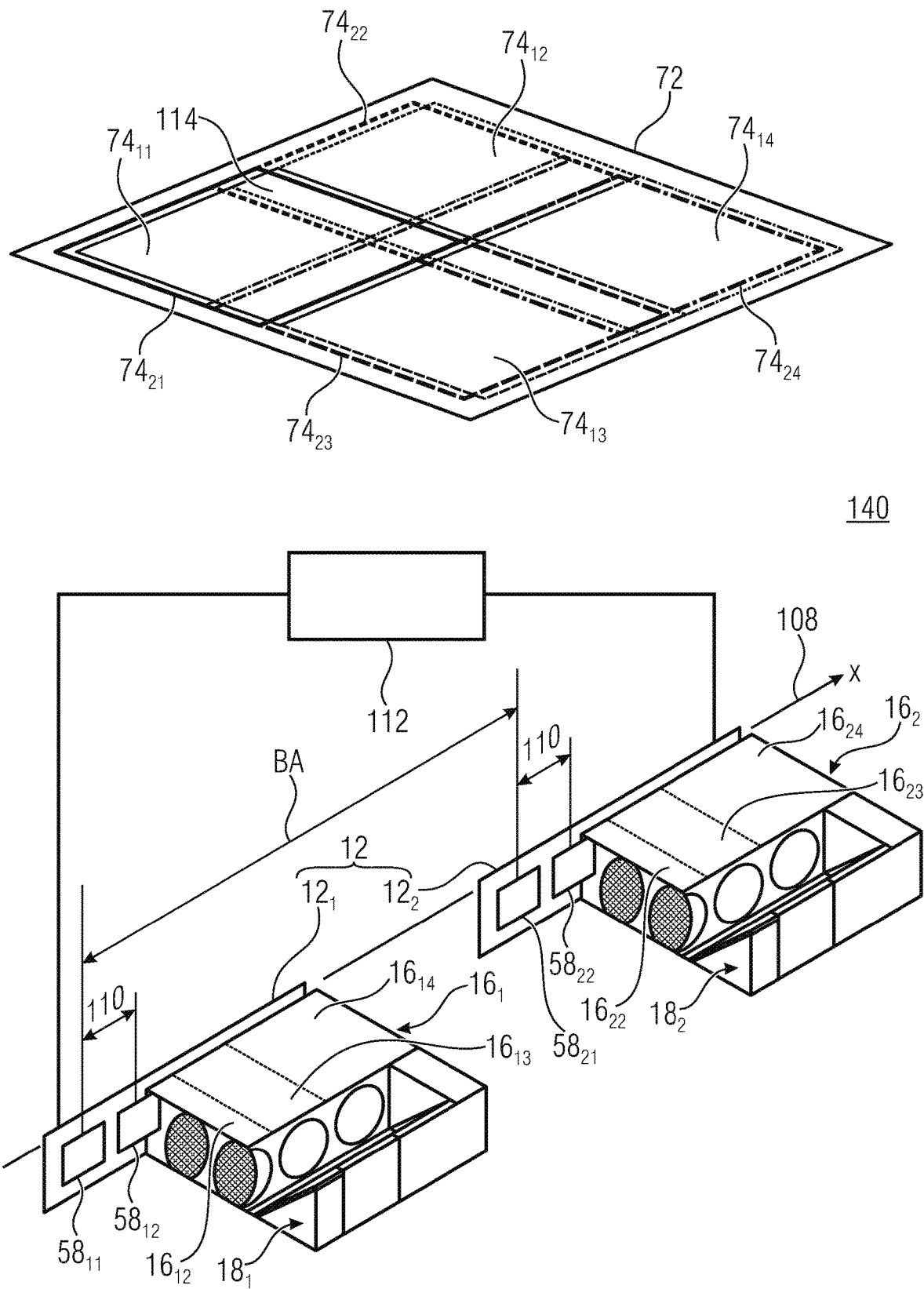
FIG. 14 is a schematic view of a 3D multi-aperture imaging device in accordance with an embodiment.

FIG. 14 shows a 3D multi-aperture imaging device 140 as may be used in accordance with embodiments described here. It has an image sensor which, as is indicated in FIG. 14, may be divided into two components $12_1$ and $12_2$, that is one component $12_1$ for the "right" optical channels $16_1$ and the other component $12_2$ for the "left" channels $16_2$. In the example of FIG. 14, the right and the left optical channels $16_1$ and $16_2$ are of identical setup, but laterally offset from each other by the basic distance BA in order to obtain as much depth information as possible as regards the scene present in the field of view of the device 140. Exemplarily, the 3D multi-aperture imaging device may be formed by two or more multi-aperture imaging devices 11. The elements provided with a reference numeral provided with an index 1 at the first position from the left thus belong to the first component 1 or a first module for the right channels, module 1, of the device 140, and the elements provided with a reference numeral provided with an index 2 at the first position from the left thus belong to the second component 2 or a second module for the left channels, module 2, of the device 140. Although the number of modules in FIG. 14 is two, the device may also comprise more, being arranged relative to one another at a respective basic distance.

In the exemplary case of FIG. 14, each plurality $16_1$ and $16_2$ of optical channels comprises four optical channels arranged next to one another. The individual "right" channels are differentiated between by the second subscript index. The channels are indexed from the right to the left. This means that the optical channel $16_{11}$ which, in FIG. 14, is not illustrated due to the partial cut-away view selected for reasons of clarity, is exemplarily arranged at the outermost right edge along the basic distance direction 108 along which the left and the right channels are arranged to be mutually offset by the basic distance BA, that is furthest away from the plurality $16_2$ of left channels, wherein the other right channels $16_{12}$ to $16_{14}$ follow along the basic distance direction 108. The channels $16_{11}$ to $16_{14}$ thus form a single-line array of optical channels the line extension direction of which corresponds to the basic distance direction 108. The left channels $16_2$ exhibit the same setup. They, too, are differentiated between by the second subscript index. The left channels $16_{21}$ to $16_{24}$ are arranged next to one another and following one another in the same direction, as are the right channels $16_{11}$ to $16_{14}$, in a way such that a channel $16_{21}$ is closest to the right channels and the channel $16_{24}$ is furthest away from the latter.

Each of the right channels $16_{11}$ to $16_{14}$ comprises corresponding optics which, as is indicated in FIG. 14, may comprise a lens system. Alternatively, each channel may comprise a lens. Each optical channel $16_{11}$ to $16_{14}$ captures one of overlapping partial fields of view 74a-d of the total fields of view 72 which are mutually overlapping, as is described in connection with FIG. 11a. The channel $16_{11}$, for example, images or projects the partial field of view $74_{11}$ onto an image sensor region $58_{11}$, the optical channel $16_{12}$ images the partial field of view $74_{12}$ onto an image sensor region $58_{12}$, the optical channel $16_{13}$ images an associated partial field of view $74_{13}$ onto a corresponding image sensor region $58_{13}$ of the image sensor 12, not visible in FIG. 14, and the optical channel $16_{14}$ images an associated partial field of view $74_{14}$ onto a corresponding image sensor region $58_{14}$ which is not illustrated in FIG. 14 either since it is hidden.

In FIG. 14, the image sensor regions $58_{11}$ to $58_{14}$ of the image sensor 12 or the components $12_1$ of the image sensor 12 are arranged in one plane in parallel to the basic distance direction BA or in parallel to the line extension direction 108, wherein lens planes of the optics of the optical channels $16_{11}$ to $16_{14}$ are also parallel to this plane. In addition, the image sensor regions $58_{11}$ to $58_{14}$ are arranged among one another at a lateral inter-channel distance 110 at which the optics of the optical channels $16_{11}$ to $16_{14}$ are also arranged among one another in said direction so that the optical axes and optical paths of the optical channels $16_{11}$ to $16_{14}$ are parallel to one another between the image sensor regions $58_{11}$ to $58_{14}$ and the optics $16_{11}$ to $16_{14}$. Exemplarily, centers of the image sensor regions $58_{11}$ to $58_{14}$ and optical centers of the optics of the optical channels $16_{11}$ to $16_{14}$ are arranged on the respective optical axis which are perpendicular to the common plane of the image sensor regions $58_{11}$ to $58_{14}$ mentioned before.

The optical axes or optical paths of the optical channels $16_{11}$ to $16_{14}$ are deflected by beam-deflecting means $18_1$ and, thus, provided with a divergence which results in the partial fields of view $74_{11}$-$74_{14}$ of the optical channels $16_{11}$ to $16_{14}$ to mutually overlap only partly, for example such that the partial fields of view $74_{11}$-$74_{14}$ overlap in pairs in a solid angle sense by at most 50%. The beam-deflecting means $18_1$ may, as is indicated in FIG. 14, comprise, for each optical channel $16_{11}$ to $16_{14}$, a reflective facet, these being tilted relative to one another in a different manner among the channels $16_{11}$ to $16_{14}$. A mean inclination of the reflective facets compared to the image sensor plane deflects the total field of view of the right channels $16_{11}$ to $16_{14}$ in a direction which is, for example, perpendicular to the plane in which the optical axes of the optics of the optical channels $16_{11}$ to $16_{14}$ pass through the device $18_1$ before or with no beam-deflection, or deviates from this perpendicular direction by less than 10°. Alternatively, the beam-deflecting means $18_1$ may also use prisms for beam deflection of the individual optical axes or optical paths of the optical channels $16_{11}$ to $16_{14}$.

The beam-deflecting means $18_1$ provides the optical paths of the optical channels $16_{11}$ to $16_{14}$ with a divergence such that the channels $16_{11}$ to $16_{14}$ which are really arranged next to one another linearly in the direction 108 cover the total field of view 72 in two dimensions.

It is to be pointed out that the optical paths or optical axes may also deviate from the parallelism described, but that the parallelism of the optical paths of the optical channels may still be so marked that the partial fields of view covered by the individual channels $16_{11}$ to $16_{14}$ or projected onto the respective image sensor regions $58_{11}$ to $58_{14}$, would overlap largely with no further measures, like beam deflection, so that the beam-deflecting means 18, for covering a greater total field of view by the multi-aperture imaging device 140, provides the optical paths with an additional divergence such that the partial fields of view of the channels $16_{11}$ to $16_{14}$ overlap one another to a lesser extent. The beam-deflecting means $18_1$ exemplarily provides for the total field of view to comprise an aperture angle averaged over all azimuth angles or all transverse directions, the aperture angle being greater than 1.5 times the corresponding mean aperture angle of the partial fields of view of the optical channels $16_{11}$ to $16_{14}$.

The left channels $16_{21}$ to $16_{24}$ are set up as are the right channels $16_{11}$ to $16_{14}$ and are positioned relative to respective associated image sensor regions $58_{21}$ to $58_{24}$, wherein the optical axes, passing in parallel to one another in the same plane as the optical axes of the channels $16_{11}$ to $16_{14}$, of the optical channels $16_{21}$ to $16_{24}$ are deflected by a corresponding beam-deflecting means $18_2$ so that the optical channels $16_{21}$ to $16_{24}$ capture the same total field of view 72 in a nearly congruent manner, that is in partial fields of view $74_{21}$ to $74_{24}$ into which the total field of view 72 is divided in two dimensions, which are mutually overlapping, and of which each nearly completely overlaps the corresponding partial field of view $74_{11}$ to $74_{14}$ of a corresponding channel of the right channel $16_{11}$ to $16_{14}$. Exemplarily, the partial field of view $74_{11}$ and the partial field of view $74_{21}$ overlap nearly completely, as do the partial fields of view $74_{12}$ and $74_{22}$ etc. The image sensor regions $58_{11}$ to $58_{24}$ may, for example, each be formed from a chip as is described in FIG. 11 for the image sensor 12.

In addition to the components mentioned before, the 3D multi-aperture imaging device comprises a processor 112 which has the task of merging the images having been captured by the 3D multi-aperture imaging device 10 through the right optical channels $16_{11}$ to $16_{14}$, to form a first total image. The problem to be solved is as follows: due to the inter-channel distances 110 between neighboring channels of the right channels $16_{11}$ to $16_{14}$, the images captured through the channels $16_{11}$ to $16_{14}$ in the image regions $58_{11}$ to $58_{14}$ cannot simply be shifted relative to one another, or in a translatory manner, and be placed one above the other. In other words, they cannot simply be joined. This lateral offset along the direction B, 108 or 110, in the images of the image sensor regions $58_{11}$ to $58_{14}$ when capturing a same scene, corresponding to one another but being located in different images, is called disparity. The disparity of mutually corresponding image contents in turn depends on the distance of said image contents in the scene, that is the distance of the corresponding object from the device 140. The processor 112 may now try to evaluate disparities among the images of the image sensor regions $58_{11}$ to $58_{14}$ itself so as to merge these images among one another to form a first total image, that is a "right total image". However, it is of disadvantage that the inter-channel distance 110 is present and, consequently, provokes the problem, but that, on the other hand, the inter-channel distance 110 is relatively small so that the depth resolution or estimation is only imprecise. Consequently, trying to determine mutually corresponding image contents in an overlap region between two images, for example in the overlap region 114 between the images of the image sensor regions $58_{11}$ and $58_{12}$, for example by means of correlation, is difficult.

Thus, the processor of FIG. 14, in the overlap region 114 between the partial fields of view $74_{11}$ and $74_{12}$, uses disparities in a pair of images for merging of which one has been captured by one of the left channels $16_{21}$ or $16_{22}$, the imaged second partial field of which, that is $74_{21}$ or $74_{22}$, overlaps with the overlap region 114. Exemplarily, the processor 112, for merging the images of the image sensor regions $58_{11}$ and $58_{12}$, evaluates disparities in images of which one has been captured by one of the image sensor regions $58_{21}$ or $58_{22}$ and another one by one of the channels contributing to the overlap region 114, that is an image captured by one of the image sensor regions $58_{11}$ or $58_{12}$. Such a pair will then comprise a basic distance of an underlying basic distance BA plus/minus one or none of a channel basic distance 110. The latter basic distance is considerably greater than an individual channel basic distance 110, which is why the disparities in the overlap region 86 are easier to determine for the processor 112. Thus, for merging the images of the right channels, the processor 112 evaluates disparities resulting with an image of the left channels, advantageously, but not exclusively, between images of one of the right channels and one of the left channels.

More specifically, it is also possible for the processor 112 to take over more or less directly from the image $58_{11}$ that part of the partial field of view $74_{11}$ which does not overlap with any of the other partial fields of view of the right channels, and perform the same for the non-overlapping regions of the partial fields of view $74_{12}$, $74_{13}$ and $74_{14}$ on the basis of the images of the image sensor regions $58_{12}$ to $58_{14}$, wherein the images of the image sensor regions $58_{11}$ to $58_{14}$ may, for example, have been captured simultaneously. Only in the overlap regions of neighboring partial fields of view, for example the partial fields of view $74_{11}$ and $74_{12}$, does the processor 112 use disparities from image pairs the overlap of which in the total field of view 74 overlaps in the overlap region, but of which in the majority, but not exclusively, one has been captured by one of the right channels and the other one by one of the left channels, for example again at the same time.

In accordance with an alternative procedure, it would, however, also be possible for the processor 112 to warp all the images of the right channel, in accordance with an evaluation of the disparities between pairs of images of which a respective one has been captured by the right channels and the other one by the left channels. Thus, the total image calculated by the processor 112 for the images of the right channels may, for example, be "warped" virtually not only in the overlap region of the partial fields of view $74_{11}$ to $74_{14}$ of the right channels, but also virtually in the non-overlap region onto a point of view which is, for example, located laterally in the center between the right channels $16_{11}$ to $16_{14}$, by also evaluating, for those regions of the partial fields of view $74_{11}$ to $74_{14}$ which do not mutually overlap, disparities from image pairs by the processor 85, wherein one image has been captured by one of the right channels and another image by one of the left channels.

The 3D multi-aperture imaging device 140 of FIG. 14 is not only able to generate a total image from the images of the right channels, but the 3D multi-aperture imaging device 140 of FIG. 14 is, at least on one operating mode, able to generate a total image of the images of the left channels from a picture taken in addition to the total image of the first channels and/or generate a depth chart in addition to the total image of the right channels.

In accordance with the first alternative, the processor 112 is, for example, configured to merge images captured by the left optical channels $16_{21}$ to $16_{24}$ or the image sensor regions $58_{21}$ to $58_{24}$, to form a second total image, that is a total image of the left channel and, in an overlap region of laterally neighboring ones of the partial fields of view $74_{21}$ to $74_{24}$ of the left optical channels, use disparities in a pair of images of which in the majority, but not exclusively, one has been captured by a right optical channel $16_{11}$ to $16_{14}$ and overlaps with the corresponding overlap region of the pair of partial fields of view $74_{21}$ to $74_{24}$, and the other one has been captured by one of the left optical channels the partial field of view overlaps with the respective overlap region.

In accordance with the first alternative, the processor 112 outputs two total images for one picture taken, that is one for the right optical channels and the other one for the left optical channels. These two total images may, for example, be supplied to the eyes of the user separately and thus result in a three-dimensional impression of the scene captured.

In accordance with the other alternative mentioned before, the processor 112 generates, in addition to the total image for the right channels, a depth chart using disparities in pairs of images which comprise, at least for each of the right channels $16_{11}$ to $16_{14}$, at least one pair comprising an image captured by the respective right channel, and another image captured by one of the left channels.

In the embodiment in which the depth chart is generated by the processor 112, it is also possible for warping mentioned before for all the images captured by the right channels to be done on the basis of the depth chart. Since the depth chart comprises depth information across the total field of view 72, it is possible to warp all the images captured by the right channels, that is not only in the overlap regions thereof, but also in the non-overlap regions, onto a virtual common aperture point or a virtual optical center.

Both alternatives may also be processed by the processor 112: At first, it could generate the two total images, that is one for the right optical channels and the other one for the left optical channels, as has been described, by using, when merging the images of the right channels in the overlap regions between the images of the right channels, disparities from pairs of images of which one belongs to the images of the left channels, and by using, when merging the images of the left channels in the overlap regions between the images of left channels, also disparities from pairs of images of which one belongs to the images of the right channels, in order to then generate from the total images achieved in this way which represent the scene in the total field of view from different perspectives, a total image including a matching depth chart, for example a total image which, relative to a virtual view or a virtual optical center, is located between the optical centers of the optics of the right and left optical channels, but possibly not exclusively on-center. For calculating the depth chart and for warping one of the two total images or warping and merging the two total images into the virtual view, the processor 85 then uses the right and left total image, so to speak as an intermediate result from the previous merging of the left and right individual images. Thus, the processor here evaluates disparities in the two intermediate result total images in order to obtain the depth chart and perform warping or warping/merging thereof.

It is to be mentioned that the processor 112 evaluates disparities in a pair of images by means of cross-correlation of image regions, for example.

It is to be mentioned that, with a different coverage of the total field of view 72 by the partial fields of view of the left channels on the one hand and by the partial fields of view of the right channels on the other hand, more than four channels may also overlap one another (irrespective of their belonging to the left or right channels), as has, for example, also been the case with the mutual overlap between the overlap regions of partial fields of view of the above examples which were neighboring in the line direction or column direction, where the partial fields of view of the right channels and the partial fields of view of the left channel were each arranged in columns and lines.

$$\binom{N}{2}$$

generally applies to the number of disparity sources, N defining to the number of channels having mutually overlapping partial fields of view.

In addition to the above description, it is to be mentioned that the processor 112 may optionally also perform a channel-by-channel correction of perspective imaging errors of the respective channel.

It is to be pointed out that the embodiment of FIG. 14 has only be exemplary in many a respect. This applies to the number of optical channels, for example. Exemplarily, the number of right optical channels is not four, but any number greater than 2 or is between 2 and 10, including both, and, when considering for each partial field of view or each channel that pair with the greatest overlap with the respective partial field of view, the overlap region of the partial fields of view of the right optical channels may, as far as the area is concerned, for all these pairs be between ½ and ⅟₁₀₀₀ of a mean image size of the images captured by the image regions $58_{11}$ to $58_{14}$, for example measured in the image plane, that is the plane of the image sensor regions. The same applies to the left channels, for example. However, the number may differ between the right channels and the left channels. This means that the number of left optical channels, $N_L$, and right optical channels, $N_R$, need not necessarily be equal and that a division of the total field of view 72 into the partial fields of view of the left channels and the partial fields of view of the right channels need not necessarily be approximately equal, as has been the case in FIG. 14. As regards the partial fields of view and their overlap, the partial fields of view may, for example, protrude into one another by at least 20 pixels, if an image distance or object distance of 10 m is considered, at least for all pairs with the greatest overlap, wherein this may apply to both the right channels and the left channels.

In contrast to what has been discussed above, it is additionally not needed for the left optical channels and the right optical channels to be formed in a single line. The left and/or right channels may also form a two-dimensional array of optical channels. In addition, the single-line array does not need to comprise a collinear line extension direction. However, the arrangement of FIG. 14 is of advantage since it results in a minimum construction height perpendicularly to that plane which the optical axes of the optical channels direct to, that is both the right and left channels, before or without beam deflection. As regards the image sensor 12, it has already been mentioned that same may be formed from one, two or several chips. Exemplarily, there may be one chip provided per image sensor region $58_{11}$ to $58_{14}$ and $58_{21}$ to $58_{24}$, wherein in the case of several chips these may be mounted on one or several boards, for example one board for the left channels or image sensors of the left channels and one board for the image sensors of the right channels.

In the embodiment of FIG. 14, it is also possible to place neighboring channels as densely as possible within the channels of the right or left channels, wherein the channel distance 110 in the optimum case corresponds to the lens diameter. The result here is a small channel distance and, thus, low disparity. The right channels on the one hand and the left channels on the other hand may be arranged to one another at any distance BA so that large disparities may be realized. All in all, artifact-reduced or artifact-free image fusing and forming depth charts with a passive optical image system become possible.

Compared to the above embodiments, it would be possible to use more than two groups of channels $16_1$ and $16_2$. The number of groups may be referred to by N. If, in this case, the number of channels per group were equal and the division of the total field of view into partial fields of view were equal for all groups, a number of disparity sources of $$\binom{2N}{2}$$

resultes per overlap region of partial fields of view of the group $16_1$, for example. A different division of the total field of view for the groups of channels, however, is also conceivable, as has been mentioned above.

Finally, it is pointed out that, in the above description, only that exemplary case has been discussed where the processor 112 fuses the images of the right channels. The same procedure may be performed by the processor 112, as mentioned before, for both or all channel groups, or also for the left ones or the like.

Figure 15A:
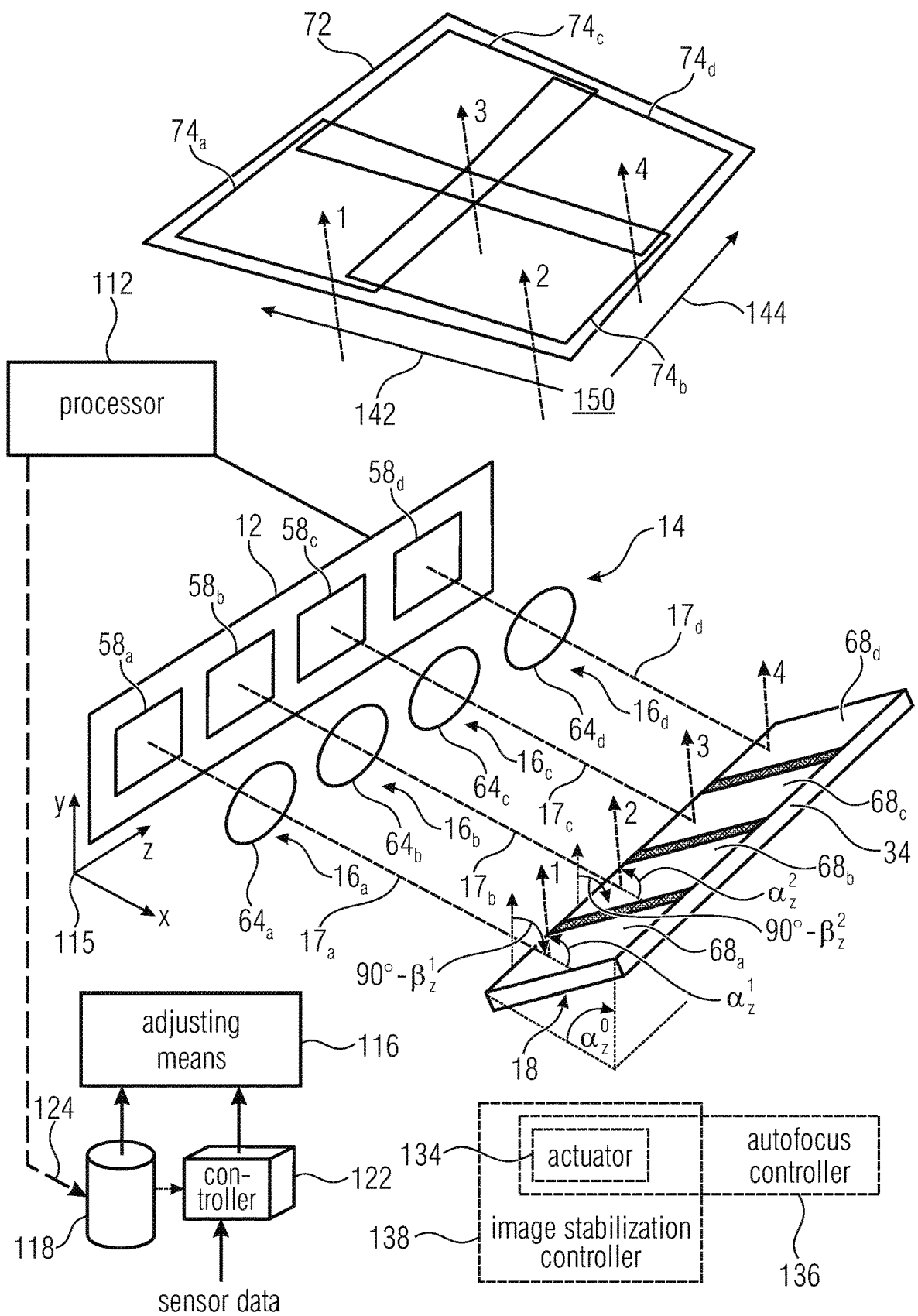
FIG. 15a is a schematic view of another multi-aperture imaging device in accordance with an embodiment which, in accordance with an embodiment, is supplemented by additional means for realizing relative movements for focus control and for optical image stabilization.
Figure 15B:
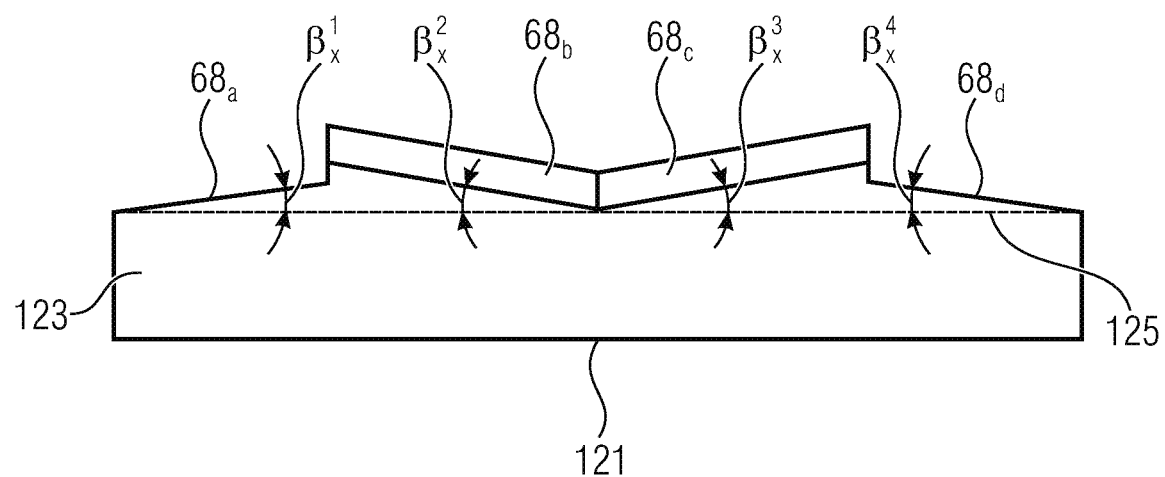
FIGS. 15b-e are schematic side views of a beam-deflecting device in accordance with an embodiment.
Figure 15C:
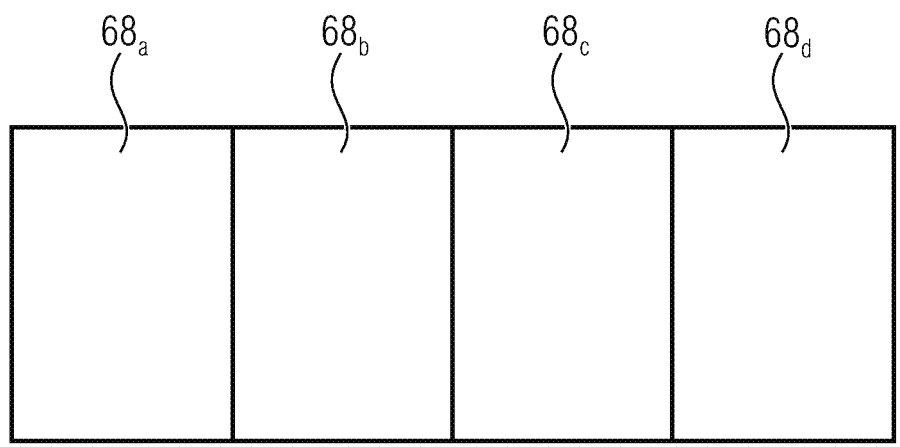
Figure 15D:
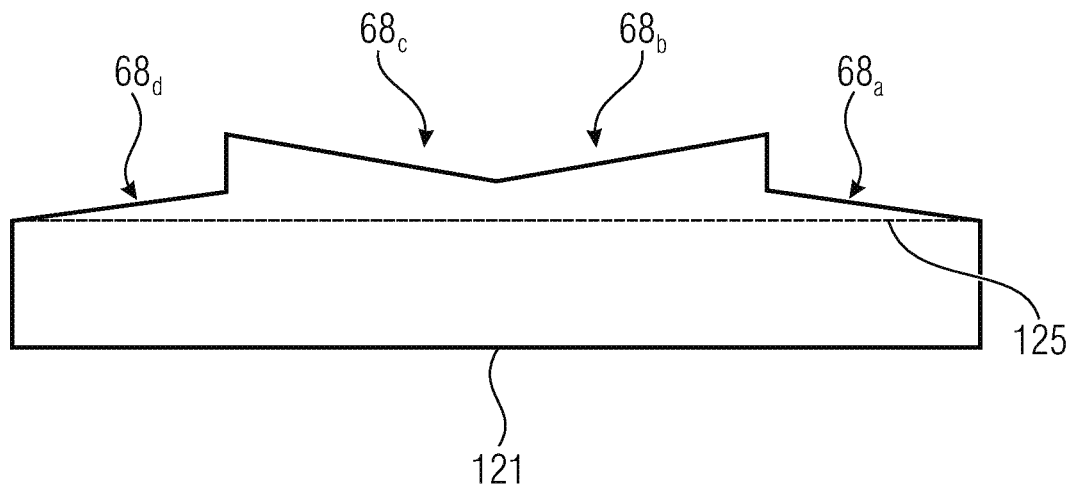
Figure 15E:
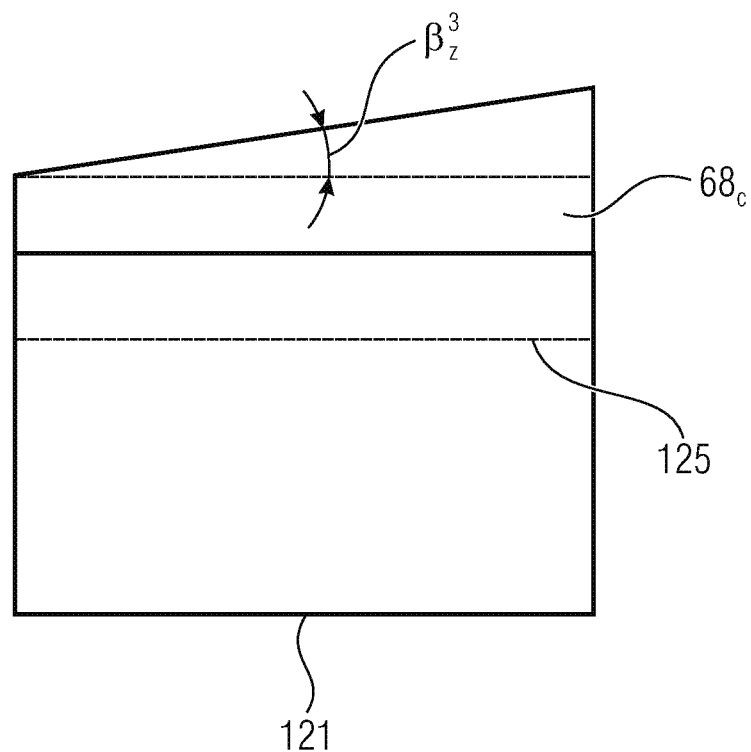

FIG. 15a shows an embodiment of a multi-aperture image device 150. The image sensor regions 58a to d are arranged in a common plane, that is the image plane of the optical channels 16 or the optics thereof. In FIG. 15a, this plane is, for example, in parallel to the plane spanned by a z and a y axis of a Cartesian coordinate system which, is indicated in FIG. 15a for simplifying the following description and provided with the reference numeral 115.

With a linear array of optical channels, the extension of the multi-aperture image device 150, as limited downwards by the image sensor 12 and the optics 64, along the line extension direction is greater than the diameter of a lens. The minimum extension of the multi-aperture imaging device 150, as determined by the mutual arrangement of the image sensor 12 and the optics 64 along the z axis, that is along the optical axes or optical paths of the optical channels 16a to d, is smaller than the minimum extension along the z axis, but, due to the implementation of the optical channels 16a to d as a single-line array, is greater than the minimum extension of the multi-aperture image device in the lateral direction y perpendicular to the line extension direction z. The latter is determined by the lateral extension of each individual optical channels 16a to d, for example the extension of the optics 64a to d along the y axis, possibly including the holder 66.

As has been described above, in the embodiment of FIG. 15a, the optical axes 17a to d, before or without the deflection by the beam-deflecting means 18 or at the optics 64a to d, for example, are parallel to one another, as is shown in FIG. 15a, or else they deviate only slightly. The corresponding centered positioning of the optics 64a to *d* and of the image sensor regions 58a to *d* is easy to produce and suitable as regards minimization of the construction space. The parallelism of the optical paths of the optical channels also causes the partial fields of view which are covered by the individual channels 16a to *d* or to which the respective image sensor regions 58a to *d* are imaged to overlap nearly completely with no further measures, that is beam deflection. In order to cover a greater total field of view by the multi-aperture imaging device 150, another function of the beam-deflecting means 18 is providing the optical paths with a divergence such that the partial fields of view of the channels 16a to *d* overlap one another to a lesser extent.

It is assumed, for example, that the optical axes 17a to *d* of the optical paths of the optical channels 16a to *d*, before or without the beam-deflecting means 18, are parallel to one another or deviate by less than a tenth of a minimum aperture angle of the partial fields of view of the optical channels 16a to *d* relative to a parallel orientation along the orientation averaged over all the channels. With no additional measures, the partial fields of view would overlap for the most part. The beam-deflecting means 18 of FIG. 15a thus comprises, for each optical channel 16a to *d*, a reflective facet 68a to *d* unambiguously associated to this channel, which are each optically planar and inclined to one another such that the partial fields of view of the optical channels overlap to a lesser extent as regards the solid angle and, for example, cover a total field of view which comprises an aperture angle which is, for example, greater than 1.5 times the aperture angle of the individual partial fields of view of the optical channels 16a to *d*. In the exemplary case of FIG. 15a, the mutual inclination of the reflective facet 68a to *d*, for example, provides for the optical channels 16a to *d* actually arranged next to one another linearly along the z axis to cover the total field of view 72 in accordance with a two-dimensional arrangement of the partial fields of view 74a to *d*.

When, in the embodiment of FIG. 15a, considering the angular deflection of the optical axes 17a to *d* of the optical channel 16a to *d* in the plane spanned by the averaged direction of the optical axes before beam deflection and the averaged direction of the optical axes after beam deflection, that is in the zy plane in the example of FIG. 15a, on the one hand, and in the plane which is perpendicular to the last mentioned plane and in parallel to the averaged direction of the optical axes after beam deflection, on the other hand, the example of FIG. 15a corresponds to the exemplary case where the averaged direction after beam deflection corresponds to the y axis. On average, the optical axes of the optical channels are deflected around the z axis by 90° in the yz plane and the optical axes are on average not tilted from the yz plane.

$\beta_x^1$, for example, refers to the inclination angle of the facet 68a relative to the xz plane, measured in the xy plane, that is tilting of the facet 68a around the z axis relative to the xz plane where the optical axes 17a to *d* are located. $\beta_z^1=0°$ corresponds to an orientation of the facet 68a in parallel to the xz plane. Consequently, $\alpha_z^1=2\cdot\beta_z^1$ applies. Correspondingly, $\beta_x^1$ defines the inclination angle of the facet 68a relative to a plane which comprises an inclination $\beta_z^N$ compared to the xz plane and is in parallel to the z direction, measured along the z axis. Correspondingly, the following applies: $\alpha_x^1=2\cdot\beta_x^1$. The same definitions are to apply for the other channels: $\alpha_x^i=2\cdot\beta_x^i$, $\alpha_z^i=2\cdot\beta_z^i$. For each optical channel, the setting angle may be greater than an inclination angle of the angle of the reflective facet associated to this channel relative to the support substrate which the optical channels pass through. Here, the support substrate may be positioned in parallel to a line extension direction of the array 14 and the setting angle may be in a plane perpendicular to the line extension direction.

FIGS. 15b to 15e show side views of a beam-deflecting device in accordance with an embodiment for exemplarily four optical channels which are arranged linearly or in a single line. The beam-deflecting device 18 of FIGS. 15b to 15e may be used as the beam-deflecting device of FIG. 11a, wherein, however, in this case the partial fields of view would not cover the total field of view in a clockwise direction 3, 4, 2, 1, as illustrated in FIG. 11a, but in a clockwise direction in the order 4, 2, 1, 3. The inclination angles of the facets 68a to *d* are illustrated in FIGS. 15b to *e*. They are differentiated among one another by superscript indices 1 to 4 and associated to the respective channel. $\beta_x^1$ is 0°, as is $\beta_x^4$. The backside of the support substrate, that is that side which is opposite the surface provided with the facets 68a to *d*, is indicated in FIGS. 15b to 15e by 121. The material forming the parallelepiped-shaped part of the support substrate 123 is located below the broken line 125. It can be seen that the additional material added comprises a small volume so that molding is easy.

The support substrate 123 is placed to be inclined at a setting angle $\alpha_x^0$ relative to the image sensor 12, that is around the axis by which the mean direction of the optical axes of the optical channels is deflected, that is, in FIG. 15a, the z axis. This setting angle provides for the surface of the beam-deflecting device 18 facing the image sensor 12 to already cause a "coarse deflection" of the optical paths of the optical channels.

For the deflection angles of deflecting the optical path of each optical channel by the beam-deflecting device 18, this means that these are each based on the setting angle $\alpha_x^0$, and on the respective inclination of the reflective facet associated to the optical channel, relative to the support substrate 123. These facet-individual inclinations of the facets 68a-d mentioned may, as just described, be described by an inclination angle in the xy plane and an inclination angle relative to the normal of the support substrate 123 in the plane perpendicular thereto. It is advantageous when, for each angle, the setting angel $\alpha_x^0$ is greater than the inclination, that is $\alpha_x^0>\max(|\beta_x^i|, |\beta_z^i|)$, for all channels. It is even more advantageous when said inequality is fulfilled already for a $\alpha_x^0/2$ or even $\alpha_x^0/3$. In other words, it is advantageous when the setting angle, compared to the inclination angles of the facets 68a-d, is so great that the additional material is little compared to a purely parallelepiped-shaped beam-deflecting device 18. $\alpha_x^0$ may, for example, be between 30° and 60°, including both.

Manufacturing the beam-deflecting device 18 of FIGS. 15b-e may, for example, be done by molding the additional material by a molding tool onto the support substrate 123. The support substrate 123 here may, for example, be glass, whereas the molded additional material thereon is a polymer. Another possibility would be for the beam-deflecting device 18 of FIGS. 15b-e to be formed integrally by injection molding or the like. The result here is that the surface of the beam-deflecting means facing the image sensor is mirrored at least at the reflective facets associated to the optical channels. The support substrate may be supported to be rotationally turnable, as is described, for example, in connection with FIG. 4b.

Some aspects of the setups of multi-aperture imaging devices described so far related to a desired or instantaneous adjustment before or at the time of capturing a total image, for example. The multi-aperture imaging device 150 of FIG.

15a includes a processor, for example, like the processor 112 which merges images captured by the image sensor regions 58a-d at, for example, a same time, with the adjustments mentioned before, to form a total image which represents the scene in the total field of view 72. The algorithm used by the processor 112 for merging, or fusing to form a total image, the images projected onto the image sensor regions 58a-d by the optical channels 16a-d and having been captured by the latter, is, for example, designed such that assumptions on meeting certain parameters of the components of the multi-aperture imaging device 150 described before are kept to in order to meet a certain prerequisite for the quality of the total image or in order for the algorithm to be applicable at all. Exemplarily, the algorithm assumes that one or several of the following assumptions are kept to:

1) The optics-to-image sensor region distances along the x axis are equal for all optical channels 16a-d;
2) The relative position of the partial fields of view 74a-d and, in particular, the overlap between same correspond to a predetermined default value or deviates from the latter by less than a predetermined maximum deviation.

For different reasons, however, one or several of the assumptions just mentioned may not be kept to or not be kept to sufficiently. Reasons for non-keeping may, for example, be not keeping manufacturing variances, for example imprecision of the relative positions of the optics 64a-d among one another and relative to the image sensor 12. Manufacturing imprecision may also comprise imprecision of installing the mirror deflection device 18 and, maybe, of the relative positions of the facets 68a-d relative to one another when the beam-deflecting device 18 comprises facets 68a-d. Additionally or as an alternative to the manufacturing-caused tolerance deviations, temperature variations may cause one or several of the assumptions mentioned before not to apply or not to be kept to sufficiently.

Up to a certain degree, the algorithm for merging or fusing the images of the image sensor regions 58a-d to form the total image, performed by the processor 112, may compensate deviations from an optimum orientation and arrangement of the components, for example deviations of the positions of the partial fields of view 74a-d within the total field of view 72 from a set constellation of relative positions of the partial fields of view among one another. When merging or fusing the images, the processor 112 may, for example, compensate such deviations to a certain degree. However, when exceeding certain deviation limits (not keeping assumption 2), the processor 112, would, for example, not be able to compensate the deviations.

Producing the multi-aperture imaging device 150 such that the assumptions just mentioned are kept, for example across a certain temperature range, however, tends to increase the manufacturing costs of the multi-aperture imaging device 150. In order to avoid this, the multi-aperture imaging device 150 of FIG. 15a comprises adjusting means 116 for channel-individually changing a relative position between the image sensor region 58i of a respective optical channel 16i, the optics 64i of the respective optical channel 16i and the beam-deflecting device 18 or the corresponding segment 68i thereof, or for channel-individually changing an optical characteristic 16i or an optical characteristic of the segment 68i of the beam-deflecting device 18 relating to deflecting the optical path of the respective optical channel. The adjusting means 116 is driven by default values and performs the adjusting tasks in accordance with the default values. These are provided by a memory 118 and/or a controller 122, as will be discussed below.

The device 150 exemplarily comprises a memory 118 with stored default values for channel-individually driving the adjusting means 116. The default values may be predetermined and stored into the memory 118 by the manufacturer. Additionally, the processor 112 may, as is, for example, indicated in FIG. 15a by a broken line 124, be able, using evaluations of captured images of the image sensor regions 58a-d, for example images which are to be merged or fused to form a total image by the processor 112, to improve or update the stored default values in the memory 118. Exemplarily, the processor 112 captures a scene by adjusting the multi-aperture imaging device 150 with current stored default values using the adjusting means 116, as will be described below in greater detail. Thus, the default values are read from the memory 118 and used by the adjusting means 116 for the channel-individual adjustment. By analyzing the images of the image sensor regions 58a-d captured in this way, the processor 112 obtains information on how the default values stored in the memory 118 just used for capturing are to be modified in order to result in the above assumptions to be kept more precisely or in an improved manner when next taking a picture using these improved or updated default values.

The stored default values may comprise a complete set of adjusting values, that is a set of adjusting values for adjusting the device 150 completely. They are selected as described above and discussed further below in order to reduce or remove certain channel-individual deviations of the optical characteristics of the channels from a set characteristic.

The default values may comprise several sets of adjusting values, for example one per sequence of successive temperature intervals, so that that set of adjusting values will be used for image capturing which is suitable for a current situation. Thus, the controller 122 may, for example, perform an access or lookup to the table of associations between default value sets and different predetermined situations in the memory 118. For said access, the controller 122 obtains sensor data reflecting the current situation, like data relating to temperature, pressure, humidity, position of the device 150 in space and/or instantaneous acceleration or instantaneous rotation rate of the device 150, and determines from these data one of the several default value sets in the memory 118, namely that one associated to the predetermined situation which comes closest to the current situation as described by the sensor data. Sensor data may also have been gained from the image sensor data of the image sensor regions. Exemplarily, a set in the respective temperature interval of which the current temperature is located is selected by the controller 122. The default values of the selected set from the memory 118 used for a certain image capturing by the adjusting means 116 may then be updated again when using the optional feedback 124.

The stored default values may, for example, be configured such that a measure of dispersion of a distribution of one or several characteristics among the optical channels is reduced by driving the adjusting device by means of the stored default values, that is a transverse deviation of the partial fields of view from a regular distribution of the partial fields of view, focal lengths of the optics or depth-of-field distances of the optical channels.

Alternatively, the default values in the controller 122 may be determined with no memory 118, for example when mapping of the current sensor data to suitable default values is fixedly integrated in the controller 122. The mapping may be described by a functional relation between sensor data and default values. The functional relation may also be adaptable by parameters. The parameters may be adapted by means of the feedback 124.

The memory 118 may, for example, be a non-volatile memory. This may, for example, be a read-only memory, but a rewritable memory is also conceivable. The controller 122 and the processor 112 may be implemented in software, hardware or programmable hardware. This may be a program executed on a common microprocessor. The sensors for providing the sensor data for the controller 122 may belong to the device 150, like the image sensor regions, or else be external components, like components of the apparatus into which the device is installed, as will be discussed below referring to the following figures.

Possible implementations of the adjusting means 116 will be described below. The adjusting means 116 of FIG. 15a here may apply to one, several or all of the implementation variations described below. Special combinations will also be discussed below.

In the variation shown, the adjusting means 116 exemplarily comprises an actuator 126i for each channel 16i which moves the optics 64i of the corresponding channel 16i in an axial direction along the optical axis 17i or along the optical path and/or transverse thereto along the z axis and/or the y axis. Alternatively, the actuator 126i may, for example, also move the image sensor 12 or an individual image sensor region 58i. In general, the actuator 126i may cause a relative movement of image sensor region 58i, optics 64i and/or the corresponding segment 64i of the beam-deflecting means 24.

Figure 16A:
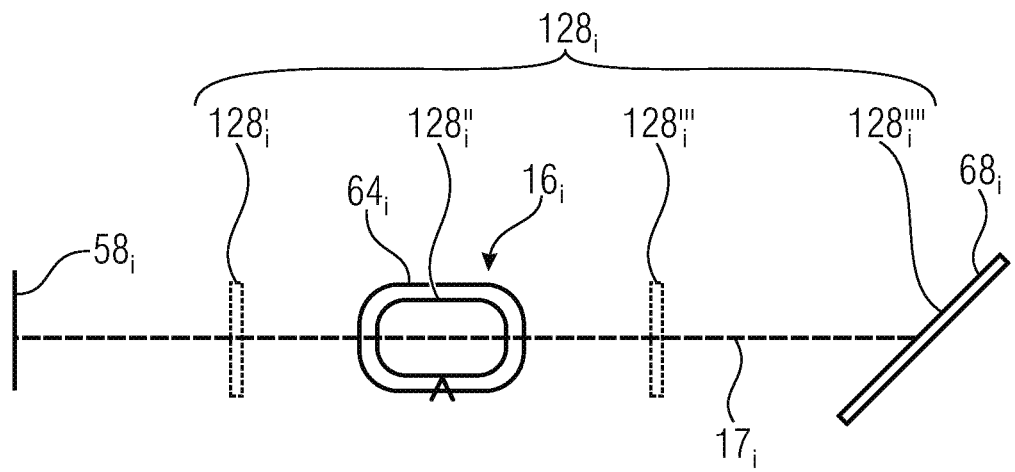
FIG. 16a is a schematic view of a multi-aperture imaging device comprising adjusting means for channel-individually adjusting optical characteristics in accordance with an embodiment.

In accordance with a variation FIG. 16a relates to, the adjusting means 116 comprises a phase-changing optical element or phase-change element 128i for each channel 16i which, as is indicated in FIG. 16a, may be integrated into the respective optics 64ai (128i"), be integrated into the segment 68i (128i""), be positioned between image sensor region 58i and optics 64i (128i') or between the optics 64i and the beam-deflecting means segment 68i (128i'''), wherein combinations of the possibilities mentioned before are also possible. The phase-changing optical element 128i may, for example, cause a location-dependent change in the refractive index, that is a local distribution thereof, for example by liquid crystals. Alternatively or additionally, the phase-changing optical element 128i causes a change in shape of an optically active surface such as, for example, when using piezos which mechanically act on flexible, solid, transparent materials and cause deformation, or by using the electrowetting effect. The phase-change element 128i" may, for example, change the refractive index of the optics 64i. Alternatively, the phase-change element 128i" may change the shape of an optical lens area of the optics 64i and thus change the effective refractive power of the optics 64i. The phase-change element 128i"" may, for example, generate a sinusoidal phase grid on an optically relevant surface of the segments 68i, for example on the reflective facet, so as to cause virtual tilting of the corresponding surface. Similarly, the phase-change element 128i' or phase-change element 128i''' may deflect the optical axis.

In other words, the phase change caused by the phase-changing optical element 128i may be largely rotation-symmetrical, such as, for example, rotation-symmetrical around the optical axis 17i, and thus cause a change in focal length of the optics 64i in the case of 128i", for example. The phase change caused by the element 128i may, however, also be largely linear, such as, for example, linear along the z axis or linear along the y axis so as to cause a change in the deflection angle or deflection of the optical axis 17i in the corresponding direction.

The rotation-symmetrical phase change may be used for focusing, as can the linear phase change for correcting the position of the partial field of view of the corresponding optical channel 16i.

Figure 16B:
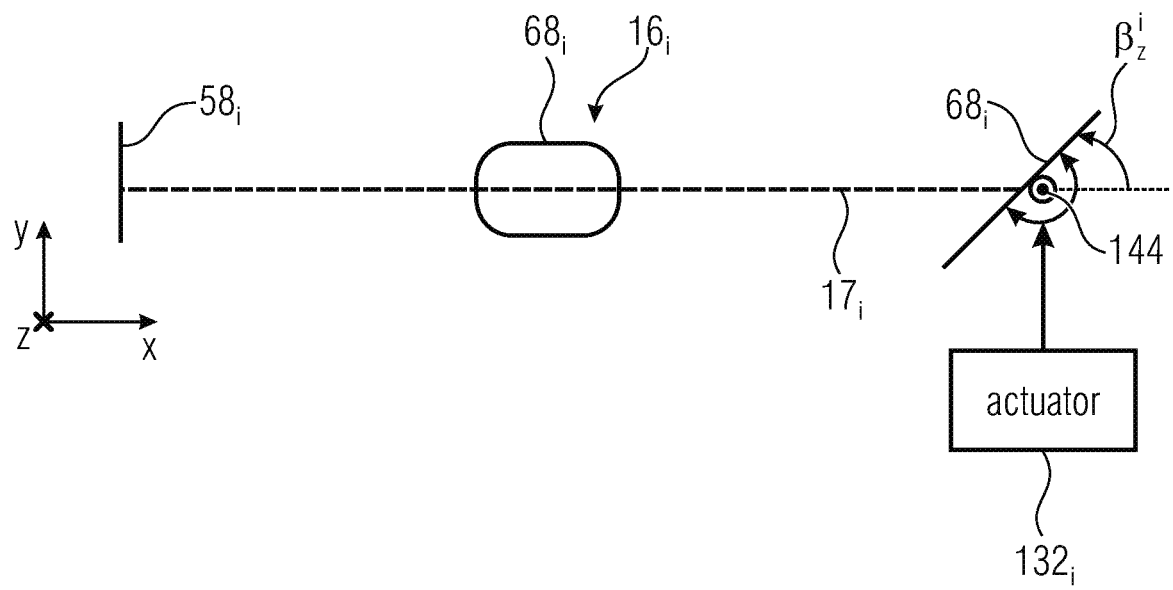
FIG. 16b shows a variation of a multi-aperture imaging device comprising the adjusting means in accordance with an embodiment.

In accordance with another variation illustrated in FIG. 16b, the adjusting means 116, for each channel 16i, comprises an actuator 132i which changes the segment 68i, for example the reflective facet of the respective channel 16i, in its angular orientation relative to the optical axis 17i, that is the setting angle $\beta_x^i$. It is to be mentioned here that the segment 68i is not limited to a reflective facet. Each segment 68i may also be implemented as a prism which deflects the direction of the optical axis 17i in the yz plane, whereas the optical path of the optical channel 16i passes the prism.

A pneumatic, hydraulic, piezoelectric, thermal, electrostatic or electrodynamic drive or a DC or stepper motor or a voice-coil drive may, for example, be used for realizing the relative movements by the actuators 126i and 132i, that is for generating movement of the optics 68i which may, for example, be implemented in a translatory manner, and for tilting the segment 68i by the actuator 132i and the z axis.

Returning to FIG. 15a, broken lines indicate that the multi-aperture imaging device 150, in addition to the adjusting means 116, may comprise one or several actuators 134 for generating a channel-global relative movement, that is equal for all optical channels 16a-d, between image sensor 12, optics array 14 and beam-deflecting means 18. The one or several additional actuators 134 may, as is indicated in FIG. 15a, thus be part of an optional autofocus controller 136 (focusing means) and/or an optional image stabilization controller of the multi-aperture imaging device.

A specific example of a device 150 of FIG. 15a supplemented by additional actuators is shown in FIG. 17. FIG. 17 shows the multi-aperture imaging device 150 of FIG. 15a, wherein the optics 64a-d of the optical channels 16a-d are mechanically fixed to one another via the common support 66. Using the common support, it is possible to subject the optics 64a-d to a global movement equal for all the channels, for example by a translatory movement of the support 66 in the z direction, that is along the line extension direction of the array 14. An actuator 134a is provided here. The actuator 134a thus generates a translatory movement of the optics 64a-d which is equal for all optical channels 16a-d by the actuator 134a subjecting the common support 66 to the translatory movement along the z axis. As regards the type of actuator 134a, reference is made to examples mentioned referring to FIGS. 16a and 16b. In addition, the device 150 comprises an actuator 134b for a channel-global change, that is equal for all optical channels 16a-d, of the distance between image sensor 58i and optics 64i along the z axis or along the optical axis 17i. As is indicated in FIG. 17, the actuator 134b does not subject the optics 64a-d to the translatory movement along the z axis for changing the distance to the associated image sensor portions 58a-d using the support 66, but also using the actuator 134a which is thus also subjected to the translatory movement along the x axis and, thus, serves as a suspension for the support 66.

Additionally, the device 150 of FIG. 17 comprises an actuator 134c for rotating the beam-deflecting means 18 around an axis which is parallel to the z axis or is positioned in the plane, or not far away from same, in which the optical axes 17a-d are located. As regards the actuators 134b and 134c, reference is made to the listing of examples provided before referring to FIGS. 16a and 16b, as regards possible implementation examples. The rotational movement applied by the actuator 134c on the beam-deflecting means 18 has the same effect on the segments 68a-d of the beam-deflecting means 18 for all channels 16a-d, that is is channel-global.

Using the actuator 134b, the autofocus controller 136 is, for example, able to control the focus of capturing by the device 150 by means of the channels 16a-d in a channel-global sense. The image stabilization controller 138 is able to stabilize the total field of view 72 from shaking by a user, for example, in a first direction 142 by means of the actuator 134c and in a direction 144 perpendicular thereto by means of the actuator 134a. The first direction 142 may be produced by a rotational movement around the rotational axis 44. As is indicated by the first direction 142', alternatively or additionally, a translatory movement of the beam-deflecting means 18 and/or the array 14 may be generated by the actuator 134. The directions 142, 142' and 144 may thus be parallel to the image axes, be within a plane of the direction or correspond to same. The image stabilizers described here may be implemented to have a common effect for two, a plurality of or all the optical paths of the optical channels. This means that a channel-individual image stabilization may be omitted, which is of advantage.

Exemplarily, the device 150 of FIG. 15a comprises, for each channel 16a-d, an actuator, like an actuator 126i for each channel 16i, so as to subject the image sensor regions 58a-d to a translatory movement along the z axis and/or along the y axis in a channel-individual manner so as to compensate manufacturing imprecisions or temperature-induced drifts of the partial fields of view within the total field of view, for example. The device 150 of FIG. 15a may, alternatively or additionally, comprise an actuator 128i'' in order to compensate undesired differences in focal length of the optics 64a-d which are caused by manufacturing. Additionally or alternatively, the device 150 of FIG. 15a may comprise an actuator 128i''' in order to compensate deviations of the relative inclinations of the segments 68a-d among one another caused by manufacturing or due to temperature such that the relative inclinations result in the desired coverage of the total field of view 72 by the partial fields of view 74a-d. Additionally or alternatively, the device 150 may finally comprise actuators of the type 128i' and/or 128i'''.

In summary, the device 150 may comprise an actuator 134c configured to rotate the beam-deflecting means 18 around an axis which is parallel to the line extension direction z of the array 14. The rotational axis is, for example, located in the plane of the optical axes 17a-d or spaced apart therefrom by less than a fourth of a diameter of the optics 68a-d. Alternatively, it would, of course, also be possible for the rotational axis to be located further away, for example by less than an optics diameter or less than four optics diameters. The actuator 134c may, for example, be provided in order to rotate the beam-deflecting means 18 at short a response time in only a small angular range, for example within a span of less than 5° or less than 10°, in order to compensate shaking of the multi-aperture imaging device 150 by, for example, a user while taking a picture. In this case, the actuator 134c would, for example, be driven by the image stabilization controller 138.

Alternatively or additionally, the actuator 134c may be configured to change the total field of view 72 defined by the total coverage of the partial fields of view 74a-d (FIG. 15a), in its direction by greater angular adjustments. Thus, it would also be possible for deflections to be achieved by rotating the beam-deflecting means 18, wherein the total field of view is arranged in the opposite direction relative to the device 150 by, for example, implementing the beam-deflecting means 18 to be a mirror array reflective on both sides.

Alternatively or additionally, the device 150 may comprise an actuator 134a configured to move the optics 64a-d by means of the substrate 66 or move the substrate 66 itself and, thus, the optics 64a-d in a translatory manner along the line extension direction. The actuator 134a may, for example, also be driven by the image stabilizing controller mentioned before in order to achieve image stabilization transverse to the image stabilization by the movement 96 along the line extension direction, which is realized by rotating the mirror-deflecting device 18.

Furthermore, the device 150 may, additionally or alternatively, comprise an actuator 134b for changing the image-side distance between image sensor 12 and optics 64a-d or between image sensor 12 and body 66 so as to achieve adjustment of depth of field, compare FIG. 12. The means 98 may be driven by a manual user control or by autofocus control of the device 150.

The actuator 134a also serves for suspending the substrate 66 and is, as is indicated in FIG. 15a, arranged laterally next to the substrate 66 along the line extension direction in order not to increase the construction height. It also applies for the actuators 134b and 134c that these are arranged in the plane of the optical paths in order not to increase the construction height.

It is to be pointed out that the optics 64a-d may be held in a constant relative position not only among one another, for example via the transparent substrate mentioned already, but also relative to the beam-deflecting means, for example using a suitable frame which does not increase the construction height and thus is located in the plane of the components 12, 14 and 66 or in the plane of the optical paths. The stability of the relative position may be restricted to the distance between optics and beam-deflecting means along the optical axes so that the actuator 134b exemplarily moves the optics 64a-d together with the beam-deflecting means 18 in a translatory manner along the optical axes. The optics-to-beam-deflecting means distance may be adjusted to a minimum distance so that the optical path of the channels is not limited laterally by the segments of the beam-deflecting means 18, thereby reducing the construction height, since otherwise the segments 68i would have to be dimensioned as regards the lateral extension for the greatest optics-to-beam-deflecting means distance in order not to cut into the optical path. Additionally, the stability of the relative position could mean that the frame mentioned before holds the optics and the beam-deflecting means along the z axis in a mutually rigid manner so that the actuator 134a would move the optics 64a-d together with the beam-deflecting means in a translatory manner along the line extension direction.

In combination with the actuator 134c for generating the rotary movement of the beam-deflecting means 18 and the actuator 134a of an optical image stabilizing controller of the multi-aperture imaging device 150, the beam-deflecting means 18 described before for deflecting the optical path of the optical channels allows image or total field of view stabilization in two dimensions, namely image stabilization along a first image axis which is essentially in parallel to the line extension direction, by the translatory movement of the substrate 66, and image stabilization along a second image axis which is essentially parallel to the optical axes before or without beam deflection, or—when considering the deflected optical axes—perpendicular to the optical axes and the line extension direction, by generating the rotary movement of the beam-deflecting means 18. In addition, the arrangement described may cause a translatory movement of the beam-deflecting means fixed in the frame mentioned and the array 14 perpendicular to the line extension direction, for example by the actuator 54 described which may be used for realizing focus adjustment and, thus, an autofocus function.

Figure 18:
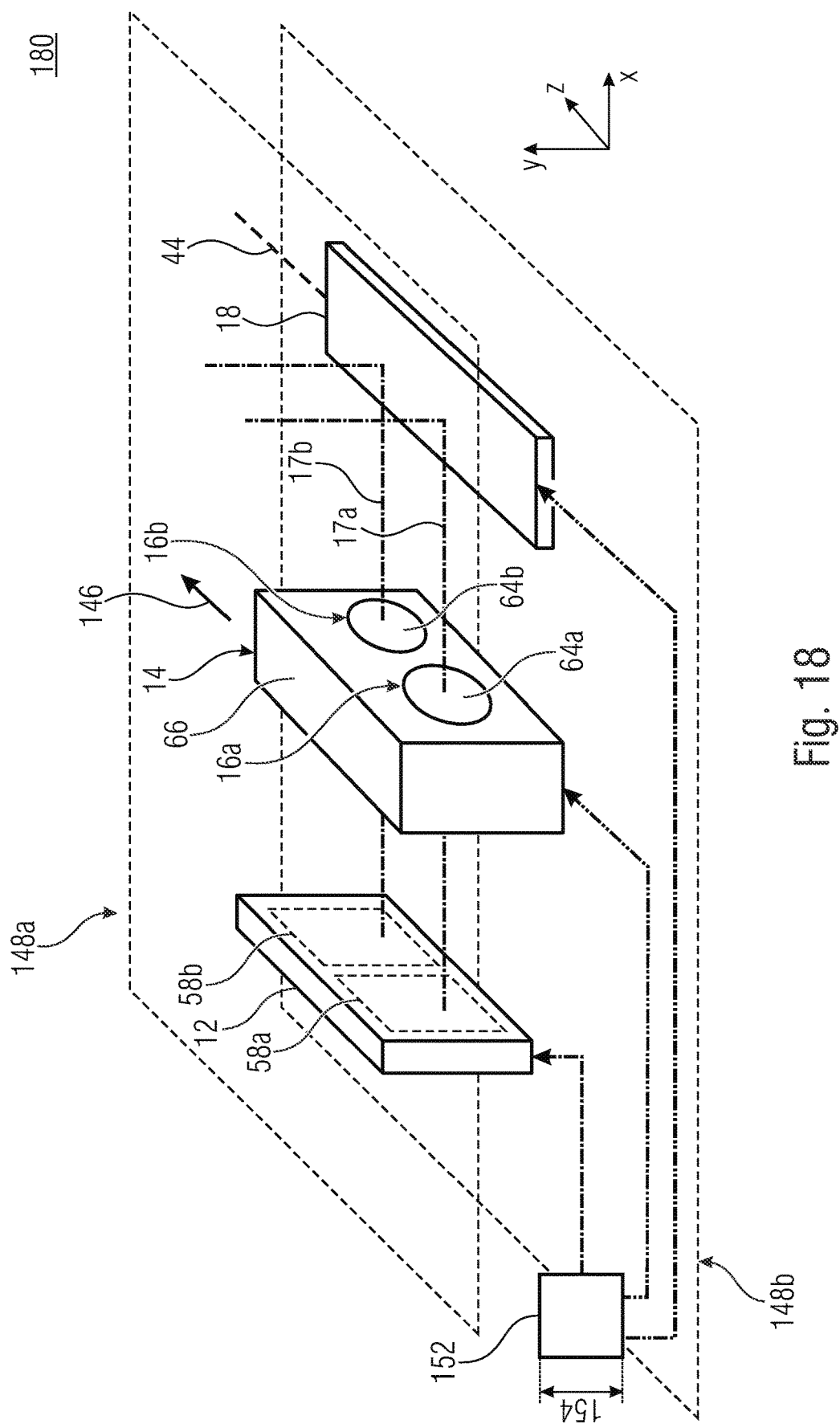
FIG. 18 is a schematic view of an arrangement of actuators in a multi-aperture imaging device in accordance with an embodiment.

FIG. 18 shows a schematic view of a multi-aperture imaging device 180 for illustrating an advantageous arrangement of actuators, like for image stabilization and/or adjustment of focus. The image sensor 12, the array 14 and the beam-deflecting means 18 may span a cuboid in space. The cuboid may also be understood to be a virtual cuboid and may, for example, comprise a minimum volume and, in particular, a minimum perpendicular extension along a direction in parallel to the y direction or thickness direction and comprise the image sensor 12, the single-line array 14 and the beam-deflecting means 18. The minimum volume may also be understood to be a cuboid spanned by the arrangement and/or operational movement of the image sensor 12, the array 14 and/or the beam-deflecting means 18. The array 14 may comprise a line extension direction 146 along which the optical channels 16a and 16b are arranged next to each other, maybe in parallel. The line extension direction 146 may be arranged at a fixed location in space.

The virtual cuboid may comprise two sides which are oriented to be opposite in parallel to each other, in parallel to the line extension direction 146 of the single-line array 14 and in parallel to a part of the optical path 17a and/or 17b of the optical channels 16a and 16b between the image sensor 12 and the beam-deflecting means 18. In a simplifying manner, but with no limiting effect, these may, for example, be a top side and a bottom side of the virtual cuboid. The two sides may span a first plane 148a and a second plane 148b. This means that the two sides of the cuboid may each be part of the plane 148a and 148b. Further components of the multi-aperture imaging device may be arranged completely, but at least partly within the region between the planes 148a and 148b so that the space requirement of the multi-aperture imaging device 180 along a direction in parallel to a surface normal of the planes 148a and/or 148b is small, which is of advantage. A volume of the multi-aperture imaging device may comprise a small or minimum construction space between the planes 148a and 148b. A construction space of the multi-aperture imaging device along the lateral side for extension direction of planes 148a and/or 148b may be great or as great as desired. The volume of the virtual cuboid is, for example, influenced by an arrangement of the image sensor 12, the single-line array 14 and the beam-deflecting means 18, wherein the arrangement of these components may, in accordance with the embodiments described here, be such that the construction space of these components along the direction perpendicular to the planes and, thus, the mutual distance between the planes 148a and 148b becomes small or minimum. Compared to other arrangements of the components, the volume and/or the distance of other sides of the virtual cuboid may be increased.

The multi-aperture imaging device 180 comprises actuator means 152 for generating a relative movement between the image sensor 12, the single-line array 14 and the beam-deflecting means 18. The actuator means 152 is arranged at least partly between the planes 148a and 148b. The actuator means 152 may be configured to move at least one of the image sensors 12, the single-line arrays 14 or the beam-deflecting means 18 in a rotary manner around at least an axis and/or in a translatory manner along one or several directions. Here, the actuator means 152 may comprise at least one actuator, like the actuator 128i, 132i and/or 134 for channel-individually changing a relative position between the image sensor region 58i of a respective optical channel 16i, the optics 64i of the respective optical channel 16i and the beam-deflecting means 18 or the corresponding segment 68i thereof, or for channel-individually changing an optical characteristic 16i or an optical characteristic of the segment 68i of the beam-deflecting means 18 relating to deflecting the optical path of the respective optical channel. Alternatively or additionally, the actuator means may implement autofocus and/or optical image stabilization, as has been described before.

The actuator means 152 may comprise a dimension or extension 154 in parallel to the thickness direction. A portion of at most 50%, at most 30% or at most 10% of the dimension 154 may protrude beyond the plane 184a and/or 184b starting from a region between the planes 148a and 148b, or protrude from the region. This means that the actuator means 152 protrudes beyond the plane 148a and/or 148b at most insignificantly. In accordance with embodiments, the actuator means 152 does not protrude beyond the planes 148a and 148b. It is of advantage that an extension of the multi-aperture imaging device 180 along the thickness direction is not increased by the actuator means 152.

Implementations of the beam-deflecting means 18 will be described referring to FIGS. 19a to f. The implementations show a number of advantages which may be executed individually or in any combination, but do not have a restrictive effect.

Figure 19A:
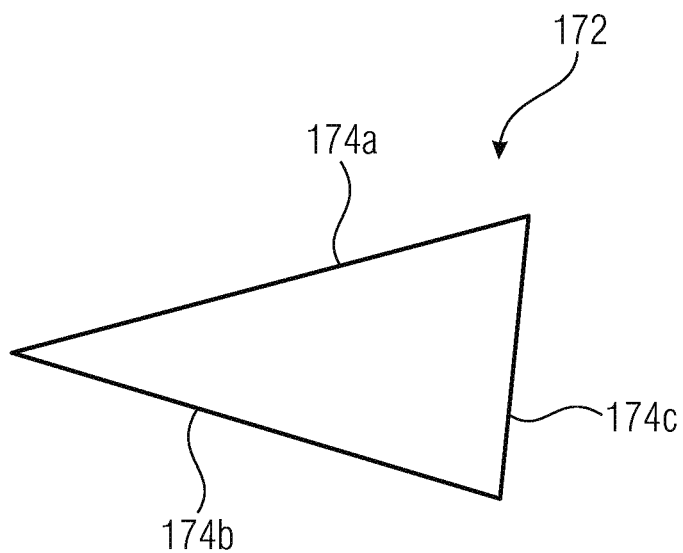
FIG. 19*a*-19*f* show an advantageous implementation of beam-deflecting means of an imaging device in accordance with an embodiment.

FIG. 19a shows a schematic sectional side view of a beam-deflecting element 172 as may be employed for beam-deflecting means described here, like the beam-deflecting means 18 of FIG. 4, 5 or 6. The beam-deflecting element 172 may be effective for one, a plurality of or all the optical channels 16a to d and comprise a polygon-sequence-like cross-section. Although a triangular cross-section is shown, it may exhibit any other polygon. Alternatively or additionally, the cross-section may also comprise at least one curved surface, wherein, in particular with reflective surfaces, an implementation which is planar at least in sections may be of advantage in order to avoid imaging errors.

The beam-deflecting element 172 comprises a first side 174a, a second side 174b and a third side 174c, for example. At least two sides, like sides 174a and 174b, are implemented to be reflective so that the beam-deflecting element 172 is implemented to be reflective on both sides. The sides 174a and 174b may be main sides of the beam-deflecting element 172, that is sides the area of which is greater than the side 174c.

In other words, the beam-deflecting element 172 may be formed in a wedge shape and to be reflective on both sides. Opposite the area 174c, that is between the areas 174a and 174b, there may be another area which, however, is considerably smaller than the area 174c. In other words, the wedge formed by the areas 174a, b and c does not taper to a point, but is provided with an area and, thus, flattened at the pointed side.

Figure 19B:
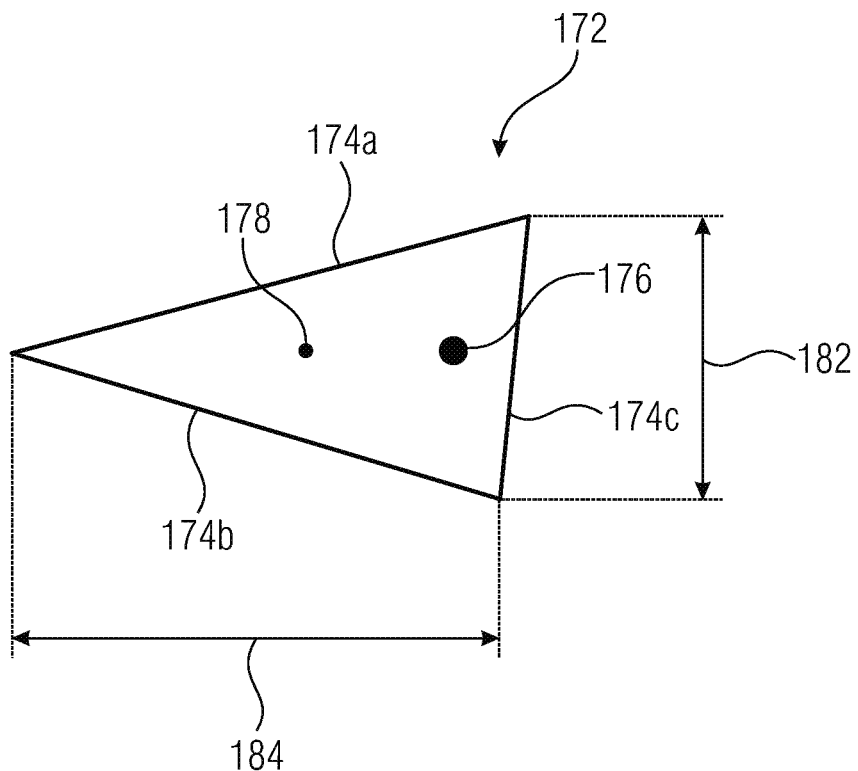

FIG. 19b shows a schematic sectional side view of the beam-deflecting element 172 in which a suspension or displacement axis 176 of the beam-deflecting element 172 is described. The displacement axis 176 around which the beam-deflecting element 172 may be movable in a rotary and/or translatory manner in the beam-deflecting means 18, may be shifted eccentrically relative to a centroid 178 of the cross-section. The centroid may alternatively be a point describing half the dimension of the beam-deflecting element 172 along a thickness direction 182 and along a direction 184 perpendicular thereto.

The displacement axis may be unchanged along a thickness direction 182, for example, and exhibit any offset in a direction perpendicular thereto. Alternatively, an offset along the thickness direction 182 is also conceivable. Displacing may, for example, take place such that, with a rotation of the beam-deflecting element 172 around the displacement axis 176, higher an actuating path is obtained than when rotating around the centroid 178. Thus, by displacing the displacement axis 176, the path covered by the edge between the sides 174a and 174b in a rotation may increase with an equal rotational angle compared to a rotation around the centroid 178. The beam-deflecting element 172 is arranged such that the edge, that is the pointed side of the wedge-shaped cross-section, between the sides 174a and 174b faces the image sensor. A respective other side 174a or 174b may each deflect the optical path of the optical channels by small rotational movements. It becomes clear that the rotation may be executed such that a space consumption of the beam-deflecting means along the thickness direction 182 is small since a movement of the beam-deflecting element 172 such that a main side is perpendicular to the image sensor is not needed.

The side 174c may also be referred to as secondary side or backside. Several beam-deflecting elements may be connected among one another such that a connective element is arranged at the side 174c, or passes through the cross-section of the beam-deflecting elements, that is arranged within the beam-deflecting elements, like in the region of the displacement axis 176. In particular, the holding element may be arranged such that it does not protrude beyond the beam-deflecting element 172 along the direction 182 or only to a small extent, that is at most 50%, at most 30% or at most 10%, so that the holding element does not increase or determine the extension of the total setup along the direction 182. The extension in the thickness direction 182 may alternatively be determined by the lenses of the optical channels, that is these exhibit the dimension defining the minimum thickness.

The beam-deflecting element 172 may be formed from glass, ceramics, glass ceramics, plastics, metal or a combination of these materials and/or further materials.

In other words, the beam-deflecting element 172 may be arranged such that the tip, that is the edge between the main sides 174a and 174b, faces the image sensor. Holding of the beam-deflecting elements may be done such that it is done only on the backside or within the beam-deflecting elements, that is the main sides are not hidden. A common holding or connective element may extend over the backside 174c. The rotational axis of the beam-deflecting element 172 may be arranged to be eccentric.

Figure 19C:
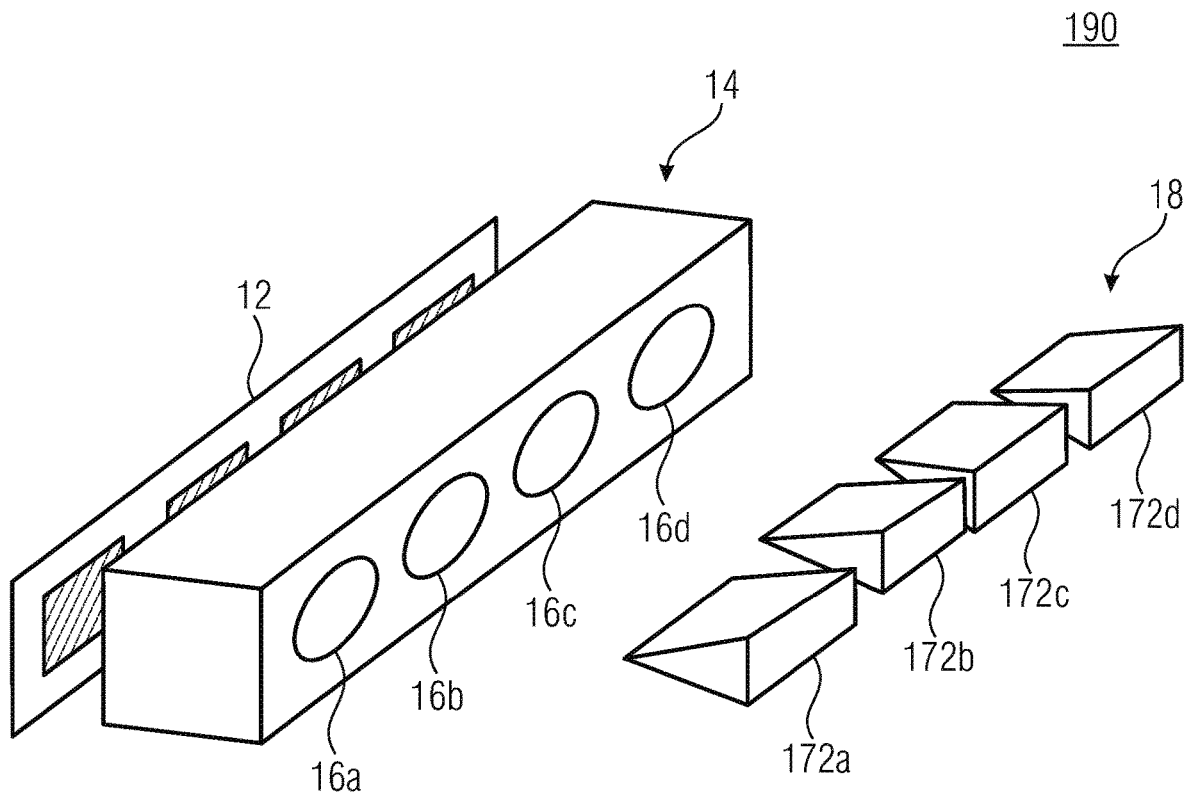

FIG. 19c shows a schematic perspective view of a multi-aperture imaging device 190 which comprises an image sensor 12 and a single-line area 14 of optical channels 16a to d arranged next to one another. The beam-deflecting means 18 comprises a number of beam-deflecting elements 172a to d which correspond to the number of optical channels. Alternatively, a smaller number of beam-deflecting elements may be arranged, for example when at least one beam-deflecting element is used by two optical channels. Alternatively, a higher number may also be arranged, for example when the deflection direction of the beam-deflecting means 18 is switched by a translatory movement. Each beam-deflecting element 172a to d may be associated to an optical channel 16a to d. The beam-deflecting elements 172a to d may be illustrated as a plurality of elements 172 in accordance with FIG. 11. Alternatively, at least two, several or all the beam-deflecting elements 172a to d may be formed integrally.

Figure 19D:
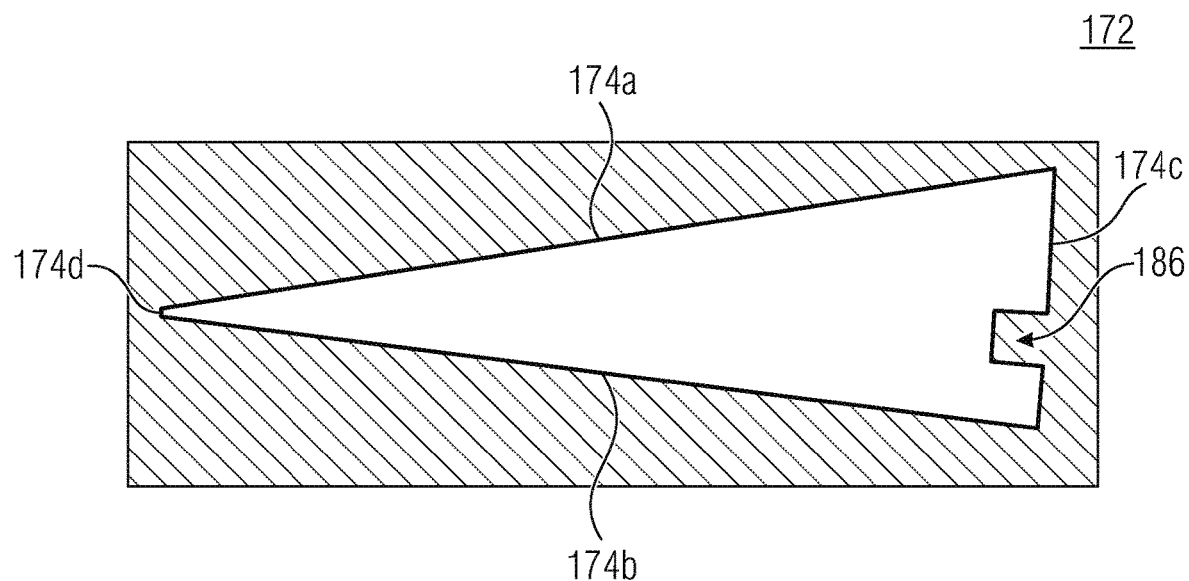

FIG. 19d shows a schematic sectional side view of the beam-deflecting element 172 the cross-section of which is formed as a free-form shape. Thus, the side 174c may comprise a recess 186 which allows mounting of a holding element, wherein the recess 186 may also be formed as a protruding element, for example as a groove of a tongue and groove system. The cross-section additionally comprises a fourth side 174d which comprises smaller an area than the main sides 174a and 174b and connects these to each other.

Figure 19E:
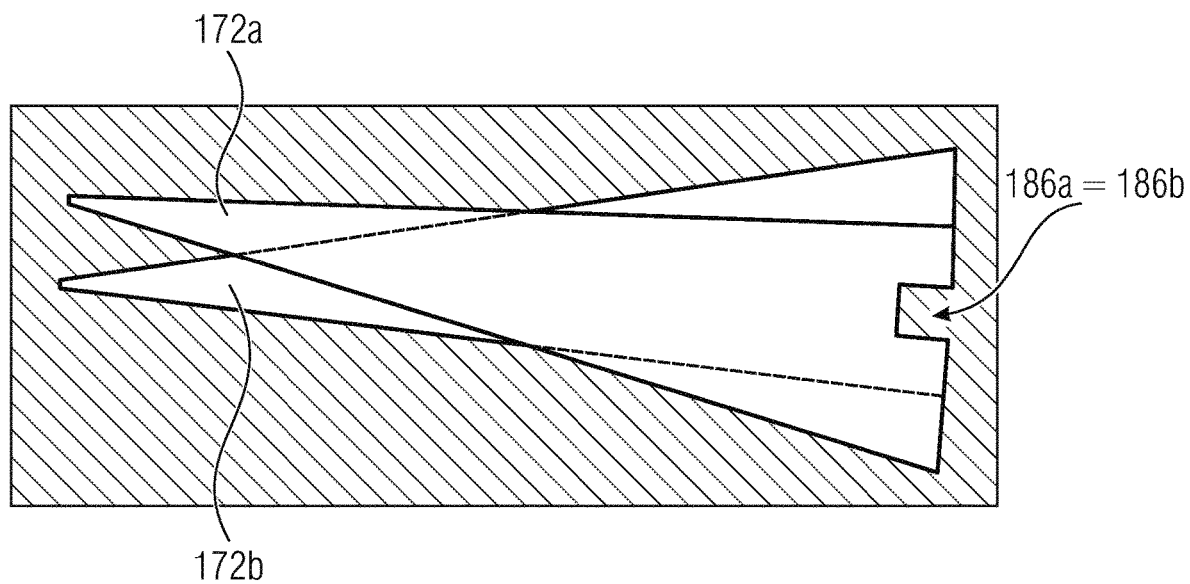

FIG. 19e shows a schematic sectional side view of a first beam-deflecting element 172a and a second beam-deflecting element 172b behind it in the direction of the illustration. The recesses 186a and 186b thus may be arranged such that they are basically congruent so that arranging a connective element in the recesses is possible.

Figure 19F:
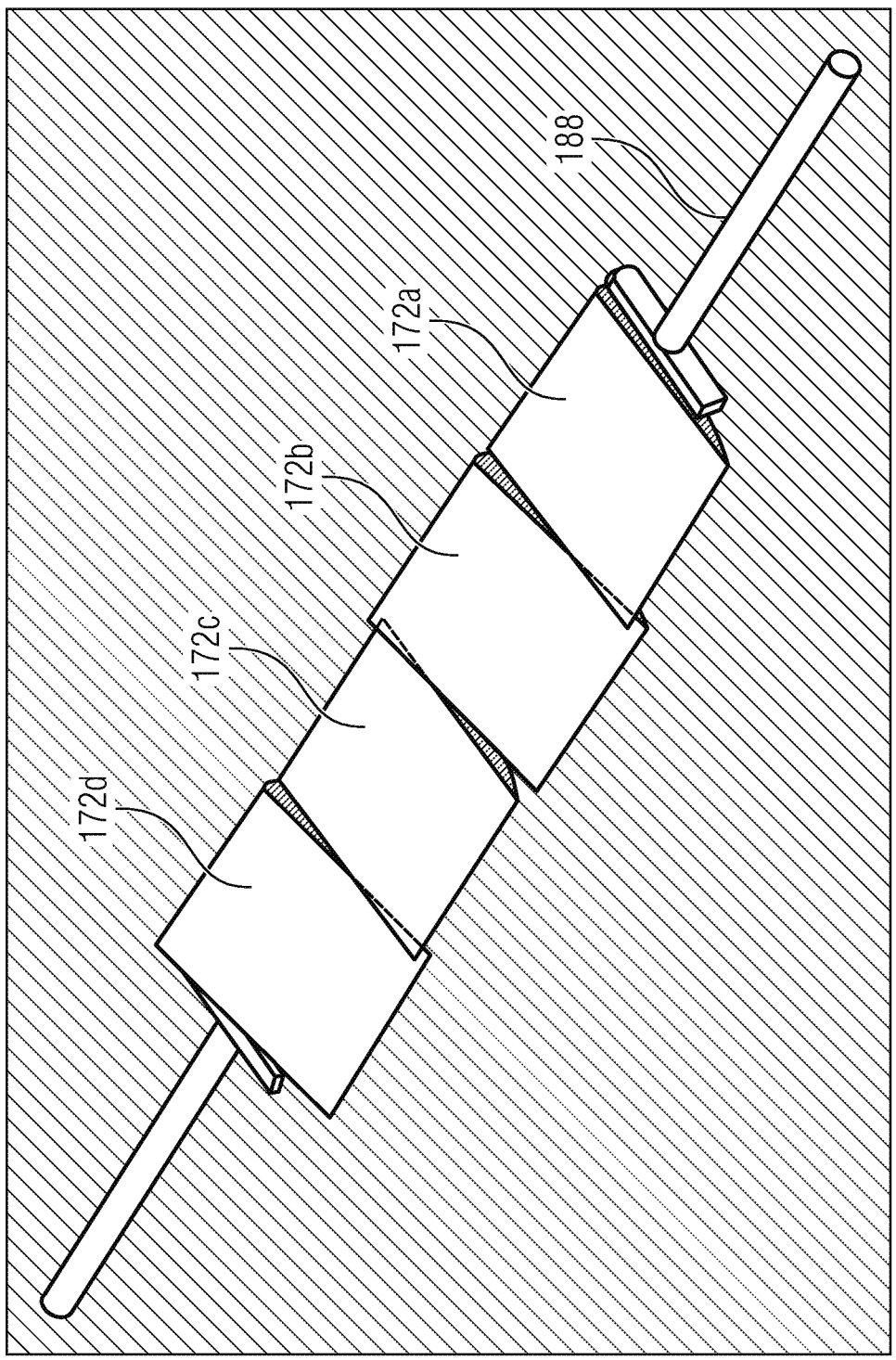

FIG. 19f shows a schematic perspective view of the beam-deflecting means 18 which exemplarily comprises four beam-deflecting elements 172a to d connected to a connective element 188. The connective element may be useable in order to be moveable by an actuator in a translatory and/or rotary manner. The connective element 188 may be formed integrally and be located at or in the beam-deflecting elements 172a to d over an extension direction, like the y direction in FIG. 5c. Alternatively, the connective element 188 may also only be connected to at least one side of the beam-deflecting means 18, like when the beam-deflecting elements 172a to d are formed integrally. Alternatively, connecting to an actuator and/or connecting the beam-deflecting elements 172a to d may take place in any other way, for example by means of gluing, wringing or soldering.

Although some aspects have been described in connection with a device, it is to be understood that these aspects also represent a description of the corresponding method such that a block or element of a device is to be understood to be also a corresponding method step or a feature of a method step. In analogy, aspects having been described in connection with or as a method step also represent a description of a corresponding block or detail or feature of a corresponding device.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:
1. A device comprising:
a housing; and
a multi-aperture imaging device comprising:
an array of optical channels arranged next to one another; and
a beam-deflector for deflecting an optical path of the optical channels;
wherein external surfaces of the housing enclose a housing volume in a first operating state of the device, wherein the beam-deflector, in the first operating state of the device, comprises a first position within the housing volume, wherein the beam-deflector, in a second operating state of the device, comprises a second position where the beam-deflector is arranged at least partly outside the housing volume;

wherein the beam-deflector comprises a first positioning and a second positioning between which the beam-deflector is movable, wherein the beam-deflector is configured to deflect the optical path of each optical channel to a mutually different direction in the first positioning and in the second positioning; and wherein the beam-deflector comprises a third positioning in the first position, wherein the beam-deflector comprises, in the third positioning, an extension which is perpendicular to a line extension direction of the array and parallel to a surface of an image sensor onto which the optical channels impinge, wherein the extension is smaller in the third positioning than in the first positioning and the second positioning; or wherein, in a transition from the first operating state to the second operating state, optics of the optical channels and an image sensor are moved together with the beam-deflector in a translatory manner, wherein, in the transition from the first operating state to the second operating state, all optics of the optical channels and the image sensor are moved together with the beam-deflector in the translatory manner.

2. The device in accordance with claim 1, wherein the beam-deflector is movable between the first positioning and the second positioning in a rotary manner around a rotary axis.

3. A method for providing a device, comprising:

providing a housing; and arranging a multi-aperture imaging device within the housing, the multi-aperture imaging device comprising:

an array of optical channels arranged next to one another; and a beam-deflector for deflecting an optical path of the optical channels;

wherein arranging the multi-aperture imaging device is executed such that external surfaces of the housing enclose a housing volume in a first operating state of the device so that the beam-deflector, in the first operating state of the device, comprises a first position within the housing volume; and so that the beam-deflector, in a second operating state of the device, comprises a second position in which the beam-deflector is arranged at least partly outside the housing volume;

so that the beam-deflector comprises a first positioning and a second positioning between which the beam-deflector is movable, wherein the beam-deflector is configured to deflect the optical path of each optical channel to a mutually different direction in the first positioning and in the second positioning; and so that the beam-deflector comprises a third positioning in the first position, wherein the beam-deflector comprises, in the third positioning, an extension which is perpendicular to a line extension direction of the array and parallel to a surface of an image sensor onto which the optical channels impinge, wherein the extension is smaller in the third positioning than in the first positioning and the second positioning; or so that, in a transition from the first operating state to the second operating state, optics of the optical channels and an image sensor are moved together with the beam-deflector in a translatory manner; so that, in the transition from the first operating state to the second operating state, all optics of the optical channels and the image sensor are moved together with the beam-deflector in the translatory manner.

4. A method for capturing a total field of view, comprising:

moving a beam-deflector of a multi-aperture imaging device to a position in which the beam-deflector is arranged at least partly outside a housing volume which, in a first operating state of a device, is enclosed by external surfaces of a housing and where the beam-deflector is arranged in a first position; wherein the beam-deflector comprises a first positioning and a second positioning between which the beam-deflector is movable, wherein the beam-deflector is configured to deflect the optical path of each optical channel to a mutually different direction in the first positioning and in the second positioning; wherein the beam-deflector comprises a third positioning in the first position, wherein the beam-deflector comprises, in the third positioning, an extension which is perpendicular to a line extension direction of the array and parallel to a surface of an image sensor onto which the optical channels impinge, wherein the extension is smaller in the third positioning than in the first positioning and the second positioning; or wherein, in a transition from the first operating state to the second operating state, optics of the optical channels and an image sensor are moved together with the beam-deflector in a translatory manner, wherein, in the transition from the first operating state to the second operating state, all optics of the optical channels and the image sensor are moved together with the beam-deflector in the translatory manner; and capturing the total field of view using an array of optical channels of the multi-aperture imaging device arranged next to one another, the optical paths of which are deflected by the beam-deflector.

* * * * *